United States Patent
Nagai et al.

(10) Patent No.: US 7,510,495 B2
(45) Date of Patent: Mar. 31, 2009

(54) AUTOMATIC SPEED REDUCING RATIO-SWITCHING APPARATUS

(75) Inventors: Shigekazu Nagai, Tokyo (JP); Akio Saitoh, Kawaguchi (JP); Ryuichi Masui, Bando (JP); Masaki Imamura, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 396 days.

(21) Appl. No.: 11/465,490

(22) Filed: Aug. 18, 2006

(65) Prior Publication Data

US 2007/0049453 A1 Mar. 1, 2007

(30) Foreign Application Priority Data

Aug. 29, 2005 (JP) ............................. 2005-248330
Nov. 24, 2005 (JP) ............................. 2005-338743

(51) Int. Cl.
*F16H 47/08* (2006.01)
(52) U.S. Cl. ...................... 475/91; 475/263; 475/266; 475/299; 475/344
(58) Field of Classification Search ................. 475/85, 475/91, 112, 263, 266, 299, 344
See application file for complete search history.

(56) References Cited

U.S. PATENT DOCUMENTS

| | | | |
|---|---|---|---|
| 3,164,034 A | 1/1965 | Kelley | |
| 3,872,742 A * | 3/1975 | States | ......................... 475/299 |
| 4,869,139 A | 9/1989 | Gotman | |
| 4,898,249 A * | 2/1990 | Ohmori | ...................... 173/176 |
| 5,041,748 A | 8/1991 | Huber | |
| 5,429,558 A * | 7/1995 | Lagarde | ...................... 475/344 |
| 5,730,232 A | 3/1998 | Mixer | |
| 5,730,494 A | 3/1998 | LaPointe et al. | |
| 5,813,666 A | 9/1998 | Berchtold | |
| 6,652,410 B2 * | 11/2003 | Gutierrez Vesga | .......... 475/290 |
| 6,676,557 B2 * | 1/2004 | Milbourne et al. | .......... 475/286 |
| 6,806,602 B2 | 10/2004 | Hilzinger et al. | |
| 2004/0071563 A1 | 4/2004 | Nagai et al. | |
| 2004/0104554 A1 | 6/2004 | Watwood et al. | |
| 2005/0022523 A1 | 2/2005 | Nagai et al. | |
| 2005/0087068 A1 | 4/2005 | Nagai et al. | |
| 2005/0272548 A1 | 12/2005 | Nagai et al. | |

FOREIGN PATENT DOCUMENTS

| | | |
|---|---|---|
| JP | 64-69829 | 3/1989 |
| JP | 2002-266902 | 9/2002 |
| JP | 2003-184982 | 7/2003 |
| JP | 2005-133379 | 5/2005 |
| JP | 2006-22950 | 1/2006 |
| WO | 2004/061318 | 7/2004 |

\* cited by examiner

*Primary Examiner*—David D. Le
(74) *Attorney, Agent, or Firm*—Paul A. Guss

(57) ABSTRACT

Helical gears, which are provided for a sun gear, planet gears, and an internal gear, have helix angles θ of not less than 25 degrees and not more than 45 degrees. Pawls provided for lock sections and internal gear lock receiving sections of the internal gear have rising angles γ, respectively, that satisfy the relational expression, $0 \leq \tan \gamma < (\eta \cdot di)/\{dp \cdot \tan(90-\alpha)\}$, wherein α is the helix angle of the sun gear, η is the screw efficiency of the sun gear as a sliding screw, dp is the pitch circle diameter of the sun gear, and di is an outer diameter of the internal gear defining a center of application of torque of the pawls.

10 Claims, 61 Drawing Sheets

$$F2 = \frac{2\beta T}{di}$$

$$f2 = \frac{2\beta T}{di} \cdot \sin\gamma$$

MOTOR CHARACTERISTIC

MOTOR CHARACTERISTIC

COMPLETE VISCOUS
CHARACTERISTIC

STATIC FRICTION
+
VISCOUS CHARACTERISTIC

RESISTANCE CHARACTERISTIC
(TORQUE LIMIT TYPE)

$$\frac{1}{4} \cdot \frac{1}{3} = \frac{1}{12} \sim \frac{1}{4} \cdot \frac{1}{1} = \frac{1}{4}$$

$$\frac{1}{4} \cdot \frac{1}{3} = \frac{1}{12} \sim \frac{1}{4} \cdot \frac{1}{1} = \frac{1}{4}$$

$$\frac{1}{4} \cdot \frac{1}{4} \cdot \frac{1}{3} \sim \frac{1}{4} \cdot \frac{1}{4} \cdot \frac{1}{1}$$
$$= \frac{1}{48} \sim \frac{1}{16}$$

$$\frac{1}{3} \cdot \frac{1}{3} \sim \frac{1}{3} \cdot \frac{1}{1} \sim \frac{1}{1} \cdot \frac{1}{1}$$
$$= \frac{1}{9} \sim \frac{1}{3} \sim \frac{1}{1}$$

AUTOMATIC SPEED REDUCING RATIO-SWITCHING APPARATUS

BACKGROUND OF THE INVENTION

1. Field of the Invention

The present invention relates to an automatic speed reducing ratio-switching apparatus, which is capable of automatically switching a speed-reducing ratio transmitted from an output shaft, for example, to another member or an apparatus using a planetary gear mechanism when an applied load exceeds a predetermined torque. As described later, the present invention can be applied and utilized extensively in a variety of different fields.

2. Description of the Related Art

A speed reducing ratio-switching mechanism has been hitherto applied, for example, to machine systems such as construction machines. In such machine systems, an electric cylinder is used as an actuator in an expansion/contraction operation system for driving a link mechanism.

In such an electric cylinder, a rotary shaft is connected to an input portion of an electric motor in a casing, and a screw shaft is arranged within the rotary shaft. The screw shaft is screw-engaged with a nut member, which is rotatably supported inside the casing. Two pairs of planetary gear mechanisms, which have different speed reducing ratios, are provided between the rotary shaft and the nut member. Each of the planetary gear mechanisms comprises a sun gear together with planet gears, which are meshed with each of the sun gear and an internal gear provided inside the cylindrical casing and which perform planetary motion. Each of the sun gears connects to the rotary shaft via a one-way clutch, in which the direction of engagement is different, comprising a forward rotation direction and a reverse rotation direction. A planetary support shaft, which rotatably supports the planet gears of each of the planetary gear mechanisms, is connected to the nut member.

In the electric cylinder, when the electric motor is driven and rotated in a forward rotation direction, the rotary shaft is also rotated in the forward rotation direction, whereas the nut member is rotated in the forward rotation direction through the aid of the planetary gear mechanism, which has a small speed reducing ratio, and the screw shaft is operated and moved in an expandable manner. On the other hand, when the electric motor is driven and rotated in a reverse rotation direction, then the rotary shaft is also rotated in the reverse rotation direction, whereas the nut member is rotated in the reverse rotation direction through the aid of the planetary gear mechanism, which has a large speed reducing ratio, and the screw shaft is operated and moved in a contractible manner (see Japanese Laid-Open Patent Publication No. 2003-184982).

However, in the electric cylinder described above, it is necessary to use two types of planetary gear mechanisms, having different speed reducing ratios, in order for the screw shaft to perform expanding and contracting operations. In this case, the number of parts is increased, and the entire electric cylinder is increased in size. When using the planetary gear mechanism of the electric cylinder, as described above, an expanding operation is performed at low speed with a large thrust force, while a contracting operation is performed at high speed with a small thrust force, irrespective of the magnitude of load torque applied to the electric cylinder. Therefore, the movement speed of the screw shaft cannot be increased and performed at a high speed during the expanding operation, even if the load torque applied to the electric cylinder is small.

In view of the above, the present applicant has suggested an automatic speed reducing ratio-switching apparatus, in which it is possible to control torque, and thus to transmit torque at a high speed by automatically switching the speed reducing ratio in response to operation of a displacement member included in the actuator (Japanese Laid-Open Patent Publication No. 2006-22950).

SUMMARY OF THE INVENTION

A general object of the present invention is to provide an automatic speed reducing ratio-switching apparatus, which can be produced conveniently and optimally by persons skilled in the art, by setting, for example, various items such as gears or the like as constitutive parts, and establishing relationships between such constitutive parts.

According to the present invention, helical gears are used to define a sun gear, planet gears, and an internal gear, and further, a viscous resistance member is provided between the internal gear and an inner section of a carrier. Accordingly, when a load, which exceeds a preset torque, is applied to the carrier, the internal gear undergoes parallel displacement in a direction toward an input shaft, or in a direction toward an output shaft, on the basis of a relative difference in rotation speed between the internal gear and the carrier. Accordingly, it is possible to automatically switch the speed-reducing ratio, which is transmitted from the output shaft connected to the carrier to a displacement member of an actuator.

With this arrangement, when a helix angle $\theta$ of the helical gear is set to an angle in excess of 45 degrees, for example, a force causing displacement in the axial direction is applied to the planet gears. End surfaces of the planet gears make contact with the carrier to cause sliding movement. Excessive frictional resistance is allowed to act between the planet gears and the carrier, and the rotation of the planet gears is stopped. On the other hand, if the helix angle $\theta$ of the helical gear is set so as to be less than 25 degrees, then a force (thrust force) that acts to displace the internal gear in the axial direction is weakened, and response sensitivity (response speed) of the internal gear is deteriorated.

As a result, according to the present invention, it is appropriate that the helical gears, which make up the sun gear, the planet gears, and the internal gear, have the helix angle $\theta$ of not less than 25 degrees and not more than 45 degrees.

According to the present invention, a rising angle $\gamma$ of a pawl is set to satisfy a relational expression in which $0 \leq \tan \gamma < (\eta \cdot di)/\{dp \cdot \tan(90-\alpha)\}$. Accordingly, the height 10 of the pawl can be set appropriately, whereby excessive abrasion of the pawl and breakage of the root portion of the pawl can be avoided.

Further, according to the present invention, a crushing or deformation amount of a ring is appropriately set so as to be not less than 0.5% and not more than 1.5%, for the following reason. That is, if the deformation amount of the ring, which functions as a second seal mechanism, exceeds 1.5%, then rotational resistance increases excessively, and the efficiency of the entire gear is lowered. On the other hand, if the deformation amount is less than 0.5%, then the sealing function thereof is lowered, and grease leaks.

Further, according to the present invention, when lock sections abut against lock receiving sections of the internal gear, a cylindrical member, which includes such lock sections, is rotated between a first bearing and a second bearing. Accordingly, an impact exerted upon abutment thereof can be buffered, making it possible to suppress abutment sounds as thoroughly as possible.

Moreover, according to the present invention, various items such as gears or the like, which make up constitutive parts of the apparatus, and the relationships between such constitutive parts, are established as described above. Accordingly, the apparatus can be produced conveniently and optimally by persons skilled in the art.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
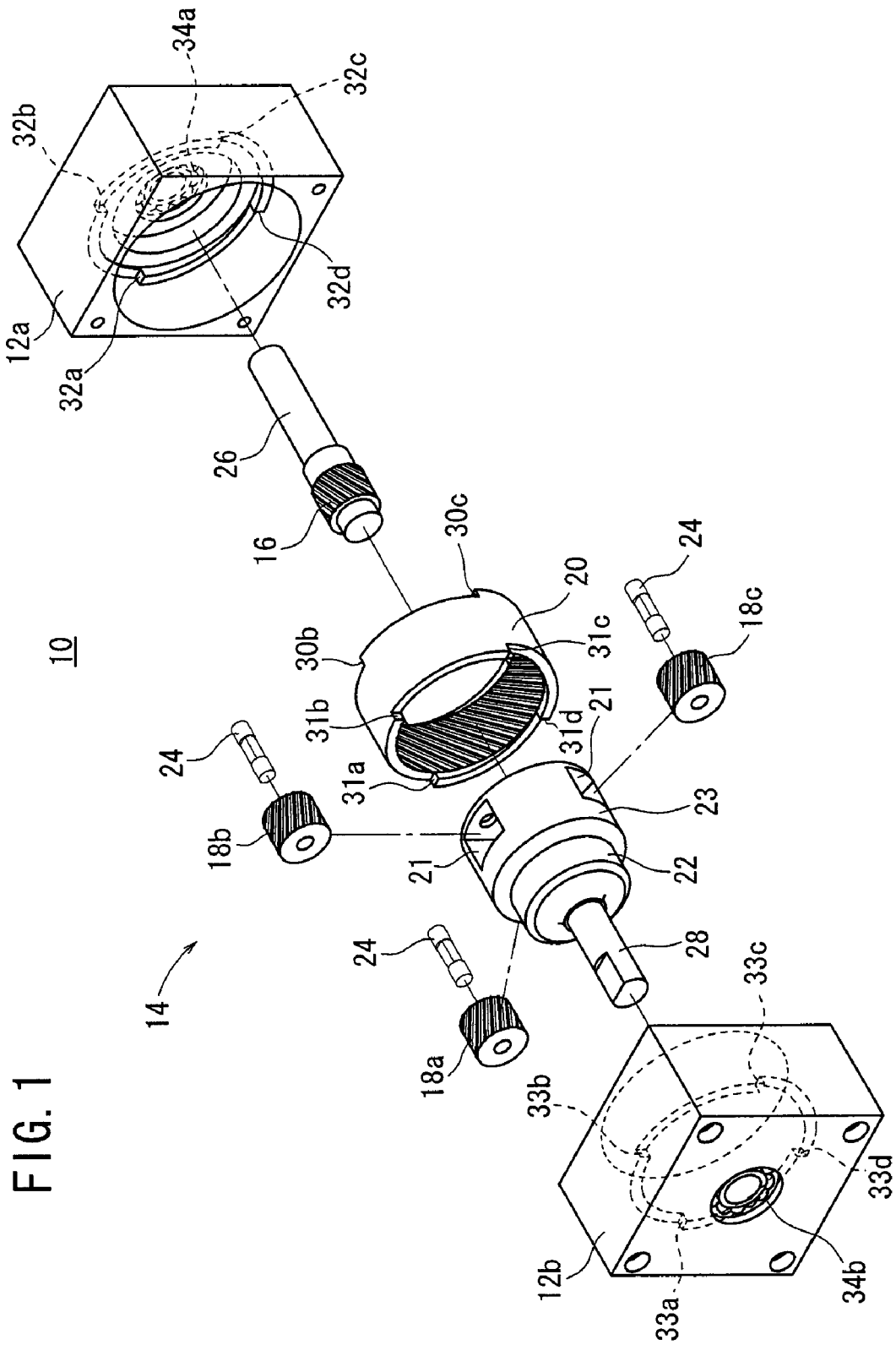
FIG. 1 is an exploded perspective view illustrating an automatic speed reducing ratio-switching apparatus according to a reference example of the present invention.

FIG. 1 shows an exploded perspective view illustrating an automatic speed reducing ratio-switching apparatus according to a reference example of the present invention. As shown in FIG. 1, the automatic speed reducing ratio-switching apparatus 10 according to the reference example comprises housings 12a, 12b, which are divided into two parts, and a planetary gear mechanism 14.

The housing 12a is rectangular in cross section. Lock sections 32a to 32d comprising circular arc-shaped projections, which engage with internal gear lock receiving sections 30a to 30d when an internal gear 20 is displaced in parallel in a direction toward an input shaft 26 (as described later on), are formed on an inner side of the housing 12a. Further, the housing 12a includes a bearing section 34a for rotatably supporting the input shaft 26.

The housing 12b is rectangular in cross section, in the same manner as the housing 12a. Lock sections 33a to 33d comprising circular arc-shaped projections, which engage with internal gear lock receiving sections 31a to 31d when the internal gear 20 is displaced in parallel in a direction toward an output shaft 28 (as described later on), are formed on an inner side of the housing 12b. Further, the housing 12b includes a bearing section 34b for rotatably supporting the output shaft 28.

The planetary gear mechanism 14 comprises a sun gear 16 formed integrally with the input shaft 26, planet gears 18a, 18b, 18c, which are meshed yet separated from each other by angles of about 120 degrees in the circumferential direction of the sun gear 16 and which are both subjected to revolution and rotation, the internal gear 20, and a carrier 22.

The carrier 22 includes a cylindrical large diameter inner section 23 and the output shaft 28, which protrudes from the inner section 23 while being directed toward the housing 12b. The sun gear 16 is inserted so as to face the interior of the inner section 23. Windows 21, which are separated from each other at equal angles of 120 degrees respectively, are formed in the inner section 23, so that each of the planet gears 18a, 18b, 18c face the windows 21.

Figure 3A:
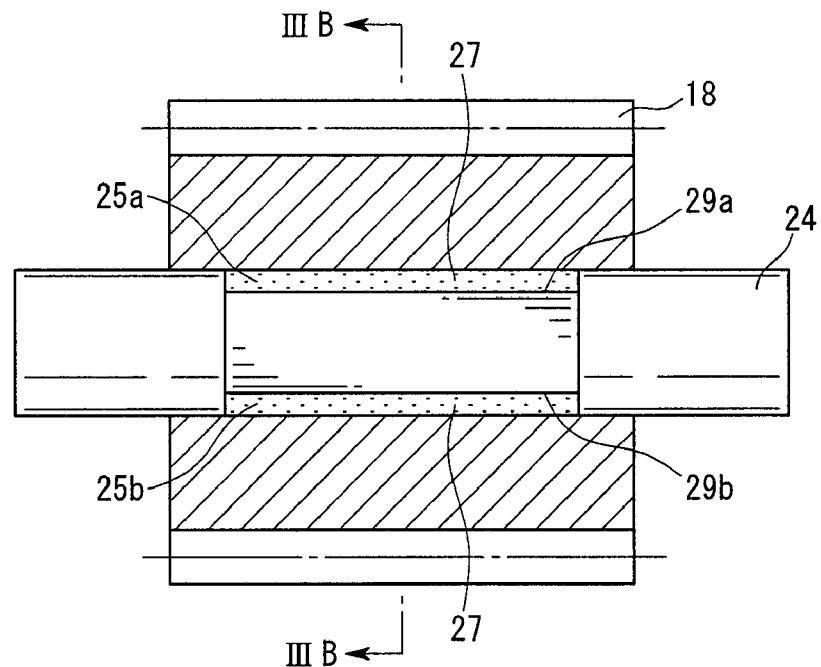
FIG. 3A is a longitudinal sectional view illustrating a planet gear, making up part of the automatic speed reducing ratio-switching apparatus shown in FIG. 1.
Figure 3B:
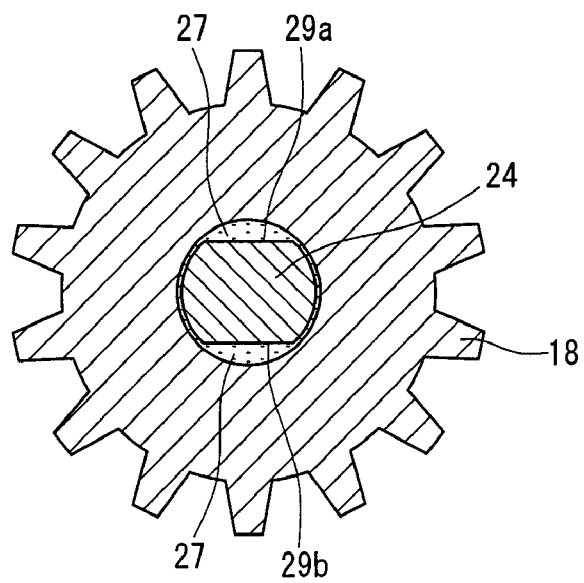
FIG. 3B is a lateral sectional view taken along line IIIB-IIIB shown in FIG. 3A.
Figure 4:
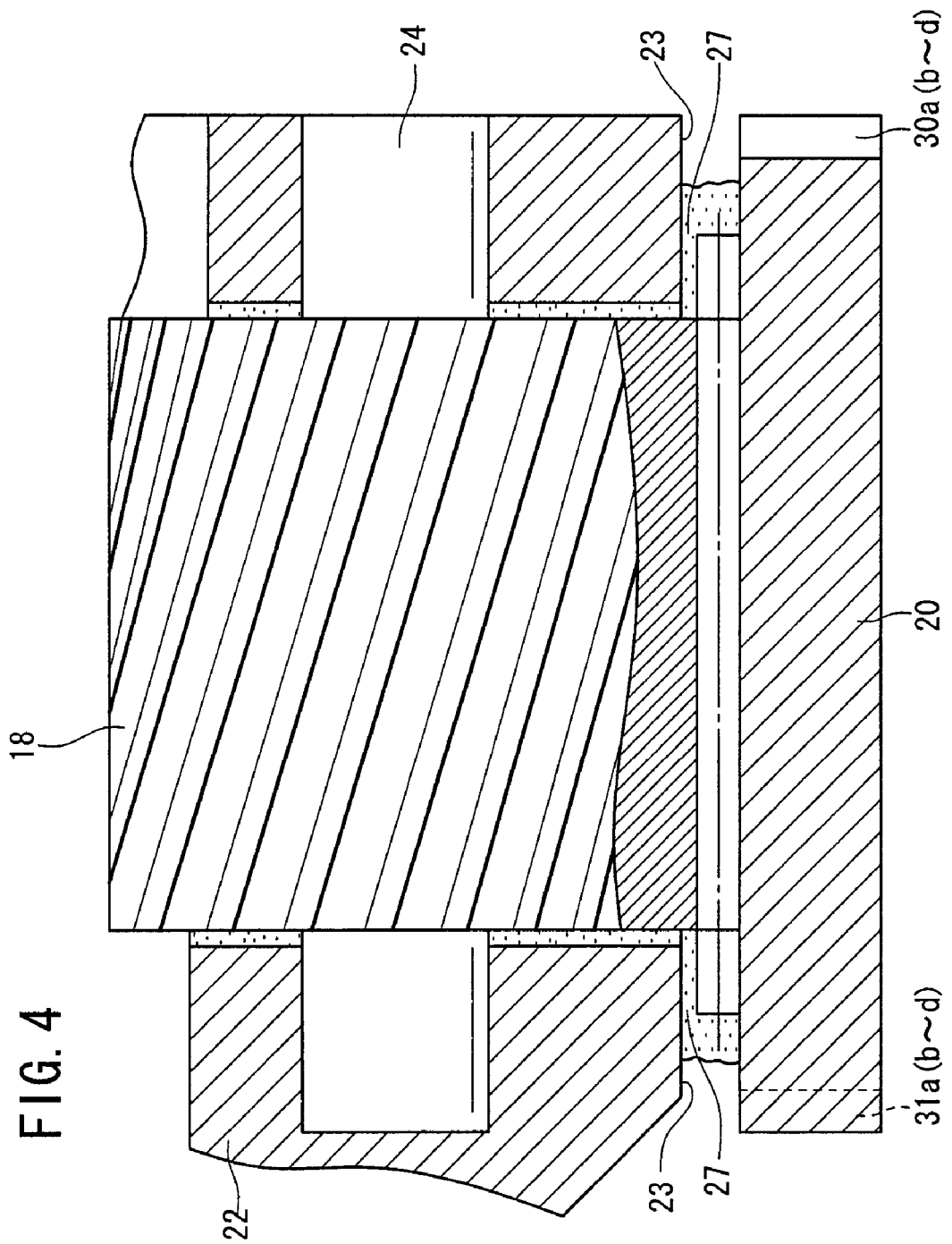
FIG. 4 is a partial magnified longitudinal sectional view illustrating a meshed portion between the planet gear and an internal gear.

In this embodiment, the planet gears 18a, 18b, 18c are rotatably supported by the carrier 22 using pins 24. As shown in FIGS. 3A and 3B, the pins 24 are provided with cutouts 29a, 29b formed by cutting out portions of the outer circumference thereof. Clearances 25a, 25b are provided between the planet gears 18a, 18b, 18c and the pin 24 due to the cutouts 29a, 29b. The clearances 25a, 25b may be filled, for example, with oil or grease. It is preferable that such oil or grease has a high viscosity. The large diameter internal gear 20 is meshed on outer circumferential sides of the planet gears 18a, 18b, 18c, which are in turn meshed with inner teeth engraved on the inner circumference of the internal gear 20. The input shaft 26, which is formed integrally with the sun gear 16, is connected to the rotary driving shaft of an unillustrated rotary driving source, via a coupling member (not shown). As clearly and easily appreciated from FIG. 1, in this arrangement, the input shaft 26 and the output shaft 28 are disposed coaxially.

The sun gear 16, the planet gears 18a, 18b, 18c, and the internal gear 20 are composed respectively of helical gears. In this embodiment, for example, oil or grease having a high viscosity is charged or applied to interstices between the planet gears 18a, 18b, 18c and the inner section 23 of the carrier 22, as well as between the planet gears 18a, 18b, 18c and the internal gear 20, in order to provide a viscous resistance therebetween.

Figure 14:
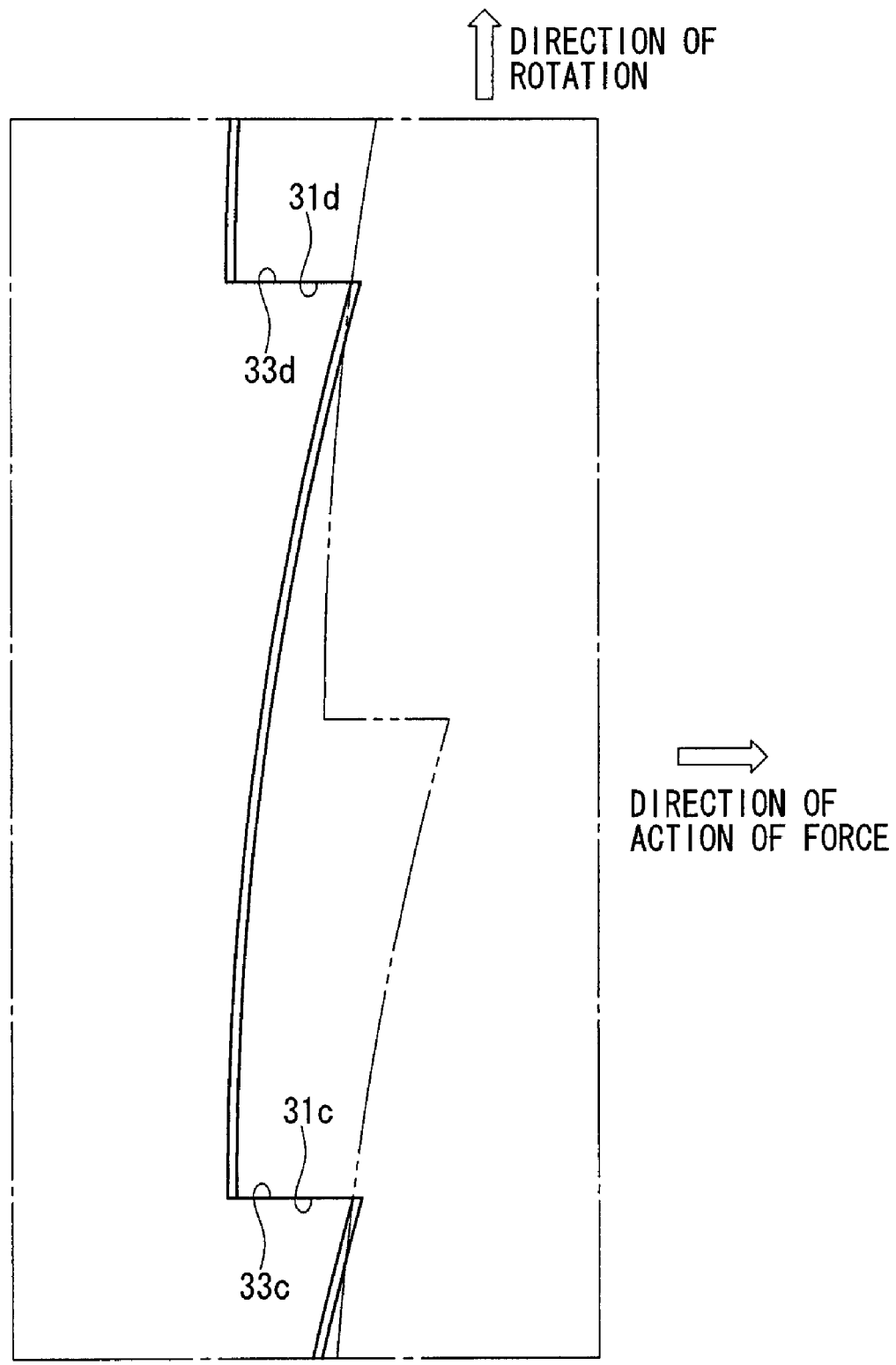
FIG. 14 is a magnified view illustrating a portion at which an internal gear clutch and a lock section are meshed with each other, with reference to FIG. 8.

A plurality of internal gear lock receiving sections 30a to 30d and 31a to 31d, which protrude with a curved configuration respectively, are formed at ends of the cylindrical shape of the internal gear 20. As shown in FIG. 14, the internal gear lock receiving sections 30a to 30d and 31a to 31d have projecting shapes, which define curves in the circumferential direction, corresponding to the lock sections 32a to 32d and 33a to 33d. The internal gear lock receiving sections 30a to 30d and 31a to 31d, together with the lock sections 32a to 32d and 33a to 33d, function as an internal gear lock mechanism.

When assembling the input shaft 26, the internal gear 20, and the carrier 22, which are constructed as described above, the input shaft 26 is initially inserted into the bearing section 34a of the housing 12a, the output shaft 28 is inserted into the bearing section 34b of the housing 12b, and the internal gear 20 is fitted onto the outer side of the carrier 22.

The housing 12a and the housing 12b are joined to one another so that the sun gear 16 of the input shaft 26 meshes with the planet gears 18a, 18b, 18c, whereupon the housings 12a, 12b are screw-fastened to one another. Accordingly, the planetary gear mechanism 14 is accommodated within the housings 12a, 12b (see FIG. 5).

Figure 2:
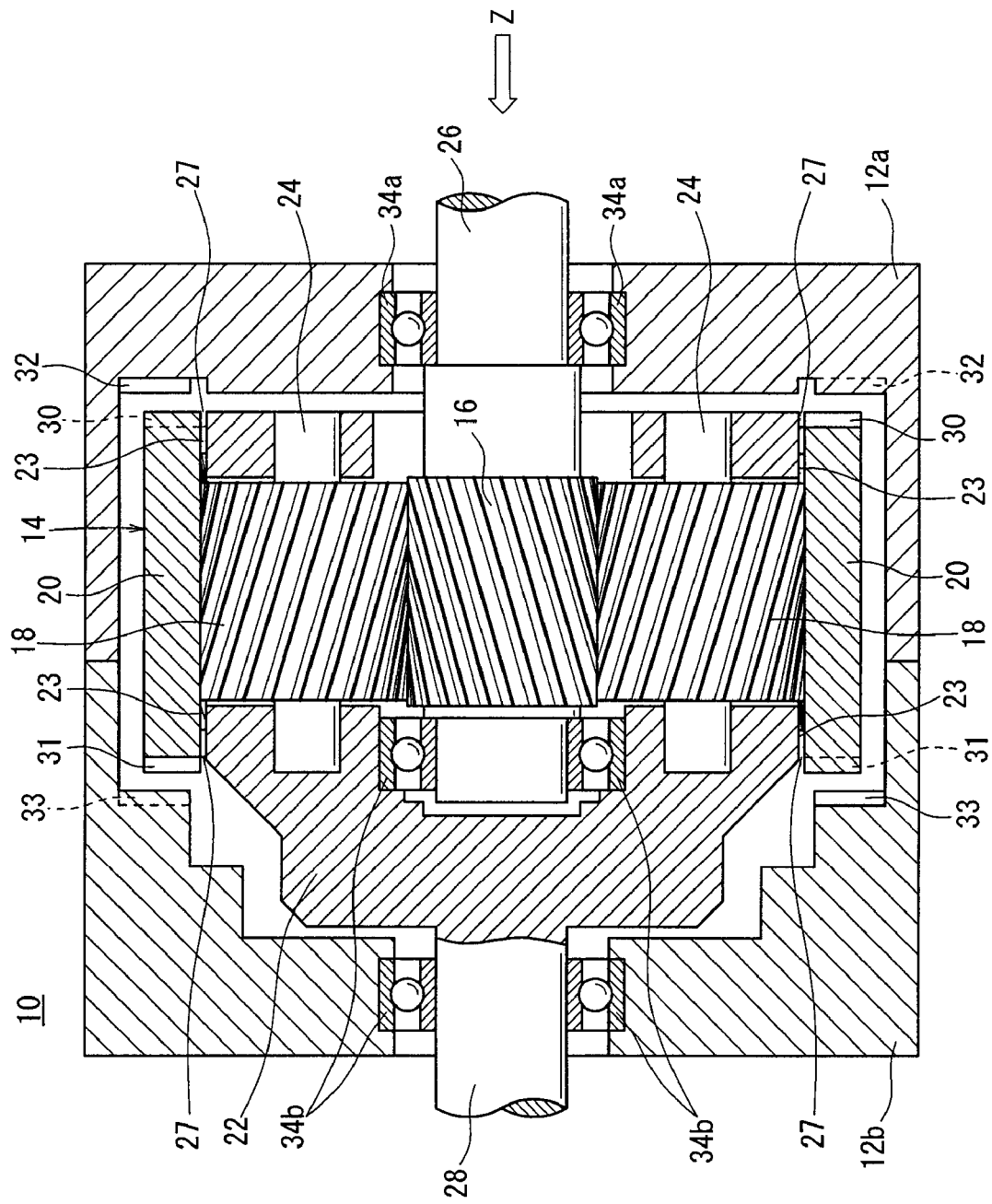
FIG. 2 is a longitudinal sectional view taken in the axial direction illustrating the automatic speed reducing ratio-switching apparatus according to the reference example of the present invention.

Next, an explanation shall be given concerning operation of the automatic speed reducing ratio-switching apparatus 10 according to the reference example. At first, the unillustrated rotary driving source is energized, whereby a rotary driving force of the rotary driving source is transmitted via the input shaft 26 to the sun gear 16. It shall be assumed that the rotary driving force rotates the input shaft 26 and the sun gear 16 in a clockwise direction, as viewed in an orientation directed from the input shaft 26 toward the output shaft 28 (i.e., the direction of the arrow Z as shown in FIG. 2).

When the rotational force at a low load is transmitted to the input shaft 26, the planet gears 18a, 18b, 18c undergo revolutions (indicated by the meshed arrow, and similarly indicated in the following descriptions as well) without being rotated. The internal gear 20 also undergoes revolutions in the direction of the arrow (indicated by the bold arrow, and similarly indicated in the following descriptions as well), whereas the carrier 22 also undergoes revolutions in an integrated manner in the clockwise direction (see FIG. 6) owing to the fact that a viscous resistance member is used between the sun gear 16, the planet gears 18a, 18b, 18c, the inner section 23, and the internal gear 20, and hence a static frictional force is exerted as a result of viscous resistance produced by the viscous resistance member.

Figure 6:
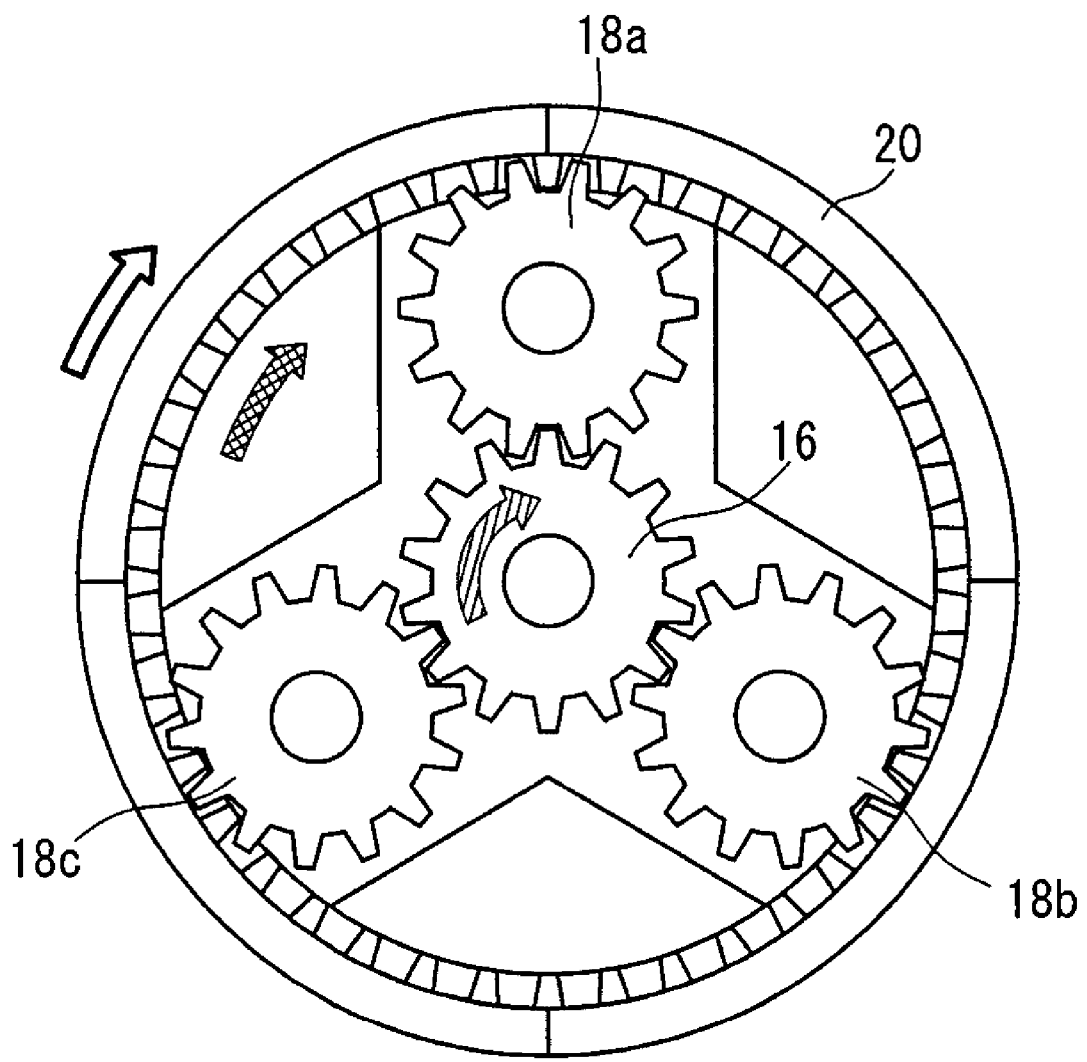
FIG. 6 is a side view illustrating a sun gear, the planet gears, and the internal gear, in a state of high speed rotation.

That is, with reference to FIG. 6, because of low rotation, when the sun gear 16 is rotated in the direction of the arrow (indicated by the hatched arrow, and similarly indicated in the following descriptions as well), a static frictional force is exerted by the viscous resistance member between the inner section 23 and the internal gear 20. Consequently, the inner section 23, the internal gear 20, the planet gears 18a, 18b, 18c, and the sun gear 16 are rotated in an integrated manner.

Figure 7:
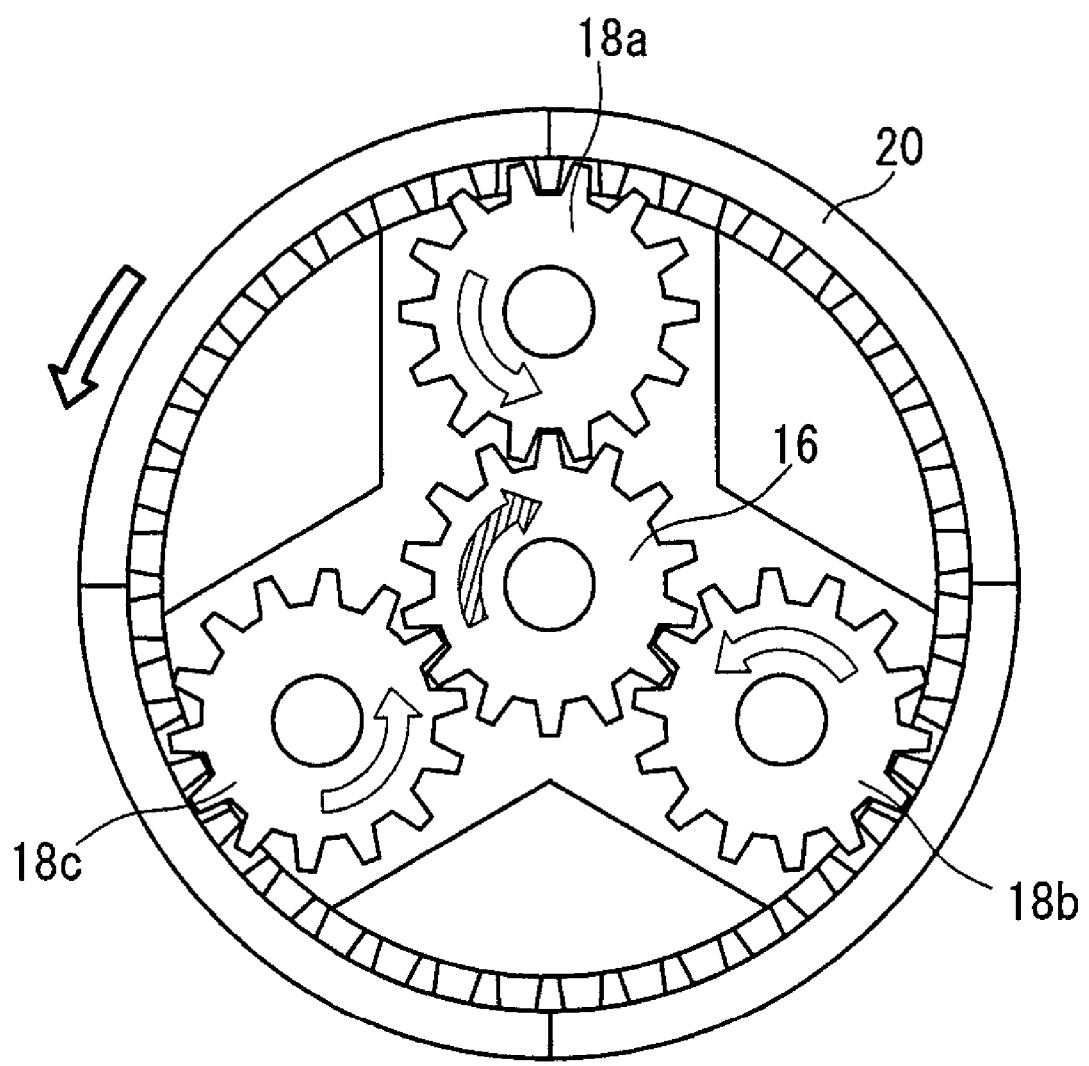
FIG. 7 is a side view illustrating the sun gear, the planet gears, and the internal gear, when a load in excess of a preset torque is applied to a carrier.

Subsequently, when a load, which exceeds a preset torque, is applied to the carrier 22 via the output shaft 28, the sun gear 16 is rotated, however, the planet gears 18 make no revolutions but are rotated thereby in a counterclockwise direction (direction of the blank arrow), opposite to the direction of the sun gear 16. Further, the internal gear 20, which is meshed with the planet gears 18, is rotated in a counterclockwise direction (see FIG. 7).

Figure 8:
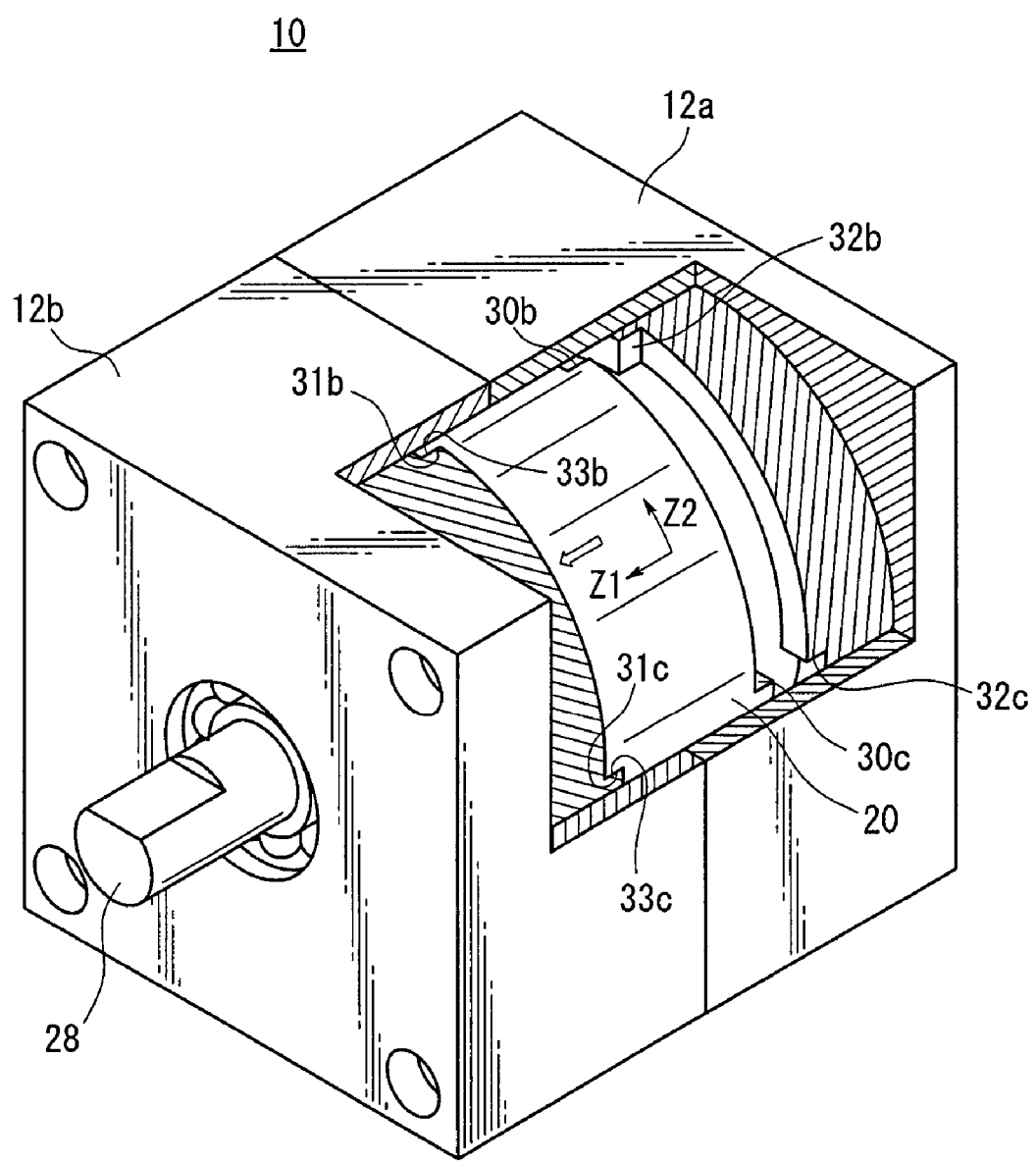
FIG. 8 is, with partial cutout, a perspective view illustrating a locked state of the automatic speed reducing ratio-switching apparatus according to the reference example of the present invention.

That is, when the rotation speed is lowered by a load applied to the output shaft 28, the rotation speed of the carrier 22 formed integrally with the output shaft 28 is also lowered. However, the internal gear 20 expects to make rotation exactly as it was. In other words, the rotation speed of the internal gear 20 is larger than the rotation speed of the carrier 22. Therefore, viscous resistance is increased between the internal gear 20 and the carrier 22. Since the viscous resistance is increased, a thrust force is generated in the direction of the teeth stripes, and the internal gear 20 is moved in the direction of the arrow Z1, as shown in FIG. 8, since the planet gears 18a, 18b, 18c and the internal gear 20 meshed therewith are helical gears.

Figure 9:
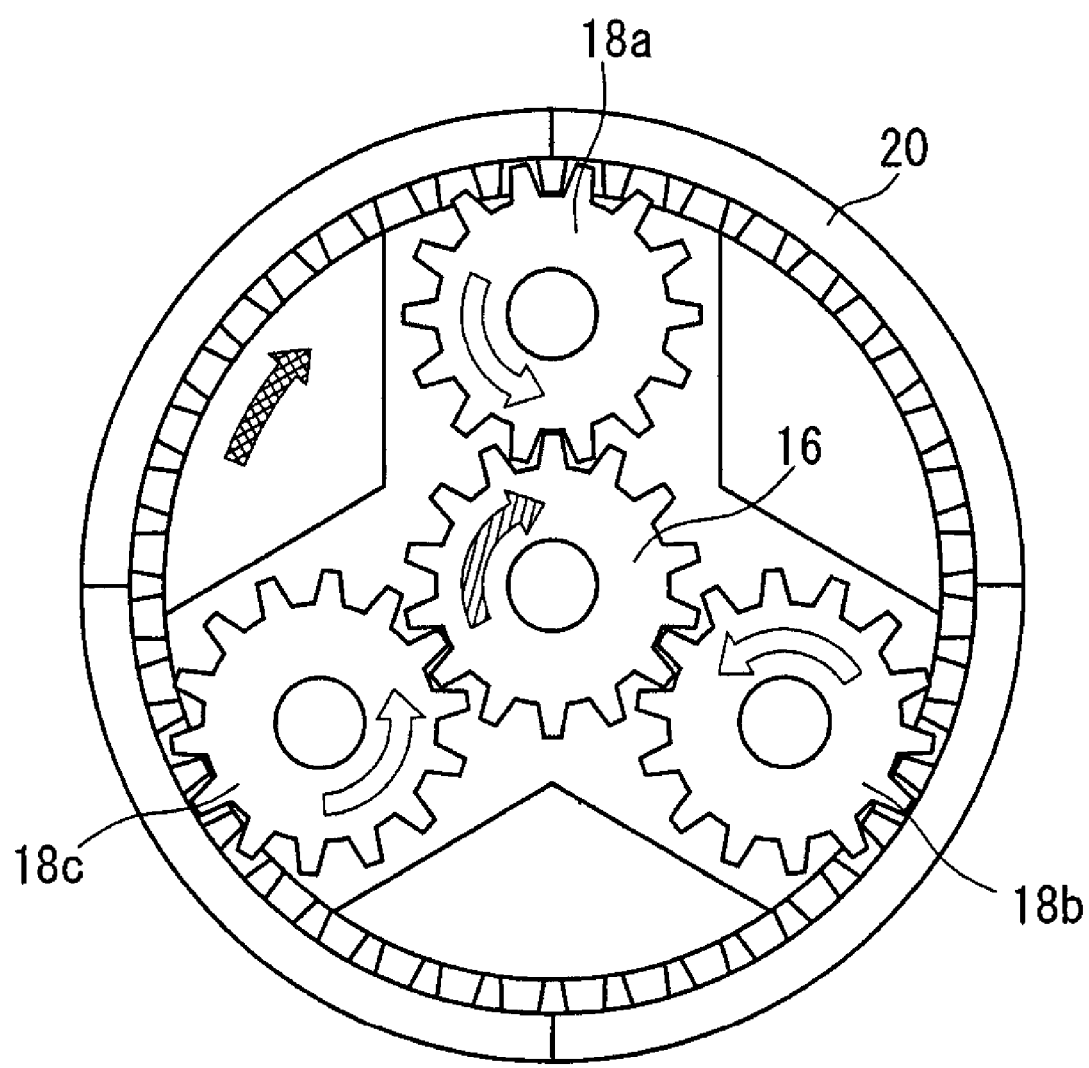
FIG. 9 is a side view illustrating the sun gear, the planet gears, and the internal gear in the above-described locked state.

As a result, the internal gear lock receiving section 31b meshes with the lock section 33b, and the internal gear lock receiving section 31c meshes with the lock section 33c. The internal gear 20 is in a locked state, making any further movement thereof impossible. When the internal gear 20 is in a locked state, then the sun gear 16 rotates in the direction of the hatched arrow shown in FIG. 6, and thus the planet gears 18a, 18b, 18c undergo revolutions together with the carrier 22 (see FIG. 9), while rotating in a counterclockwise direction and transmitting a decelerated rotation speed and increased torque to the output shaft 28. In this situation, the torque is defined by a force corresponding to the gear ratio between the planet gears 18a, 18b, 18c and the internal gear 20.

Figure 10:
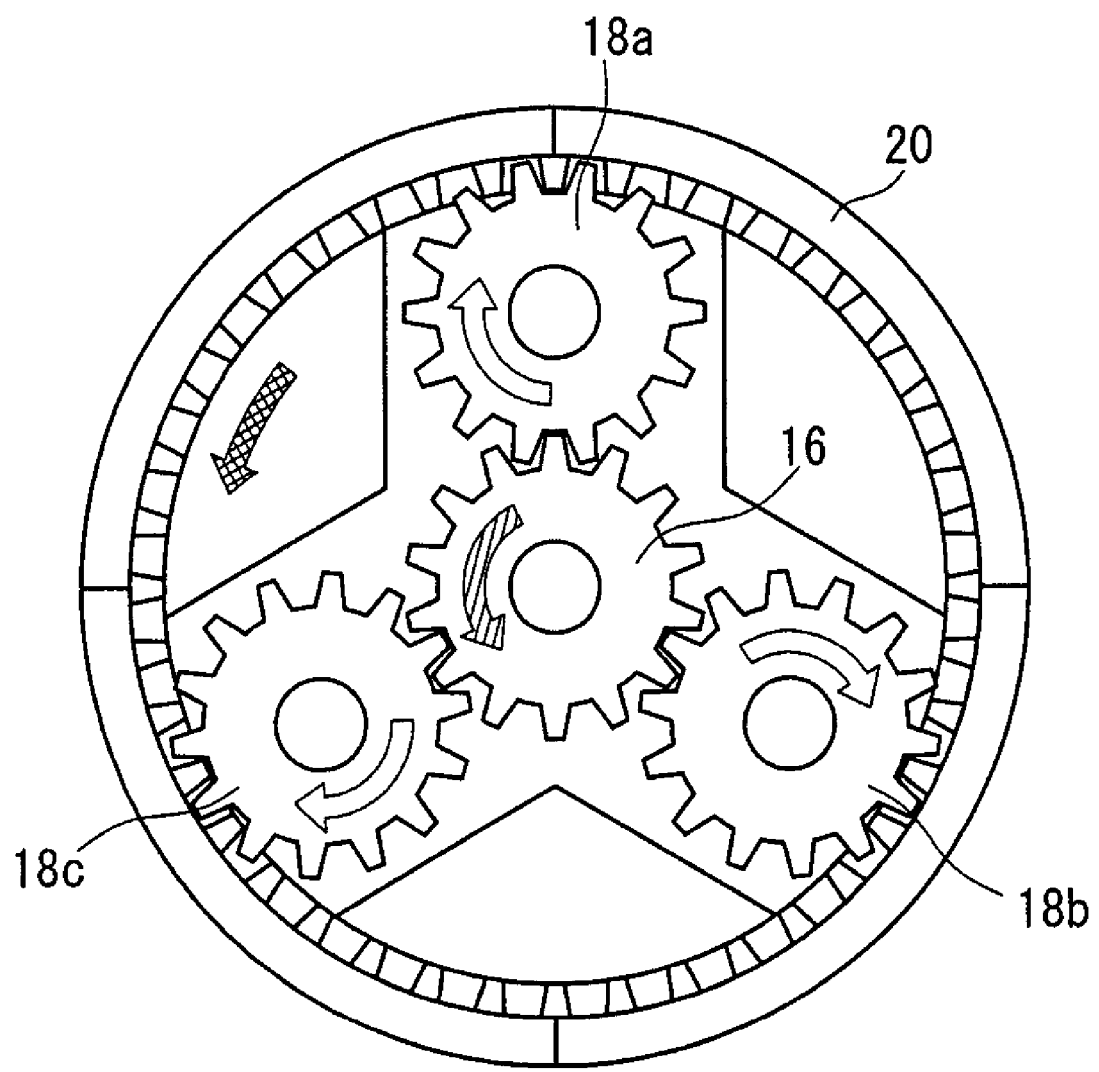
FIG. 10 is a side view illustrating the sun gear, the planet gears, and the internal gear immediately after reversing the sun gear.

Subsequently, the rotary driving direction is reversed in order to release the internal gear 20 from the locked state. That is, the sun gear 16 is rotated in a counterclockwise direction through the aid of the input shaft 26. As a result, as shown in FIG. 10, the planet gears 18a, 18b, 18c undergo revolutions in the counterclockwise direction together with the carrier 22 while rotating in a clockwise direction, in accordance with the rotation of the sun gear 16 (see FIG. 10).

The internal gear 20 is placed in a locked state, i.e., in a stopped state, immediately after the sun gear 16 starts rotating in the counterclockwise direction. Therefore, a difference in the number of relative rotations occurs between the carrier 22 and the internal gear 20, and thus viscous resistance is increased between the internal gear 20 and the inner section 23. Owing to increases in viscous resistance between the internal gear 20 and the inner section 23, and since the planet gears 18a, 18b, 18c and the internal gear 20 are helical gears, a thrust force is generated in the direction of the teeth stripes formed helically on the cylindrical surfaces of the gears.

The thrust force causes the internal gear 20 to undergo parallel displacement in a direction opposite to the Z1 direction. The internal gear 20 is displaced in parallel in the direction opposite to Z1, while being rotated in a clockwise direction. Further, the internal gear lock receiving sections 30 of the internal gear 20 are separated from the lock sections 32 of the housing 12b, and the internal gear 20 is released from the locked state.

Figure 5:
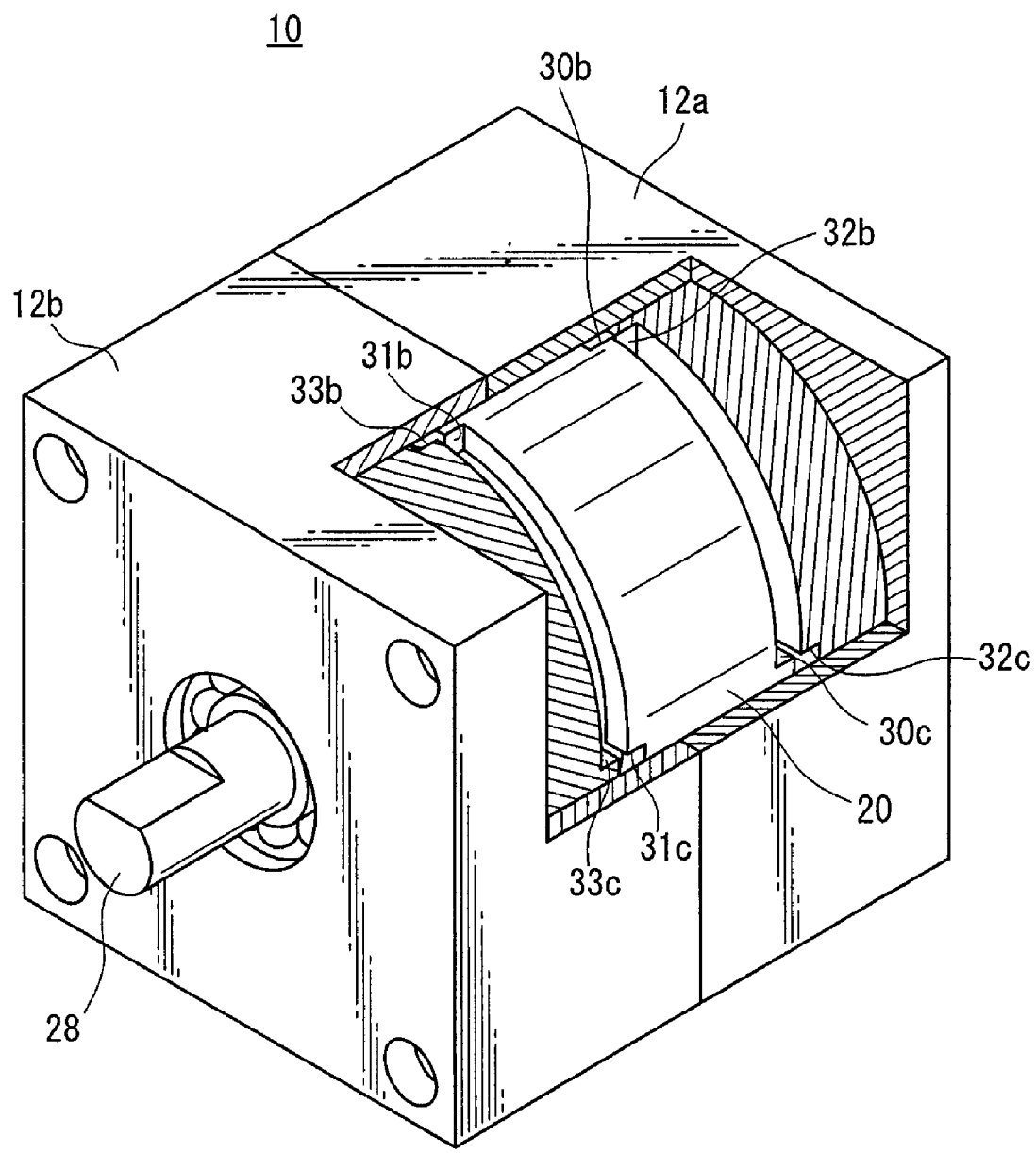
FIG. 5 is, with partial cutout, a perspective view illustrating the automatic speed reducing ratio-switching apparatus according to the reference example of the present invention.
Figure 11:
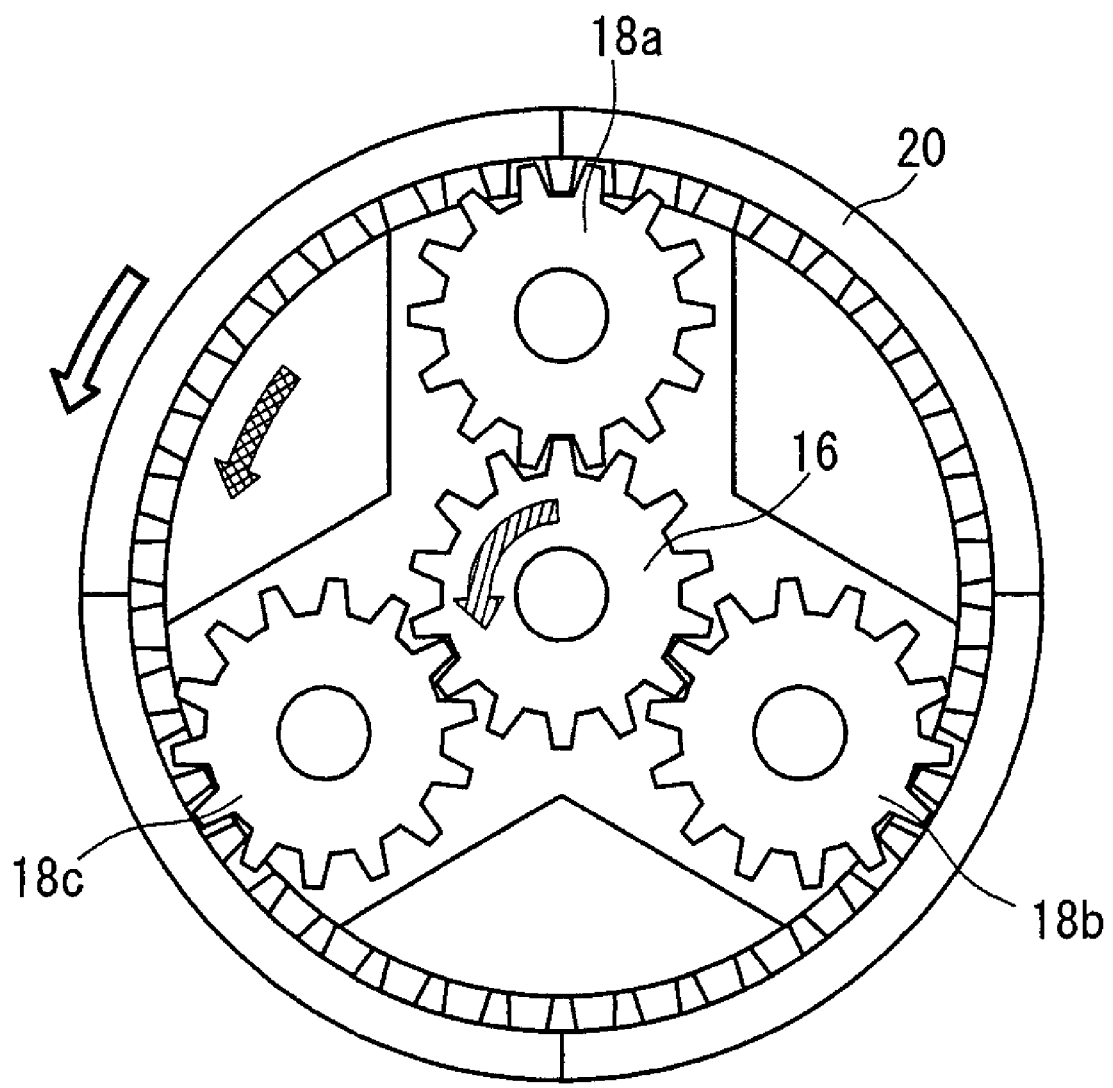
FIG. 11 is a side view illustrating the sun gear, the planet gears, and the internal gear, in a state in which the sun gear is reversed and rotated at a high speed.

As described above, when the internal gear 20 is released from the locked state, the planet gears 18a, 18b, 18c, the internal gear 20, and the carrier 22 undergo revolutions in a counterclockwise direction around the sun gear 16, in an integrated manner again in conformity with the rotation of the sun gear 16 in the counterclockwise direction (see FIG. 11), thereby restoring the initial position shown in FIG. 5. That is, when the sun gear 16 is rotated at a high speed in the counterclockwise direction, after the internal gear 20 has been released from the locked state, the planet gears 18a, 18b, 18c undergo revolutions in the counterclockwise direction, without causing rotation thereof, while the internal gear 20 undergoes rotations in the counterclockwise direction as well.

The foregoing case is illustrative of a state in which the input shaft 26 and the sun gear 16 are rotated in a clockwise direction. However, the same or equivalent operations and effects can also be achieved when the input shaft 26 and the sun gear 16 are rotated in a counterclockwise direction.

Figure 12:
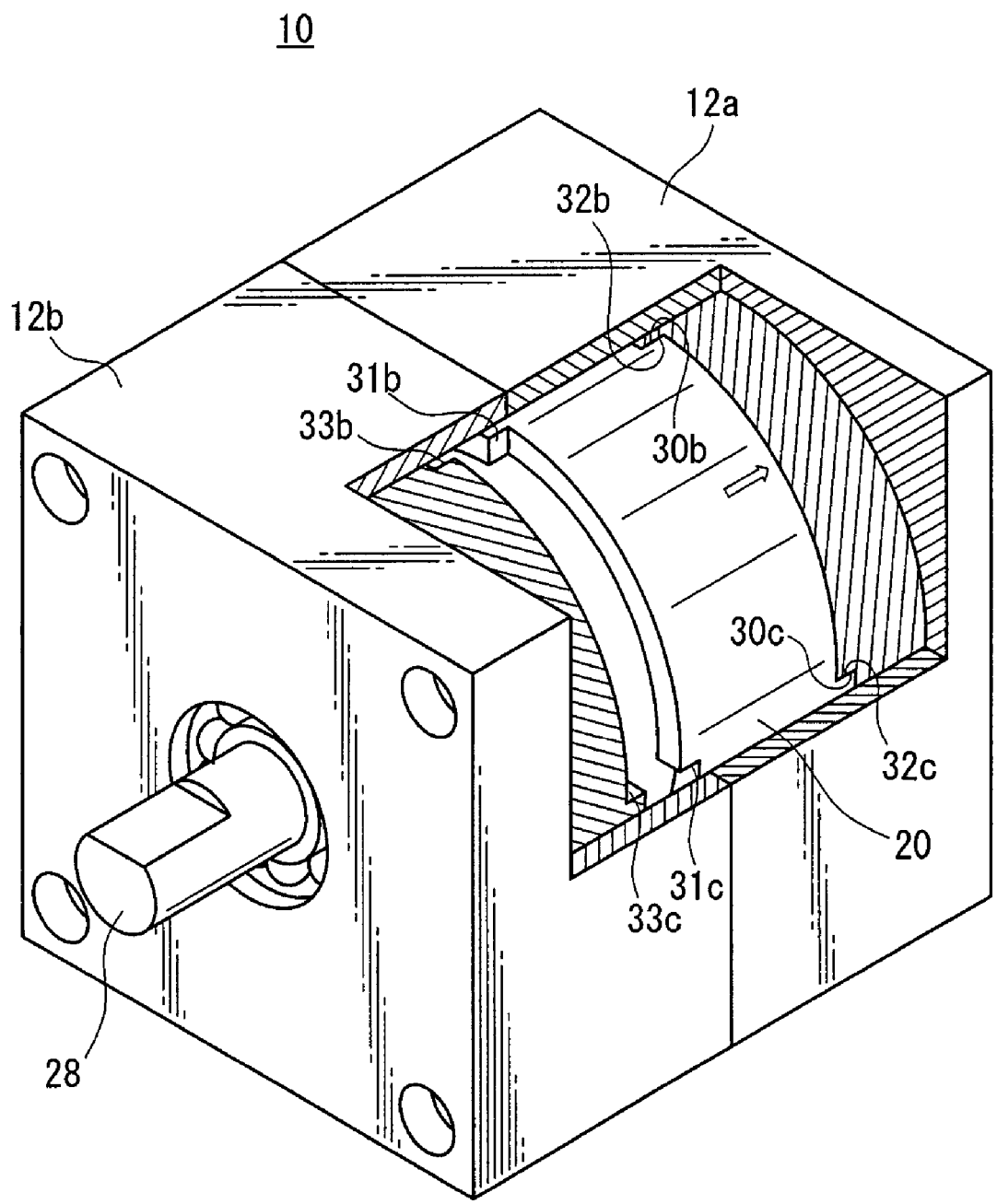
FIG. 12 is, with partial cutout, a perspective view illustrating the locked state of the automatic speed reducing ratio-switching apparatus, according to the reference example of the present invention.

That is, in this state, when the input shaft 26 and the sun gear 16 are rotated in a counterclockwise direction, and a load in excess of a preset torque is applied to the carrier 22 via the output shaft 28, then the internal gear lock receiving section 30b meshes with the lock section 32b, the internal gear lock section 30c meshes with the lock section 32c, and the internal gear 20 is placed in a locked state as shown in FIG. 12.

Further, when the rotary driving force is reversed in order to rotate the sun gear 16 in a clockwise direction through the aid of the input shaft 26, the internal gear 20 is released from the locked state, thereby restoring the initial state shown in FIG. 5.

On the other hand, when the internal gear 20 is in a locked state, as shown in FIG. 8, the internal gear 20 can be released from the locked state by decreasing the load applied to the output shaft 28.

Figure 13:
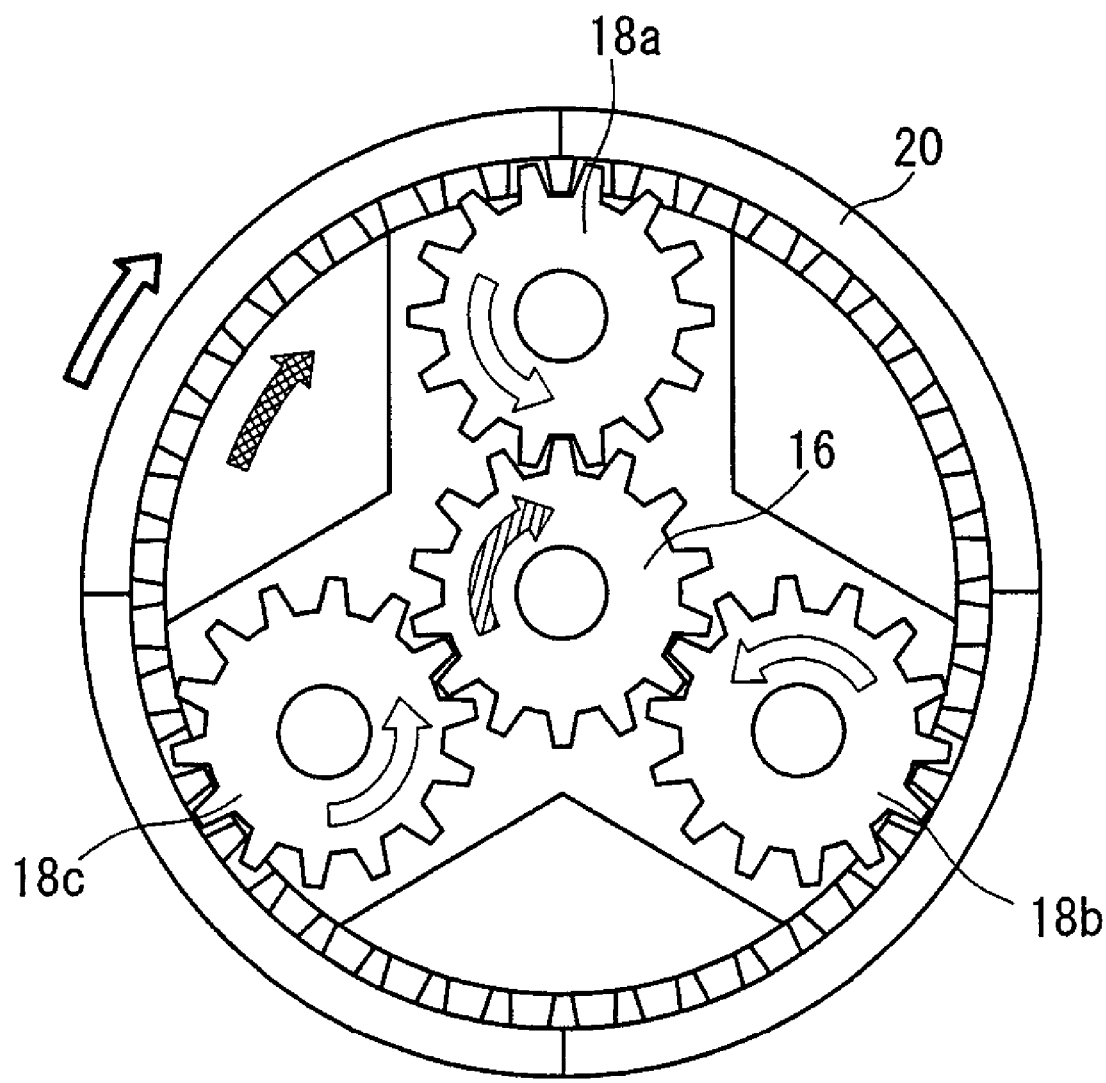
FIG. 13 is a side view illustrating directions of rotation of the sun gear, the planet gears, and the internal gear, in a state in which a load on the output shaft is decreased, with reference to FIG. 8.

That is, when the load on the output shaft 28 is decreased, the planet gears 18a, 18b, 18c undergo revolutions in the clockwise direction together with the carrier 22, while being rotated in a counterclockwise direction in accordance with the rotation of the sun gear 16 in the clockwise direction. Further, the internal gear 20, which is meshed with the planet gears 18a, 18b, 18c, also is rotated in the clockwise direction (see FIG. 13).

In this state, the rotation speed of the internal gear 20 becomes smaller than the rotation speed of the carrier 22 due to the viscous resistance member disposed between the internal gear 20 and the inner section 23, thus resulting in a difference in the number of relative rotations between the carrier 22 and the internal gear 20. As a result, viscous resistance is increased between the internal gear 20 and the inner section 23. Due to the fact that viscous resistance is increased between the internal gear 20 and the inner section 23, and since the planet gears 18a, 18b, 18c and the internal gear 20 are helical gears, a thrust force is generated in the direction of the teeth stripes, which are formed helically on the cylindrical surfaces of the gears.

Further, as shown in FIG. 14, each of the internal gear lock receiving section 31c and the lock section 33c has a shape wherein a curve is defined in the circumferential direction thereof. Therefore, when the internal gear 20 rotates in the clockwise direction, a force is exerted together with the thrust force in a direction opposite to the Z1 direction, and the internal gear 20 is displaced in parallel. That is, the internal gear 20 is displaced in parallel in a direction opposite to the Z1 direction, while rotating in a clockwise direction, whereupon the internal gear lock receiving sections 31a to 31d are separated from the lock sections 33a to 33d and the internal gear 20 is released from the locked state.

In the automatic speed reducing ratio-switching apparatus 10 according to the reference example, helical gears are used for the sun gear 16, the planet gears 18, and the internal gear 20, wherein a viscous resistance member is provided between the internal gear 20 and the inner section 23 provided in the carrier 22. Accordingly, when a load, which exceeds a preset torque, is applied to the carrier 22, the internal gear 20 is displaced in parallel in a direction toward the input shaft 26, or in a direction toward the output shaft 28, on the basis of the difference in relative rotational speeds between the internal gear 20 and the carrier 22. Thus, it is possible to automatically switch the speed reducing ratio, which is transmitted from the output shaft 28 to the displacement member of the actuator.

When the displacement member of the actuator is stopped in an outgoing route, and the displacement member is displaced again in a direction along the outgoing route, then the internal gear 20 can also be released from the locked state with ease, and the speed reducing ratio can automatically be changed. Further, the displacement member of the actuator can be displaced along the outgoing route at a low torque and high speed.

It is a matter of course that the actuator may include various actuators including, for example, linear actuators and rotary actuators.

Figure 15:
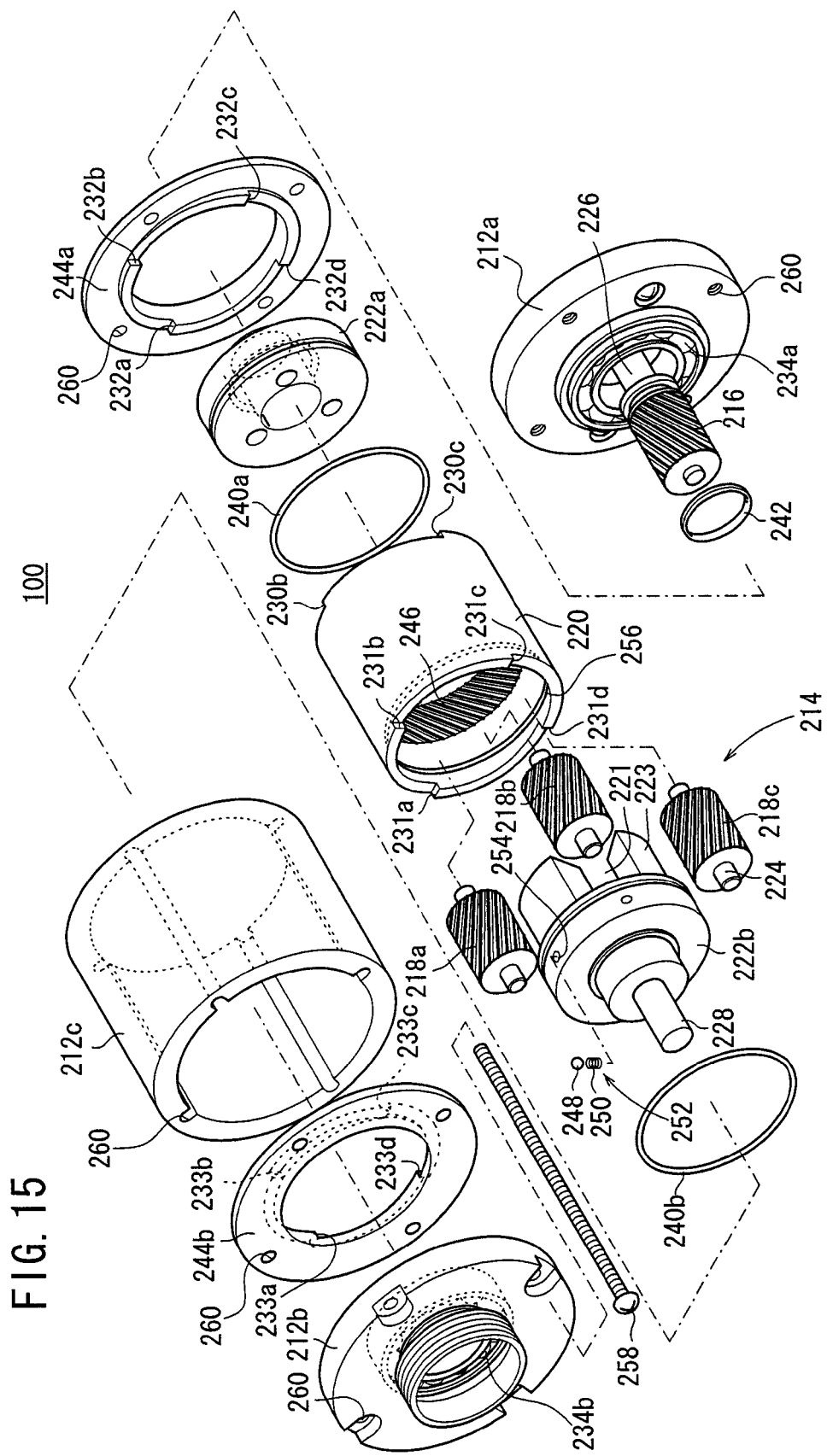
FIG. 15 is an exploded perspective view illustrating an automatic speed reducing ratio-switching apparatus according to an embodiment of the present invention.
Figure 16:
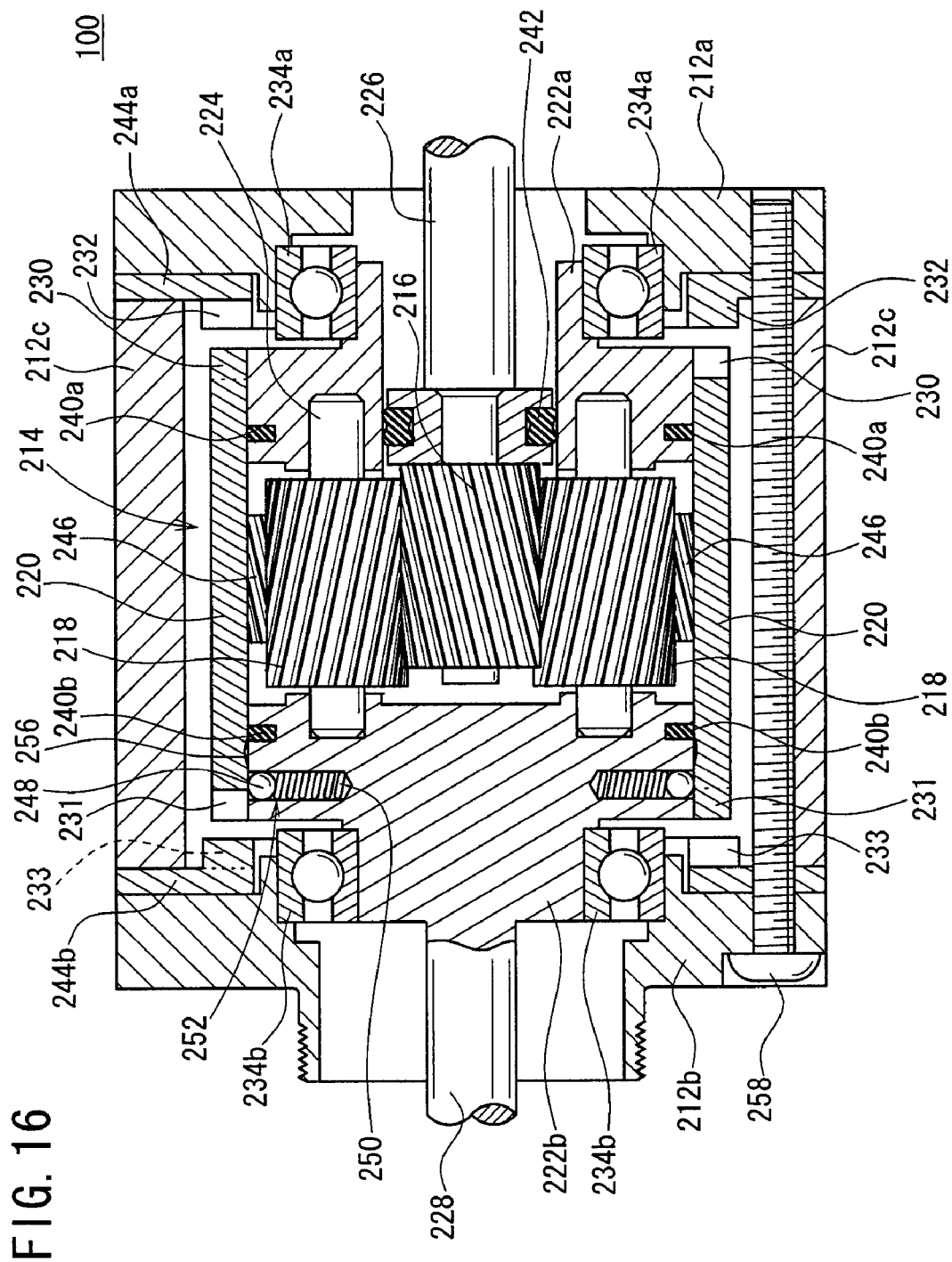
FIG. 16 is a longitudinal sectional view illustrating the automatic speed reducing ratio-switching apparatus according to the embodiment of the present invention.

Next, an automatic speed reducing ratio-switching apparatus 100 according to an embodiment of the present invention is shown in FIGS. 15 and 16.

The automatic speed reducing ratio-switching apparatus 100 differs from the above-described automatic speed reducing ratio-switching apparatus 10 according to the reference example in the following features. That is, the housings 12a, 12b are constructed instead by housings 212a, 212b and 212c, which are separated into three parts. The carriers 22 are constructed instead by a pair of carriers 222a and 222b. A pair of O-rings 240a, 240b and an input shaft ring 242 are provided in a planetary gear mechanism 214. The lock sections 32a to 32d, which were formed in the housing 12a, are provided instead as lock sections 232a to 232d on a lock plate 244a, and the lock sections 33a to 33d, which were formed in the housing 12b, are provided instead as lock sections 233a to 233d on a lock plate 244b.

The first housing 212a is annular in shape, and is provided with a bearing section 234a, which rotatably supports an input shaft 226. The second housing 212b is annular, in the same manner as the first housing 212a, and is provided with a bearing section 234b, which rotatably supports an output shaft 228. The third housing 212c is cylindrical in shape, and is interposed between the first housing 212a and the second housing 212b.

The lock plate 244a is annular in shape, and is provided with lock sections 232a to 232d composed of circular arc-shaped projections, so that the lock sections 232a to 232d are opposed to one another and engage with internal gear lock receiving sections 230a to 230d when the internal gear 220 is displaced in parallel in a direction toward the input shaft 226 (as described later on).

The lock plate 244b is annular, in the same manner as the lock plate 244a, and is provided with lock sections 233a to 233d composed of circular arc-shaped projections, so that the lock sections 233a to 233d are opposed to one another and engage with internal gear lock receiving sections 231a to 231d when the internal gear 220 is displaced in parallel in a direction toward the output shaft 228 (as described later on).

An impact force is exerted upon engagement between the internal gear lock receiving sections 230a to 230d and the lock sections 232a to 232d, or between the internal gear lock receiving sections 231a to 231d and the lock sections 233a to 233d. As a result, the internal gear lock receiving sections 230 and the lock sections 232 tend to be abraded.

In order to avoid such abrasion, it is preferable to increase the contact areas between the circular arc-shaped projections of the internal gear lock receiving sections 230 and the lock sections 232, or to provide a large number of circular arc-shaped projections on the internal gear lock receiving sections 230 and the lock sections 232.

As another method for preventing abrasion, the mechanical strength of the internal gear 220 and the lock plates 244a, 244b can be enhanced. When the mechanical strength thereof is enhanced, it is preferable for the internal gear 220 and the lock plates 244a, 244b to have a Rockwell hardness (HRC) of not less than 50. As yet another method for avoiding abrasion, the internal gear 220 and the lock plates 244a, 244b may be made of the same material, in order to ensure an equivalent mechanical strength thereof.

The internal gear 220 and the lock plates 244a, 244b do not necessarily need to be constructed from the same material. However, for example, polyacetal can be used to form the internal gear 220 and the lock plates 244a, 244b. When a resin-based material such as polyacetal is used, the internal gear 220 and the lock plates 244a, 244b can be light in weight. Therefore, it is possible to reduce sounds generated when the internal gear 220 and the lock plates 244a, 244b make contact with each other.

The planetary gear mechanism 214 comprises a sun gear 216 formed integrally with the input shaft 226, planet gears 218a, 218b, 218c, which are meshed yet separated from each other by angles of about 120 degrees in the circumferential direction of the sun gear 216, and which undergo both revolution and rotation. The planetary gear mechanism 214 further comprises the internal gear 220, the carriers 222a, 222b, the O-rings 240a, 240b, and the input shaft ring 242.

The carrier 222b includes an inner section 223, which is divided into a plurality of pieces in the circumferential direction, and wherein the output shaft 228 protrudes therefrom while being directed from the inner section 223 toward the second housing 212b. The sun gear 216 is inserted so as to face the inner diameter portion of the inner section 223. The inner section 223 includes windows (space sections) 221 therein, which are separated from each other by equal angles of 120 degrees. The planet gears 218a, 218b, 218c are disposed in facing relation to the windows 221. In this arrangement, the planet gears 218a, 218b, 218c are rotatably supported between one carrier 222a and the other carrier 222b using pins 224.

The large diameter internal gear 220 is cylindrical with inner teeth 246 engraved on its inner circumference, and is fitted to the outer circumferential side of the planet gears 218a, 218b, 218c. The planet gears 218a, 218b, 218c mesh with the inner teeth 246. A hole 254 is provided on a side circumferential surface of the carrier 222b, in order to attach a fastening mechanism 252 thereto, which is composed of a steel ball 248 and a spring 250. An annular groove 256 is provided at a position on the inner circumferential surface of the internal gear 220 corresponding to the fastening mechanism 252.

For example, even when a driving operation is performed by the actuator at no load or at a low load, a deviation in the number of rotations between the input shaft 26 and the output shaft 28 may occur in some cases. Therefore, it is feared that the internal gear 20 may be moved in an axial direction due to the deviation in the number of rotations.

By contrast, in the present invention, the automatic speed reducing ratio-switching apparatus 100 is provided with the fastening mechanism 252, which is operated such that even when a deviation in the number of rotations may be expected to occur between the input shaft 226 and the output shaft 228 as a result of being driven at no load or at a low load, the internal gear 220 is prevented from being moved in a direction toward the input shaft 226, or in a direction toward the output shaft 228, thereby avoiding the deviation in the number of rotations between the input shaft 226 and the output shaft 228.

Figure 17A:
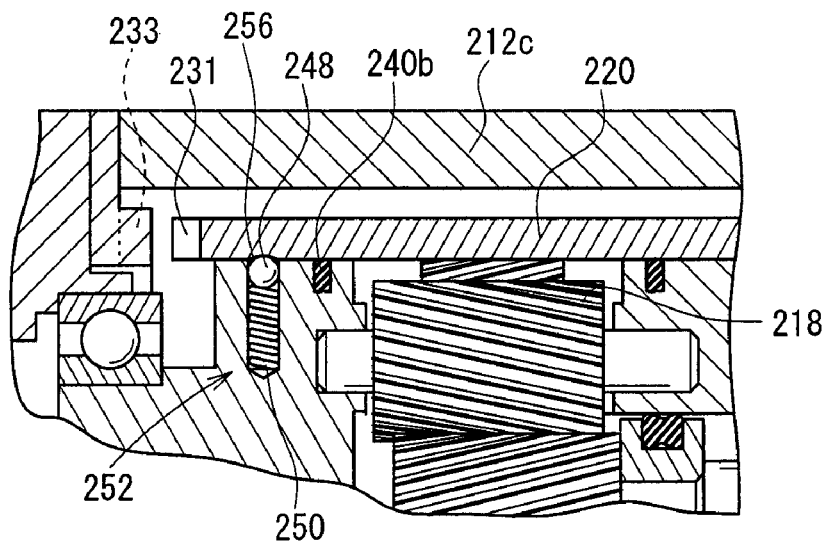
FIG. 17A is a partial magnified longitudinal sectional view illustrating a state in which an internal gear is retained by a fastening mechanism.

Therefore, by providing the fastening mechanism 252, the internal gear 220 is prevented from being moved in directions toward the input shaft 226 or the output shaft 228 (see FIG. 17A), thus avoiding abutment between the internal gear 220 and the lock plates 258a, 258b at no load or low load. Thus, it is possible to avoid generation of abutment sounds.

Paradoxically, if the fastening mechanism 252 were not provided, then the internal gear 220 would be moved in directions toward the input shaft 226 or the output shaft 228 when driven at no load or at a low load, whereupon the internal gear 220 and the lock plates 258a, 258b would make abutment and an abutment sound would be generated. For example, in the absence of the fastening mechanism 252, when the internal gear 220 is moved in a direction toward the output shaft 228, then abutment occurs without the internal gear lock receiving section 231a and the lock section 233b of the lock plate 244b becoming meshed, and an abutment sound is generated because the internal gear 220 is rotated in a clockwise direction as viewed from the side of the input shaft 226.

The sun gear 216, the planet gears 218a, 218b, 218c, and the internal gear 220 are composed of helical gears, in the same manner as in the automatic speed reducing ratio-switching apparatus 10 according to the reference example. In this arrangement, for example, oil or grease having a high viscosity may be charged or applied, in order to obtain a viscous resistance between the planet gears 218a, 218b, 218c and the inner section 223 of the carrier 222b, as well as between the planet gears 218a, 218b, 218c and the inner teeth 246.

In order to effectively obtain such viscous resistance, it is preferable that the clearance between the inner section 223 of the carrier 222b and the tip of the inner teeth 246 of the internal gear 220 is not more than 0.1 mm.

Figure 18:
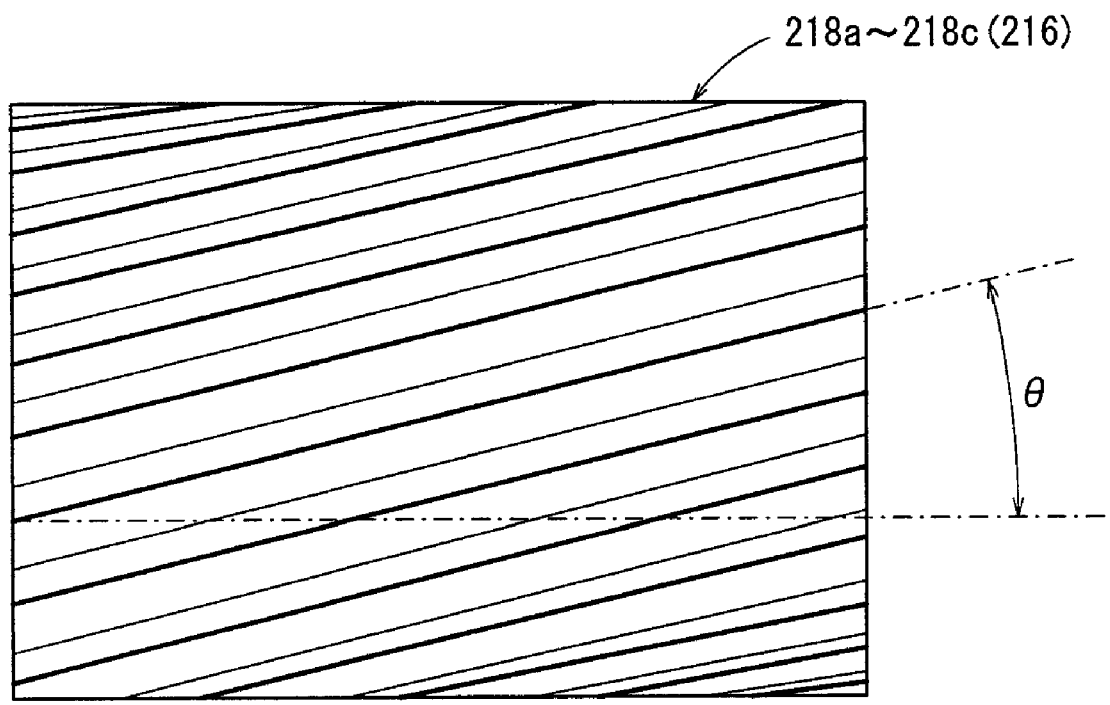
FIG. 18 is a magnified sectional view illustrating the helix angle of the helical gear.

The helix angle $\theta$ of the helical gears making up the sun gear 216, the planet gears 218a to 218c, and the internal gear 220 (inner teeth 246) is appropriately set to be not less than 25 degrees and not more than 45 degrees. Preferably, the helix angle θ is set to be not less than 30 degrees and not more than 40 degrees (see FIG. 18).

In this arrangement, if the helix angle θ of the helical gear is at an angle exceeding 45 degrees, for example, then the following inconvenience arises. That is, a force that causes displacement in the axial direction is applied to the planet gears 218a to 218c, the end surfaces of the planet gears 218a to 218c make sliding movement with respect to the carrier 222b (222a), and excessive frictional forces act between the planet gears 218a to 218c and the carrier 222b (222a). In the worst case, the rotation of the planet gears 218a to 218c may even be inhibited or stopped.

On the other hand, if the helix angle θ of the helical gear is less than 25 degrees, the following inconvenience arises. That is, the force (thrust force) of the internal gear 220, which acts to cause displacement in the axial direction, is weakened, and therefore the response sensitivity of the internal gear 220 is deteriorated.

It is preferable for the viscosity of the oil or grease used as the viscous resistance member to be about 10,000 to 100,000 (cSt). The viscous resistance of the viscous resistance member can also be changed depending on the shear rate, or depending on the width of the clearance, the viscosity of the grease, or the like, as described above.

The O-ring 240a is disposed between the internal gear 220 and the carrier 222a in order to avoid leakage of oil, grease or the like from the internal gear 220. In addition, the O-ring 240b is disposed between the internal gear 220 and the carrier 222b.

The pair of O-rings 240a, 240b function as first seal mechanisms respectively, and preferably are formed, for example, of a rubber material such as NBR.

In this arrangement, the amount of deformation of the O-ring 240a, 240b is appropriately set to be not less than about 0.5% and not more than 1.5%, and more preferably, to be about 1% of the vertical cross-sectional area of the substantially circular shape, for the following reason. That is, if the amount of deformation exceeds 1.5%, then rotation resistance increases excessively, and the efficiency of the gear overall is lowered. On the other hand, if the amount of deformation is less than 0.5%, then its sealing function is lowered and grease tends to leak therefrom.

In an experiment, an O-ring having a vertical cross-sectional area of 1.76 mm² in accordance with the Japanese Industrial Standard (JIS) and composed of NBR having a hardness of 70 was used, wherein a vertical cross-sectional area of the deformation amount thereof was set to 0.018 mm².

The deformation amount refers to an amount of decrease in thickness when the O-ring 240a, 240b is installed in the groove, for example, which also may be referred to as the so-called "deformation margin".

Further, the input shaft ring 242 is installed in an annular groove of the input shaft 226 in order to prevent leakage of oil, grease or the like from the sun gear 216 meshed with the planet gears 218a, 218b, 218c toward the input shaft 226. The input shaft ring 242 functions as a second seal mechanism and is preferably formed, for example, from a rubber material such as silicone rubber having a lubricating property.

The amount of deformation of the input shaft ring 242, which has a substantially X-shaped vertical cross section, is appropriately set to be not less than about 0.5% and not more than 1.5%, and more preferably about 1%, as represented by the vertical cross-sectional area, in the same manner as the O-rings 240a, 240b described above.

In this arrangement, if an ordinary deformation amount were set for the input shaft ring 242 having the substantially X-shaped vertical cross section, the rotation resistance would be excessively increased. Therefore, the deformation amount is set to about 1%, which is not less than about 0.5% and not more than 1.5%, in the vertical cross section. When the deformation amount is set in this manner for the input shaft ring 242 having the substantially X-shaped vertical cross section, the carrier 222a and the input shaft ring 242 are placed in tight contact with each other. A sufficient sealing effect has been successfully obtained, even if the collar member, which is rotated integrally with the input shaft 226, is idled with respect to the input shaft ring 242 installed in the annular groove of the collar member.

The O-ring 240a, the O-ring 240b, and the input shaft ring 242 preferably have cross-sectional shapes that are substantially elliptical or substantially circular. The cross-sectional shape of the input shaft ring 242 preferably is substantially X-shaped.

A plurality of internal gear lock receiving sections 230a to 230d and 231a to 231d, which are curved in a circumferential direction respectively, and each of which protrudes a predetermined length in the axial direction, are formed at both ends of the cylindrically shaped internal gear 220. As shown in FIG. 15, the internal gear lock receiving sections 230a to 230d and 231a to 231d are formed in a curved shape having projections in the circumferential direction corresponding to the lock sections 232a to 232d and 233a to 233d, which function as an internal gear clutch. The internal gear lock receiving sections 230a to 230d and 231a to 231d function together with the lock sections 232a to 232d and 233a to 233d as a braking mechanism.

The first to third housings 212a, 212b, 212c and the lock plates 244a, 244b are provided with assembly holes 260, respectively, in order for insertion of screws 258, to enable assembly of the input shaft 226, the internal gear 220, and the carriers 222a, 222b.

The lock sections 232a to 232d of the lock plate 244a, the lock sections 233a to 233d of the lock plate 244b, and the internal gear lock receiving sections 230a to 230d and 231a to 231d of the internal gear 220 function as pawls, which are mutually meshed with each other. The rising angle γ of the pawls shall be considered in light of the following reasons.

That is, if the height of the pawl is too low, then no engagement occurs when the pawl becomes abraded, and hence the meshing function thereof is quickly lowered. On the other hand, if the height of the pawl is too high, stresses that are exerted on the root portion of the pawl are increased excessively, and it is feared that the pawl may become cracked or broken at the root portion due to repeated impacts thereon.

Figure 19:
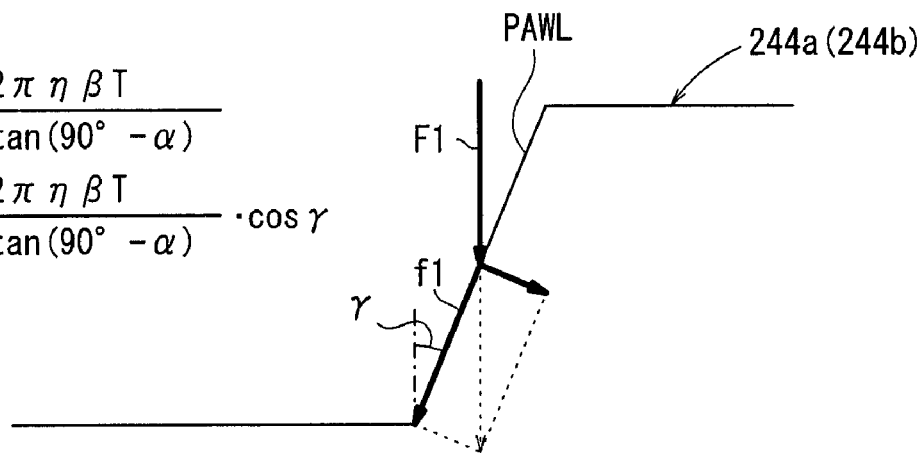
FIG. 19 is an illustration view of forces F1 and f1, wherein F1 represents a generated thrust (thrust force) of the internal gear, and f1 represents a component force of the internal gear, respectively.
Figure 20:
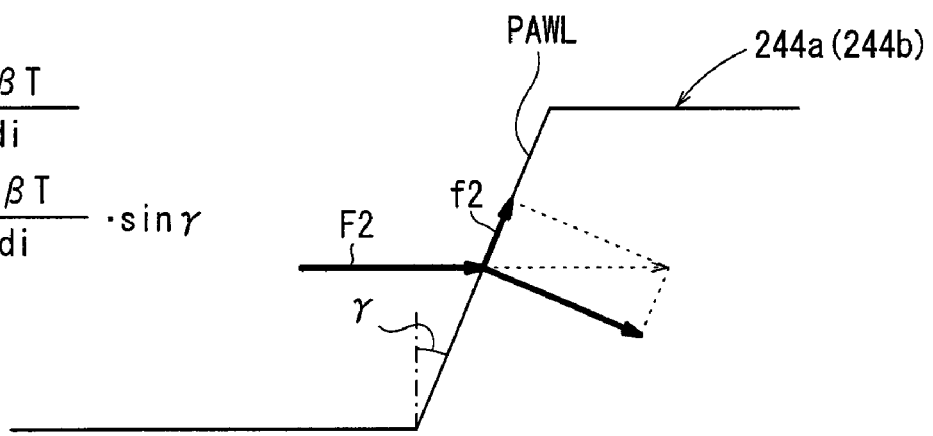
FIG. 20 is an illustration view of forces F2 and f2, wherein F2 represents a generated thrust (thrust force) of the internal gear, and f2 represents a component force of the internal gear, respectively.

Initially, F1 and F2, which are the generated thrusts (thrust forces) of the internal gear 220, are represented as follows (see FIGS. 19 and 20).

$$F1 = (2\pi \cdot \eta \cdot \beta T)/\{\pi \cdot dp \cdot \tan(90-\alpha)\}$$

$$F2 = \{(2\beta \cdot T)/di\}$$

wherein:
 α: helix angle of the sun gear;
 β: power enhancement ratio (speed reducing ratio);
 γ: pawl rising angle;
 η: screw efficiency of the sun gear as a sliding screw;
 dp: pitch circle diameter of the sun gear;
 di: outer diameter of the internal gear (center of application of pawl torque);
 T: input torque.

The following expressions are available for f1 and f2, with force components based on use of vectors.

$$f1=(2\pi\cdot\eta\cdot\beta\cdot T)/\{\pi\cdot dp\cdot\tan(90-\alpha)\}\cdot\cos\gamma$$

$$f2=\{(2\beta\cdot T)/di\}\cdot\sin\gamma$$

In order that the meshed pawls do not disengage from each other, the foregoing expressions can be expressed as follows, assuming the condition f1>f2 holds true.

$$\tan\gamma<(\eta\cdot di)/\{dp\cdot\tan(90-\alpha)\}$$

Accordingly, it is appropriate for the rising angle γ of the pawl to be set so that the expression $\tan\gamma<(\eta\cdot di)/\{dp\cdot\tan(90-\alpha)\}$ is satisfied.

For example, when the screw efficiency η=0.7, the outer diameter of the internal gear 220 di=φ27, the pitch circle diameter of the sun gear 216 dp=φ7.39, and the helix angle α=30 degrees are given, in a slip state in which the internal gear 220 is not yet locked by the lock plate 244a (244b), the rising angle γ of the pawl is γ<16.45 according to the above-described expression. In order to reliably provide meshing engagement, it is appropriate that the rising angle γ of the pawl be set to not more than 16.45 degrees.

If γ is set at less than 0 degrees, the pawl cannot be disengaged. Therefore, it is necessary and indispensable that γ is not less than 0 degrees. As a result, the foregoing expression with respect to the rising angle γ of the pawl may be expressed as follows.

$$0\leq\tan\gamma<(\eta\cdot di)/\{dp\cdot\tan(90-\alpha)\}$$

The automatic speed reducing ratio-switching apparatus 100 according to the embodiment of the present invention is basically operated in the same manner as the automatic speed reducing ratio-switching apparatus 10 according to the reference example. However, in contrast to the automatic speed reducing ratio-switching apparatus 10, the automatic speed reducing ratio-switching apparatus 100 includes the fastening mechanism 252. Therefore, when the driving operation is performed at no load or at a low load, the steel ball 248 of the fastening mechanism 252 is retained and pressed toward the groove 256 of the internal gear 220 as a result of the spring force of the spring 250. Accordingly, it is possible to avoid movement of the internal gear 220 in a direction toward the output shaft 228, or in a direction toward the input shaft 226 (see FIG. 17A).

Figure 17B:
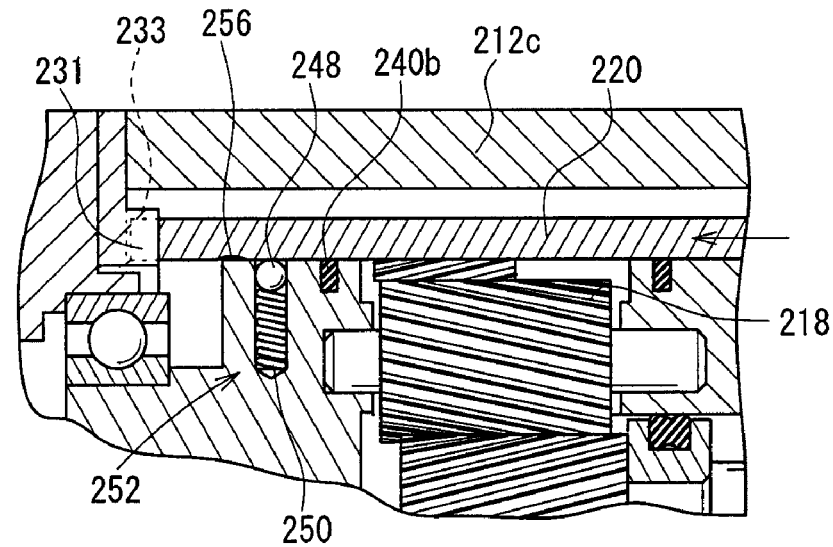
FIGS. 17B and 17C are partial magnified longitudinal sectional views, illustrating states in which the internal gear is disengaged from the fastening mechanism, and wherein the internal gear is moved horizontally in a direction toward the input shaft, respectively.
Figure 17C:
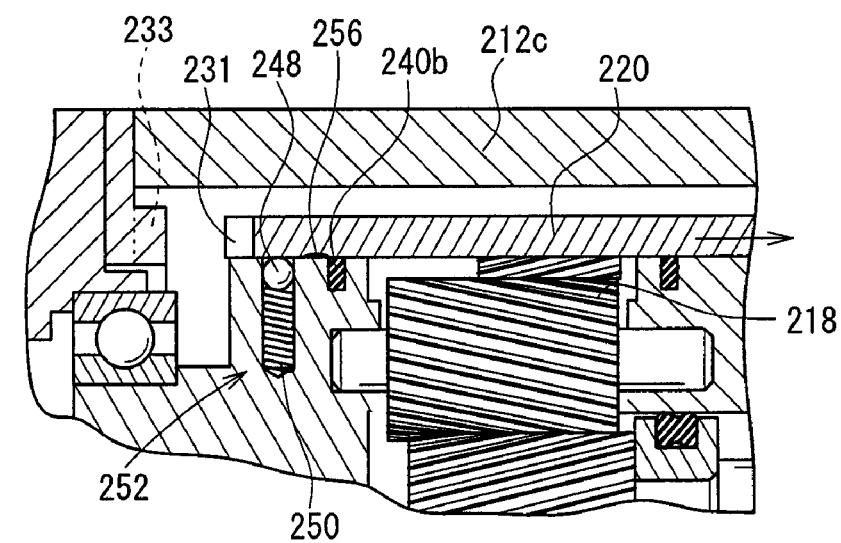

When a load in excess of the preset torque is applied to the output shaft 228, then the steel ball 248 overcomes the spring force of the spring 250, whereupon the steel ball 248 is slightly displaced toward the spring 250. As the steel ball 248 rides over the groove 256, the steel ball 248 becomes disengaged from the groove 256 and is released from its retained state. Accordingly, the internal gear 220 is moved in a direction toward the output shaft 228 or in a direction toward the input shaft 226 (see FIGS. 17B and 17C).

Figure 21:
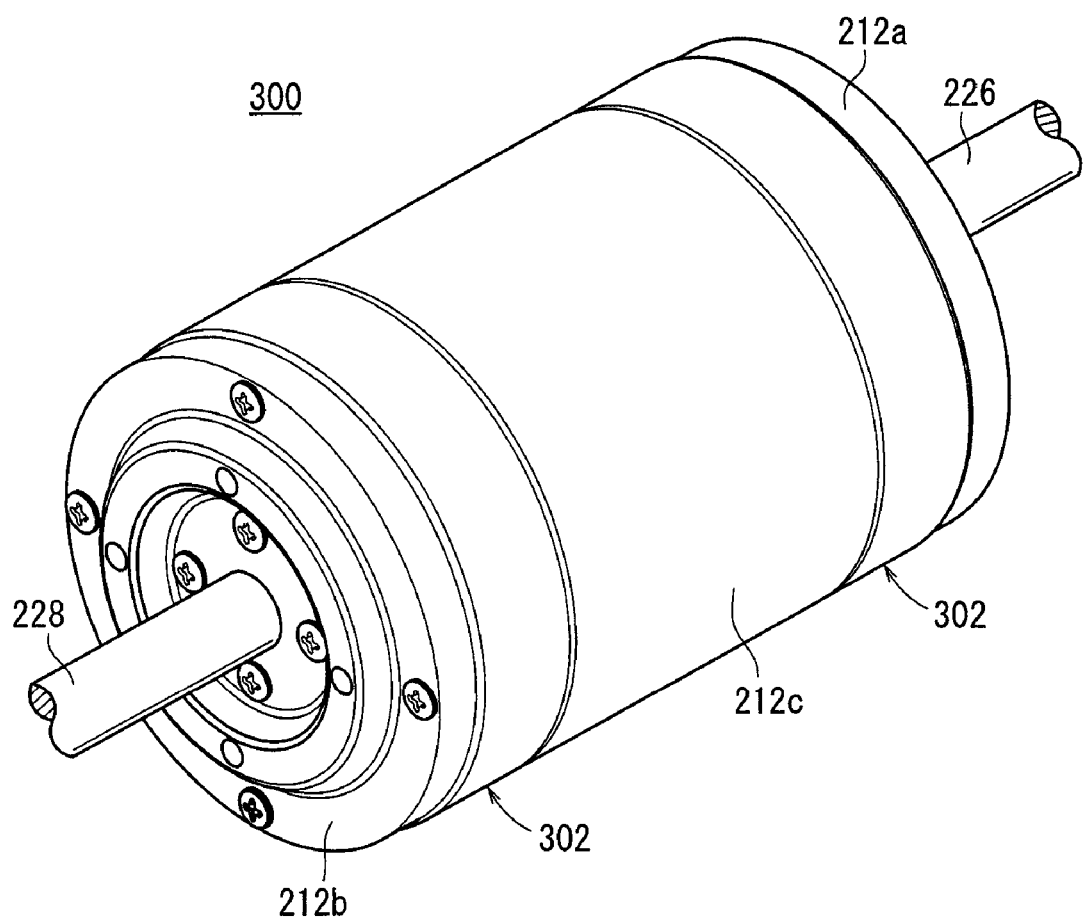
FIG. 21 is a perspective view illustrating an automatic speed reducing ratio-switching apparatus according to another embodiment of the present invention.
Figure 22:
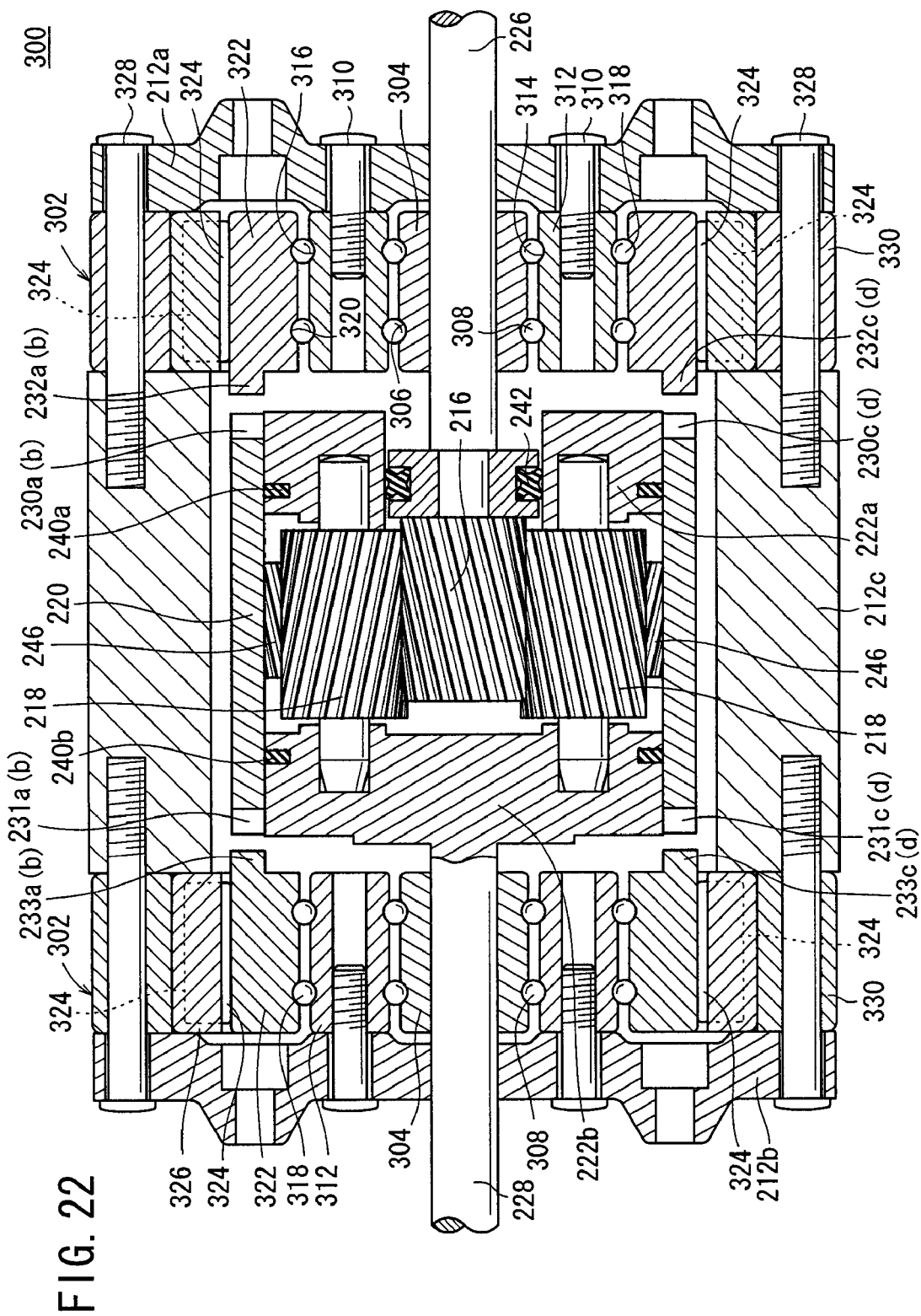
FIG. 22 is a longitudinal sectional view taken in the axial direction of the automatic speed reducing ratio-switching apparatus shown in FIG. 21.
Figure 23:
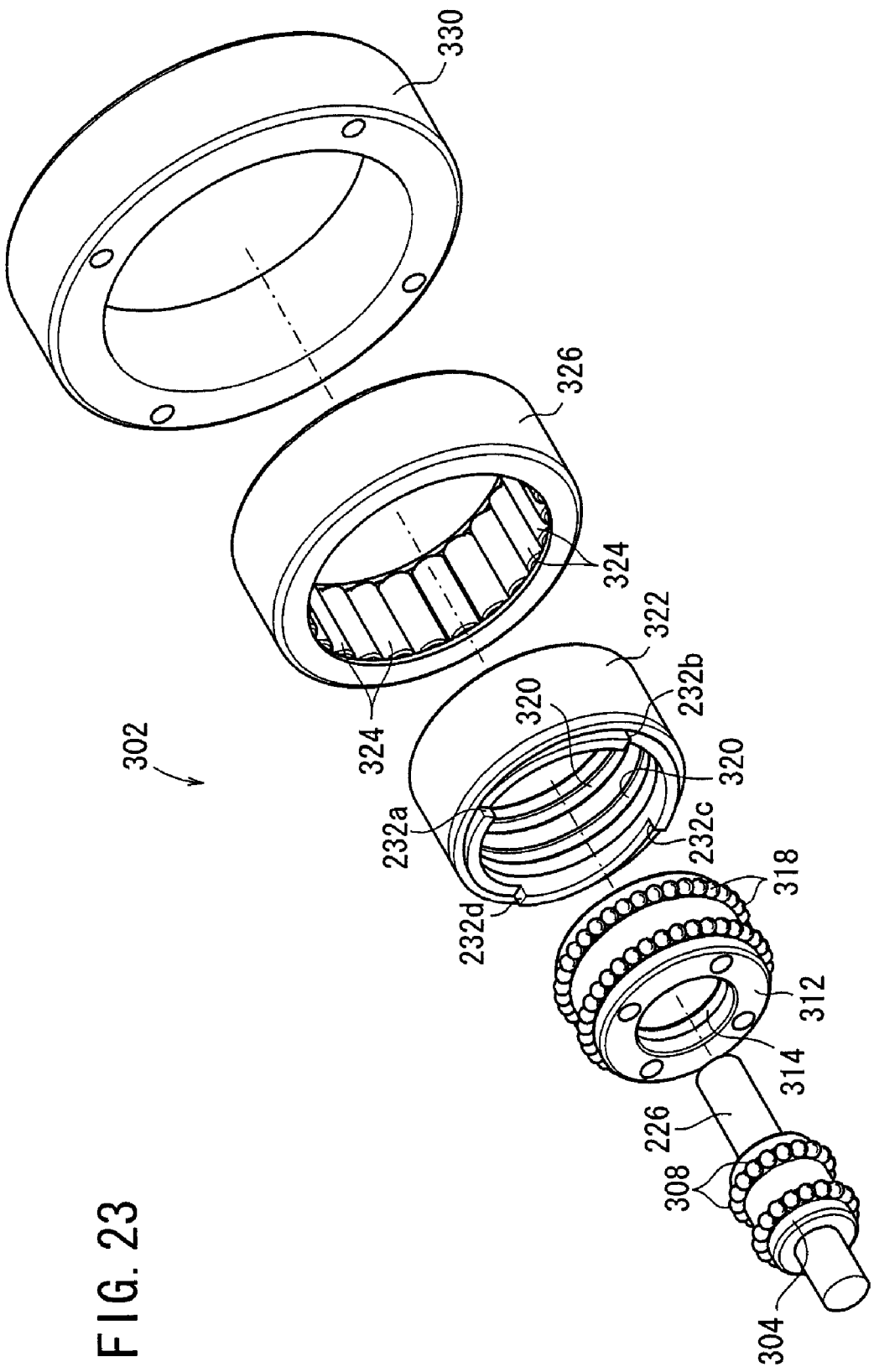
FIG. 23 is an exploded perspective view illustrating a clutch mechanism provided in the automatic speed reducing ratio-switching apparatus shown in FIG. 21.

Next, an automatic speed reducing ratio-switching apparatus 300 according to another embodiment is shown in FIGS. 21 to 23. The same constitutive components as those of the automatic speed reducing ratio-switching apparatus 100 according to the embodiment shown in FIGS. 15 and 16 are designated using the same reference numerals, and hence detailed explanation thereof shall be omitted.

The automatic speed reducing ratio-switching apparatus 300 according to this embodiment differs in that identically constructed clutch mechanisms 302 are provided on the side of the input shaft 226 and on the side of the output shaft 228, respectively. Such clutch mechanisms 302 function so that idle running is permitted in one direction of rotation, while rotation is stopped in the reverse direction, in order to effect locking.

As shown in FIG. 23, the clutch mechanism 302 comprises a first cylindrical member 304, which is externally fitted to the input shaft 226 (output shaft 228) and which is rotated integrally with the input shaft 226, plural arrays of balls defining a first group of balls 308, which roll along a pair of first annular grooves 306 formed on an outer circumferential surface of the first cylindrical member 304, and a second cylindrical member 312, which is fixed to the first housing 212a (second housing 212b) through a plurality of first bolts 310 and which is externally fitted onto the first cylindrical member 304.

A pair of second annular grooves 314 opposed to the first annular grooves 306 and on which the first group of balls 308 roll, are formed on the inner circumferential surface of the second cylindrical member 312. Plural arrays of balls (first bearings) defining a second group of balls 318, which roll along third annular grooves 316, are disposed on an outer circumferential surface of the second cylindrical member 312.

The clutch mechanism 302 further comprises a third cylindrical member (cylindrical body) 322, which includes a pair of fourth annular grooves 320 formed on the inner circumferential surface in opposition to the third annular grooves 316, for allowing the second group of balls 318 to roll therein, and which has lock sections 232a to 232d and 233a to 233d composed of circular arc-shaped projections that protrude on circumferential edge portions disposed at respective ends thereof, so as to engage with internal gear lock receiving sections 230a to 230d and 231a to 231d when the internal gear 220 is displaced in parallel in a direction toward the input shaft 226 or toward the output shaft 228. The clutch mechanism 302 also comprises a fourth cylindrical member 326, which is externally fitted onto the third cylindrical member 322 and includes a plurality of needle bearings (second bearings) 324 aligned along the inner circumferential surface along both brims thereof, and a fifth cylindrical member 330 externally fitted onto the fourth cylindrical member 326, and which is fixed onto the first housing 212a and the third housing 212c through a plurality of second bolts 328.

Grooves (not shown), with wedge-shaped cross sections that retain the individual needle bearings 324, are formed on the inner circumferential surface of the fourth cylindrical member 326. The needle bearings 324 are fastened within the grooves, which have wedge-shaped cross sections, and thus the third cylindrical member 322, which includes the lock sections 232a to 232d, is placed in a locked state. For example, a return spring (not shown) such as a plate spring, which urges the needle bearings 324 in a direction to separate from unillustrated grooves, are provided for the grooves having the wedge-shaped cross sections. The locked state is released by the spring force of the return spring.

In this other embodiment, when the internal gear 220 is displaced in parallel in the direction toward the input shaft 226, or in a direction toward the output shaft 228, the following operations are effected. That is, when the internal gear lock receiving sections 230a to 230d (231a to 231d) of the internal gear 220 engage with the lock sections 232a to 232d (233a to 233d) of the third cylindrical member 322, then impacts exerted upon abutment are buffered, and abutment sounds can be suppressed as much as possible, since the third cylindrical member 322 including the lock sections 232a to 232d (233a to 233d) is rotatable owing to the rolling action of the second group of balls 318 and the needle bearings 324. Therefore, durability can be improved by suppressing abrasion of the pawls of the lock sections 232a to 232d (233a to 233d) and the internal gear lock receiving sections 230a to 230d (231a to 231d).

In other words, when the internal gear lock receiving sections 230a to 230d (231a to 231d) of the internal gear 220 engage with the lock sections 232a to 232d (233a to 233d) of the third cylindrical member 322, then impacts that are exerted when the lock sections 232a to 232d (233a to 233d) abut against the internal gear lock receiving sections 230a to 230d (231a to 231d) are buffered, and generation of abutment sounds can be suppressed, since the lock sections 232a to 232d (233a to 233d) of the third cylindrical member 322 are rotatably retained through the second group of balls 318 and the needle bearings 324.

Next, FIGS. 24 to 28 show modified embodiments of the carrier 222b, which is disposed on the side of the output shaft 228 and which includes an inner section 223 that protrudes in the axial direction (see FIG. 15).

A pair of O-rings 240a, 240b, which are separated axially from each other, is installed in the pair of carriers 222a, 222b, which are provided respectively on the side of the input shaft 226 and the side of the output shaft 228. Grease is retained in the planetary gear mechanism by means of the sealing function of the O-rings 240a, 240b.

In this arrangement, the inner section 223, which is formed on the carrier 222b and disposed on the side of the output shaft 228, preferably has a shape that makes it possible to increase shear torque, while narrowing the clearance in relation to the installation groove of the O-ring, the sliding surface of the input shaft ring 242, the inner circumferential surface of the internal gear 220, and the outer circumferential surface of the carrier 222b.

Accordingly, the shape of the inner section 223 is designed so that an areal size can be increased at the tip circle of the inner teeth 246 of the internal gear 220 and the gap portion of the carrier 222b, and such that an oil pool is formed for grease (lubricating oil).

Figure 24:
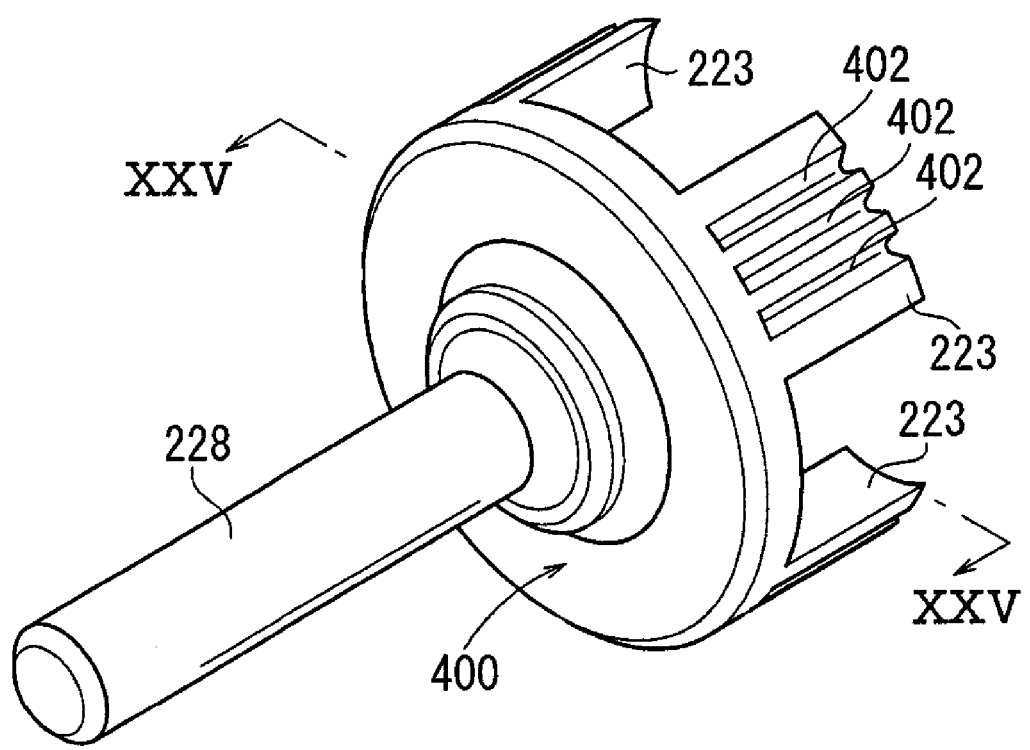
FIG. 24 is a perspective view illustrating a carrier according to a first modified embodiment.
Figure 25:
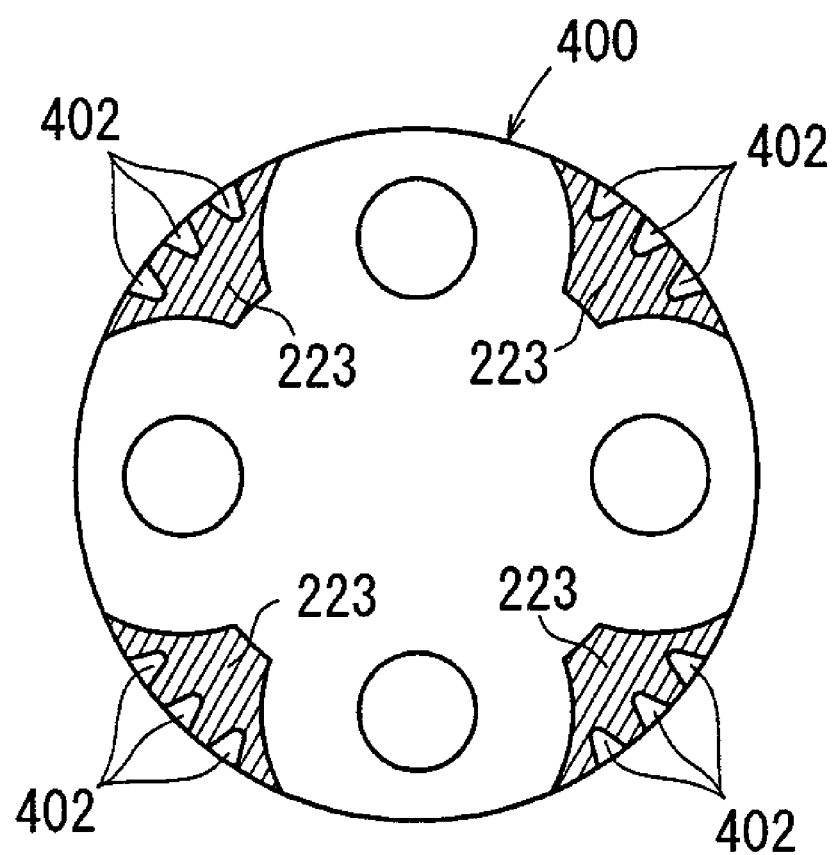
FIG. 25 is a vertical sectional view taken along line XXV-XXV shown in FIG. 24.

As shown in FIGS. 24 and 25, a carrier 400 according to a first modified embodiment includes a plurality of (for example, three stripes of) grooves 402 formed on an outer diameter surface of the inner section 223, which are parallel to the axial direction.

Figure 26:
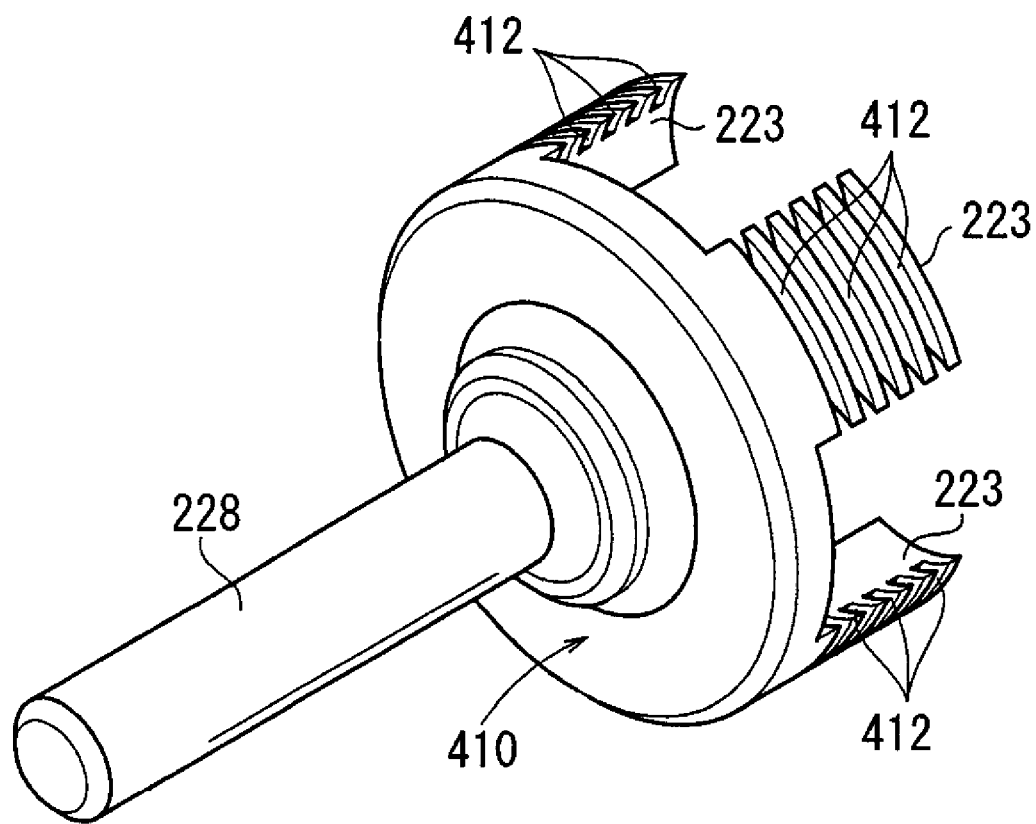
FIG. 26 is a perspective view illustrating a carrier according to a second modified embodiment.

As shown in FIG. 26, a carrier 410 according to a second modified embodiment includes a plurality of annular grooves 412 formed on an outer diameter surface of the inner section 223, which are parallel to the circumferential direction and perpendicular to the axial direction.

Figure 27:
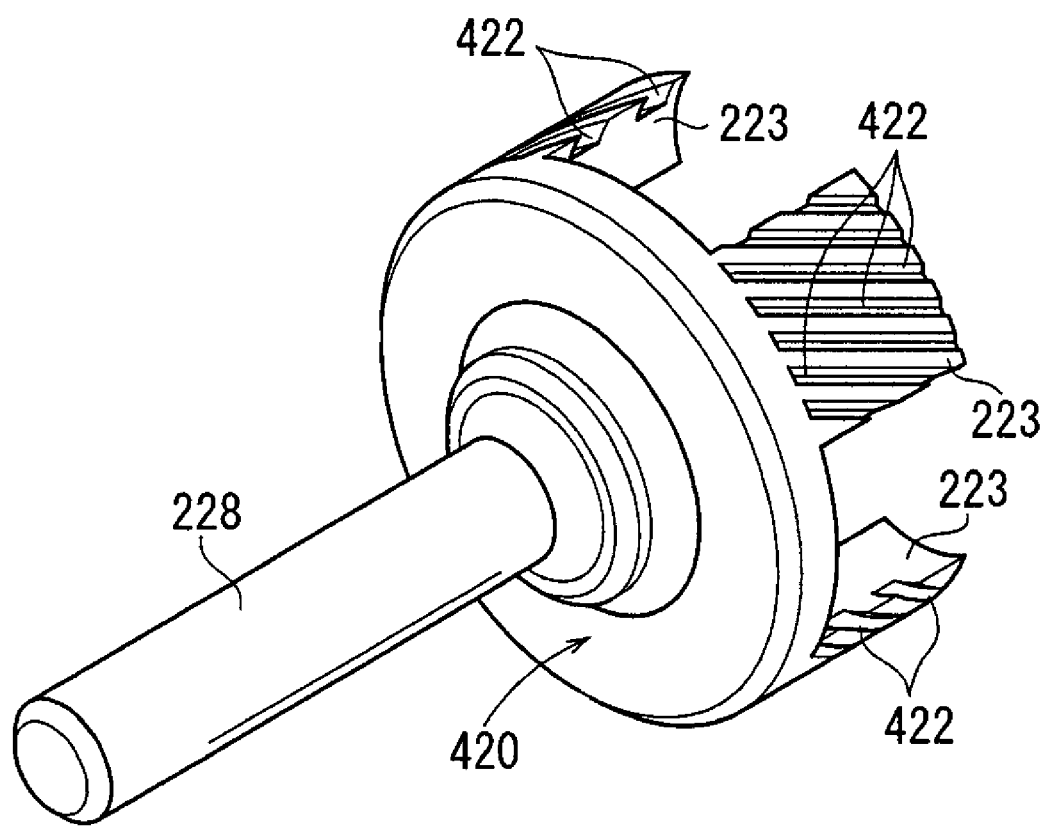
FIG. 27 is a perspective view illustrating a carrier according to a third modified embodiment.

As shown in FIG. 27, a carrier 420 according to a third modified embodiment includes a plurality of inclined grooves 422 formed on an outer diameter surface of the inner section 223, which intersect the axial direction at a predetermined angle.

Figure 28:
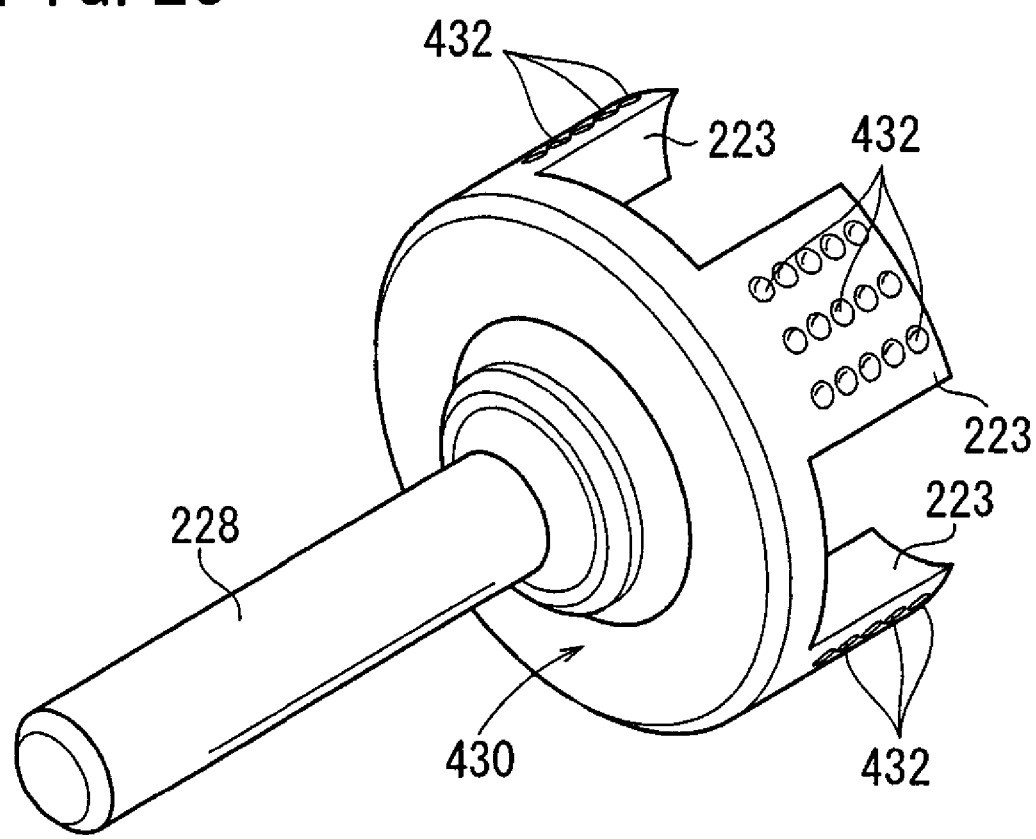
FIG. 28 is a perspective view illustrating a carrier according to a fourth modified embodiment.

As shown in FIG. 28, a carrier 430 according to a fourth modified embodiment includes a plurality of stripes of dimples 432 formed on the outer diameter surface of the inner section 223, which are composed of recesses having semispherical cross sections extending linearly in the axial direction, and which are disposed in parallel to the axial direction.

Next, an explanation shall be given concerning applicable fields of use of the automatic speed reducing ratio-switching apparatus 100, 300 constructed as described above.

The automatic speed reducing ratio-switching apparatus 100, 300 can be applied and utilized in all fields concerning rotary systems, which are operated while making corrections when load resistance is increased or decreased, in accordance with variations in load imposed on the power source.

The automatic speed reducing ratio-switching apparatus 100, 300 may be applied, for example, to vehicles, ships, airplanes, agricultural machinery (for example, cultivators and lawn mowers), tanks, heavy weight vehicles (for example, large-sized construction machines and mining machines), press machines, compressors, electric generators, food machines, machine tools, lifter mechanisms, speed change (transmission) devices used in nursing, vertical/horizontal movement apparatuses, wheelchairs (including electric and manual wheelchairs), door opening/closing mechanisms, sliding door opening/closing mechanisms, tightening mechanisms used for closing sliding doors, opening/closing mechanisms for roofs, and various brake mechanisms (including drum brakes and disc brakes).

Vehicles include automobiles carried by, for example, power engines (including gasoline engines and diesel engines), fuel cell driven motors, and hybrid systems. In this case, the rotary driving source is not limited to electric motors, but may be driven by human power, internal combustion engines, hydraulic power, oil pressure, or pneumatic sources.

In the present invention, a high speed rotation type motor can be used as a high torque motor. High speed rotation can be performed in a region in which torque is not required. In other words, when the load is decreased, a conventionally geared motor can be rotated at high speed. Further, the diameter of the motor can be reduced to realize a small size.

Figure 29:
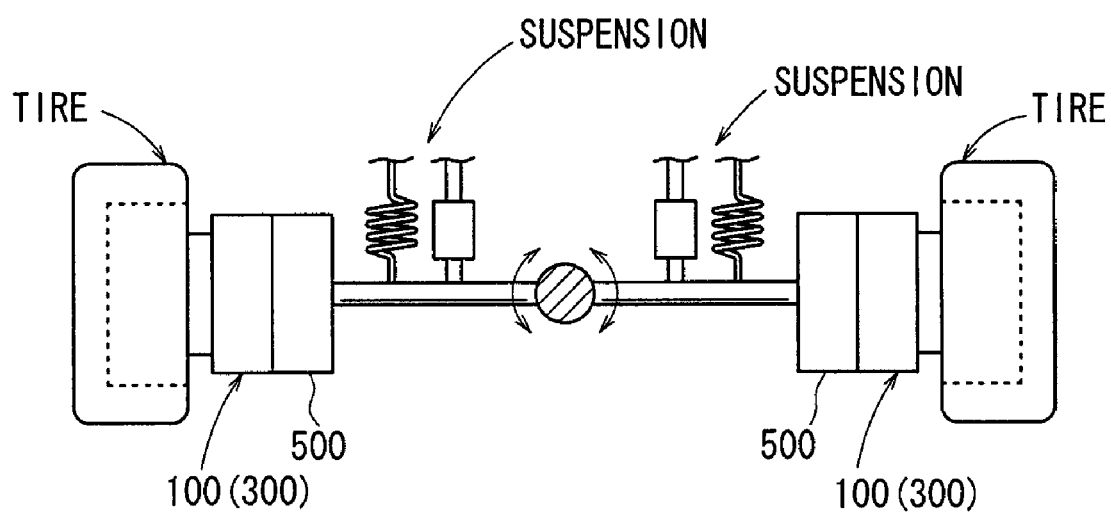
FIG. 29 is, with partial omission, a side view in which the automatic speed reducing ratio-switching apparatus according to the embodiment of the present invention is applied to a motor for driving wheels.
Figure 30:
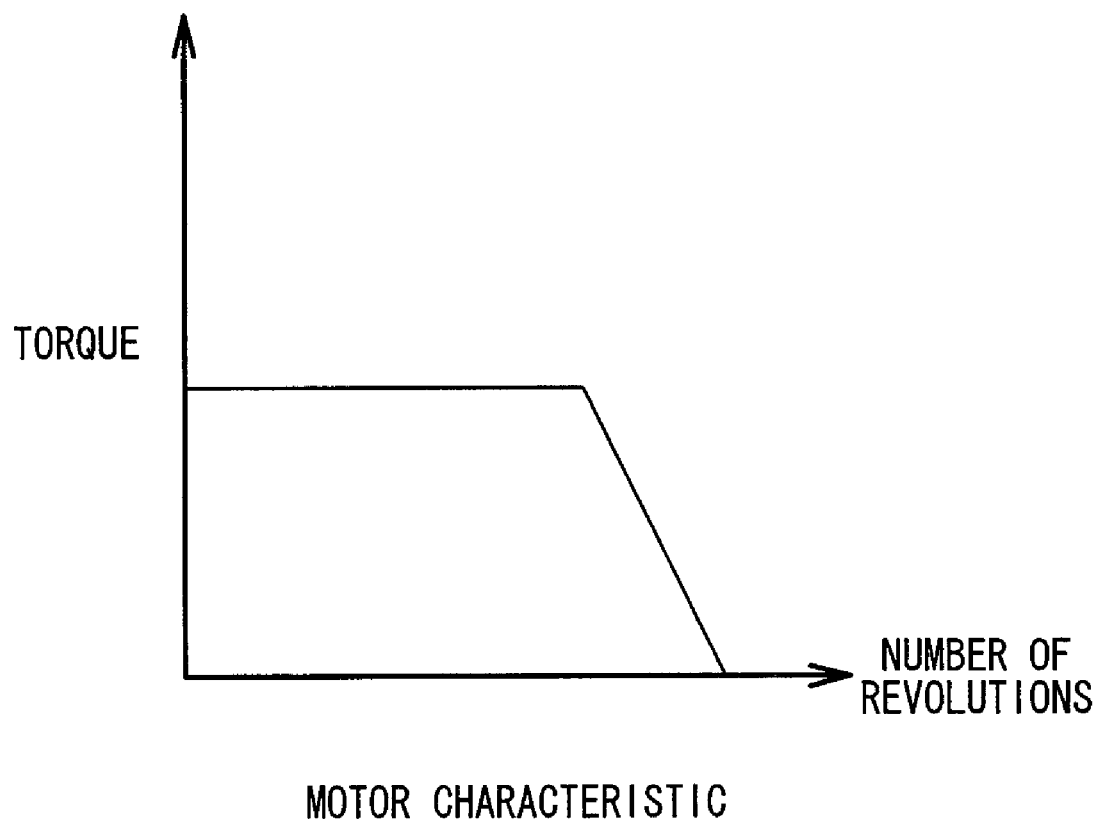
FIG. 30 is a graph showing motor characteristics, which illustrate the relationship between the number of revolutions and torque.

Portions where the invention may appropriately be used in vehicles include wiper motors, power window motors, power seat motors, driving motors for slide doors, and driving motors for automobiles. When the present invention is applied to a wiper motor, the wiper can be smoothly started and operated, even when resistance of snow, the blade or the like is increased. The wheel driving motors of automobiles include various motors 500 such as DC motors, induction motors, and in-wheel motors, as shown in FIG. 29. Along with facilitating miniaturization of the motor 500, output (torque) can be increased when obstacles or uphill slopes are encountered. In the case of the in-wheel motor, it is possible to effectively use a small-sized speed change or transmission device of the self-propelled type, for the following reason. That is, if in-wheel motors are incorporated into the respective wheels, it is difficult to incorporate them when a conventional automatic speed change or transmission device is used due to its large size. Conventionally, incorporation of a planetary gear mechanism into an in-wheel motor is known. When such a system is used in combination with the automatic speed reducing ratio-switching apparatus according to the embodiment of the present invention, it is possible to construct an in-wheel motor, which can be equipped with a speed change or transmission device having a smaller size.

Next, FIGS. 59A to 59D show combination patterns of automatic speed reducing ratio-switching apparatus 100 (300) according to the embodiments of the present invention together with the planetary gear mechanism. In the respective patterns shown in FIGS. 59A and 59B, a single planetary gear mechanism 501 is arranged on either the input side or the output side of the automatic speed reducing ratio-switching apparatus 100 (300). Accordingly, the speed reducing ratio can be set within a range of 1/12 to 1/4.

Figure 59A:
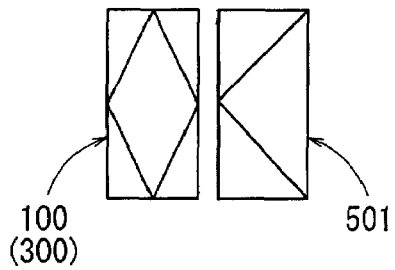
FIGS. 59A to 59D are schematic arrangements illustrating combination patterns of the automatic speed reducing ratio-switching apparatus according to the embodiment of the present invention and the planet gear mechanism respectively.
Figure 59B:
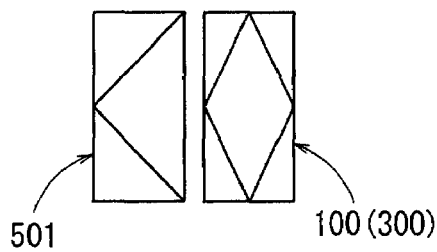
Figure 59C:
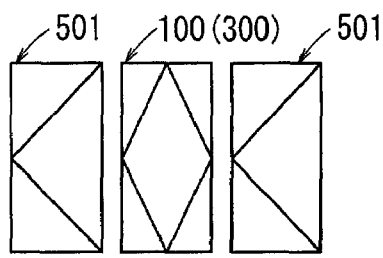

In the pattern shown in FIG. 59C, individual planetary gear mechanisms 501 are arranged on both the input side and the output side of the automatic speed reducing ratio-switching apparatus 100 (300) respectively. Accordingly, the speed reducing ratio can be set within a range of 1/48 to 1/16.

Figure 59D:
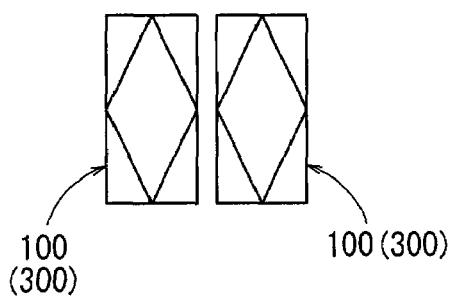

In the pattern shown in FIG. 59D, two automatic speed reducing ratio-switching apparatuses 100 (300) are combined. Accordingly, the speed reducing ratio can be set within a range of 1/9 to 1/3 to 1/1.

As for the motor input pattern, either a type in which torque is constant with respect to the number of revolutions (see FIG.

Figure 31:
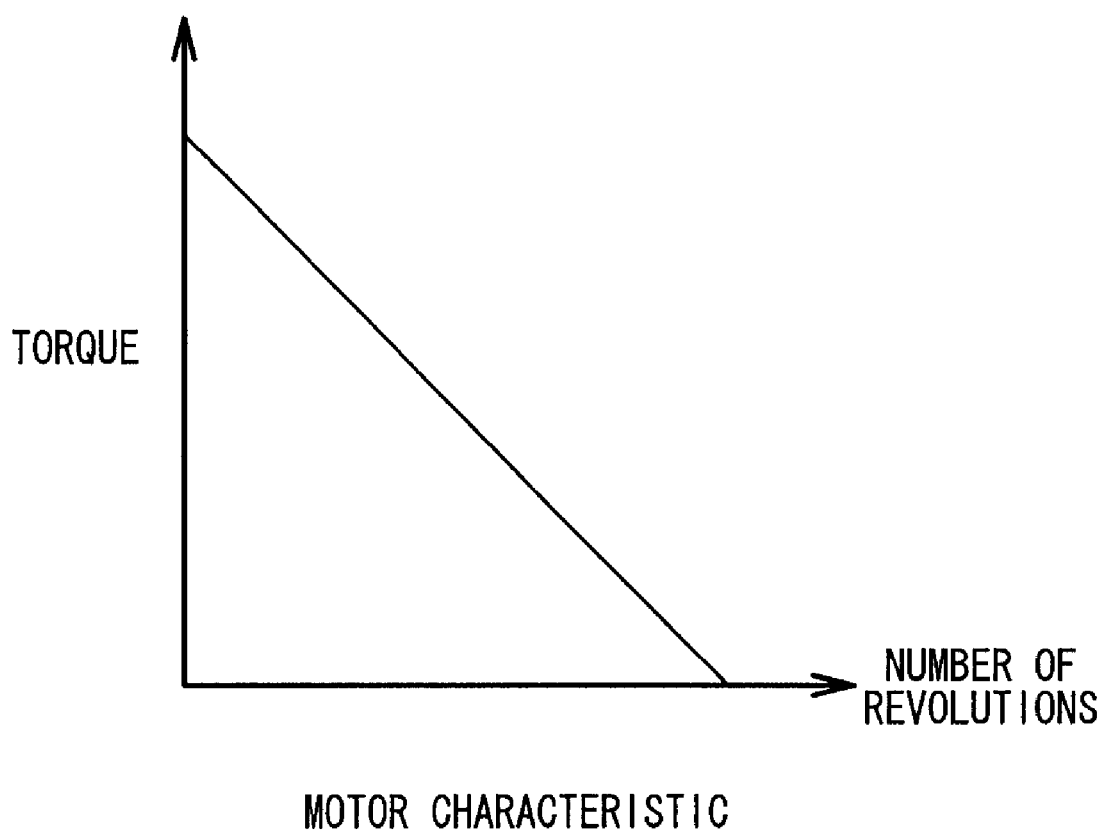
FIG. 31 is a graph showing motor characteristics, which illustrate the relationship between the number of revolutions and torque.

30), or a type in which torque is changed with respect to the number of revolutions (see FIG. 31), may be adopted.

Figure 32A:
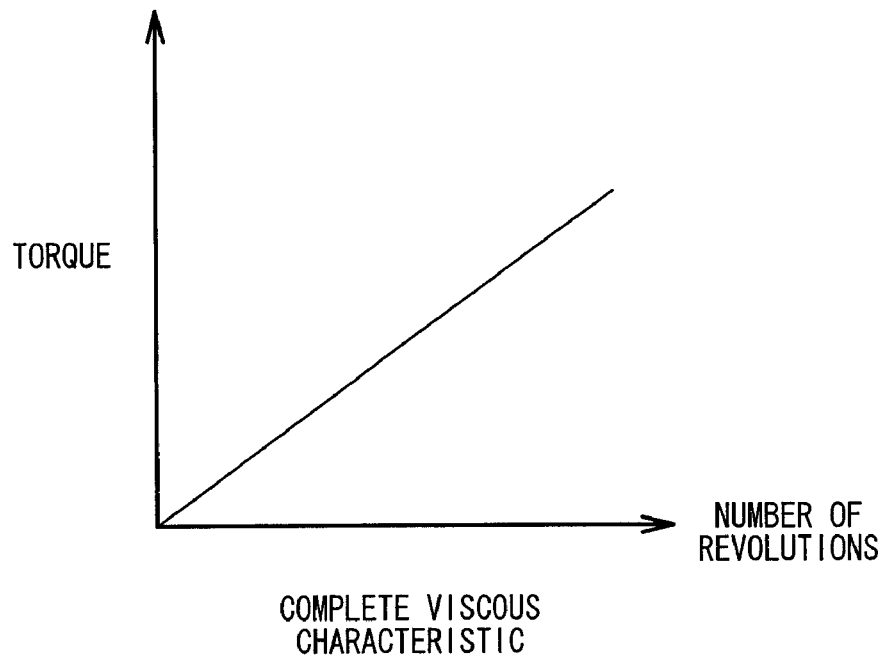
FIG. 32A is a graph showing complete viscous characteristics, in which the relationship between the number of revolutions and torque is linear.
Figure 32B:
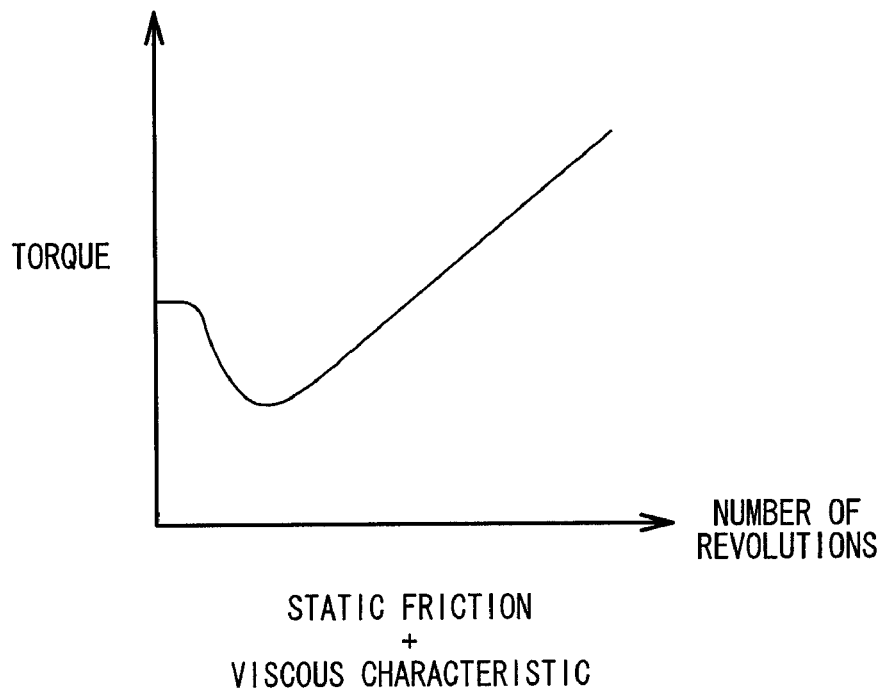
FIG. 32B is a graph showing static friction and viscous characteristics, in which the relationship between the number of revolutions and torque is changed.
Figure 33:
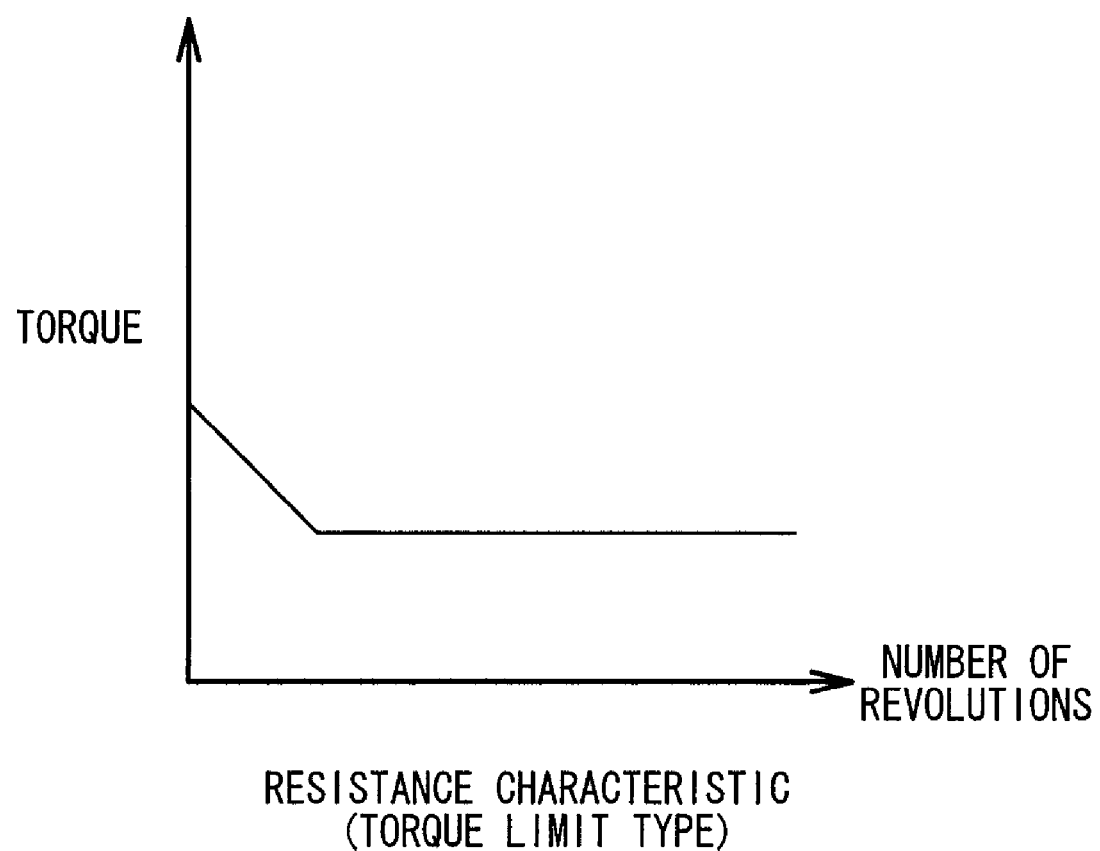
FIG. 33 is a graph showing resistance characteristics, illustrating the relationship between the number of revolutions and torque.
Figure 34A:
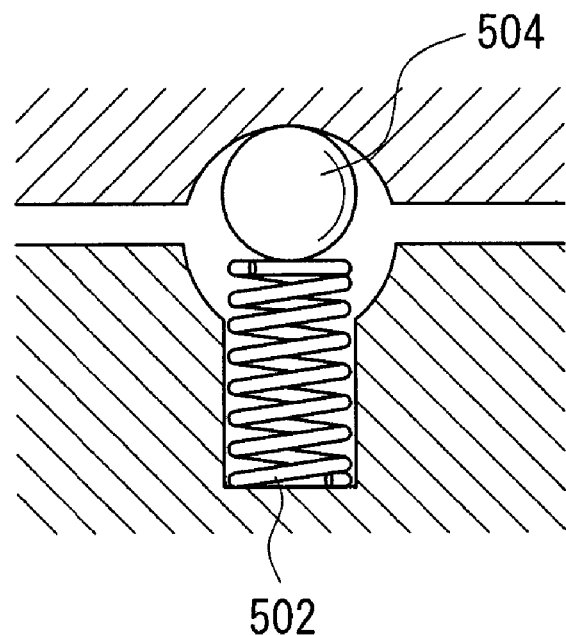
FIG. 34A is a vertical sectional view illustrating a detent mechanism, in which a ball is fastened by being pressed by a spring.
Figure 34B:
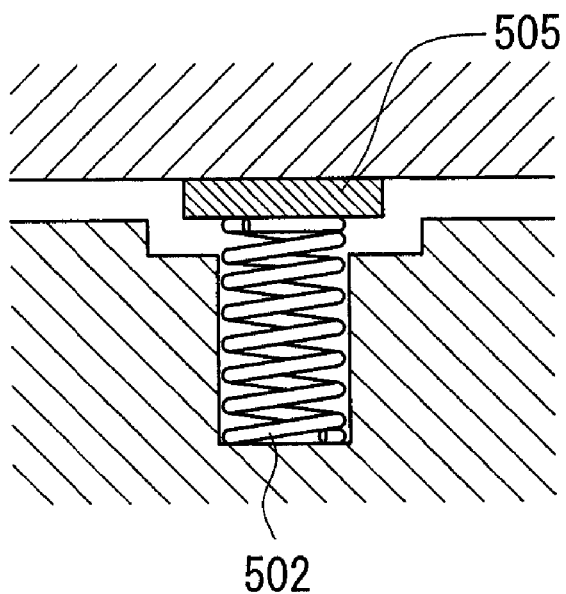
FIG. 34B shows a vertical sectional view illustrating a static friction mechanism, in which a friction member is fastened by being pressed by a spring.

As for the switching pattern of the resistance characteristics of the planet gears, concerning the relationship between the difference in rotation speed and generated torque, any of the following types may be adopted, i.e., a type in which torque is changed linearly (proportionally) in accordance with a complete viscous coupling characteristic (solely a lubricating oil characteristic) (see FIG. 32A), a type in which torque is changed in a curved form while including a static friction-generating mechanism (for example, a mechanism in which a friction plate 505 is pressed by a spring 502 in order to generate static friction, as shown in FIG. 34B) in the viscous coupling characteristic described above (see FIG. 32B), a type in which a torque limit is included in the carrier/internal gear, wherein torque is kept constant after having been once lowered (see FIG. 33), and a type in which a detent (to effect a fastening action by pressing a ball 504 with a spring 502, for example, as shown in FIG. 34A) is included in the carrier/internal gear.

In the arrangement described above, as for the seal mechanism for enclosing oil (for example, lubricating oil) inside the planetary gear mechanism, for example, the O-ring and the wear ring have resistance characteristics including a static friction and/or a fluid lubrication characteristic, which can be used conveniently as the seal mechanism. An O-ring elastic member may be utilized in place of the spring member shown in FIG. 32B. Such a structure is often utilized as a seal mechanism for hydraulic cylinders.

Figure 35:
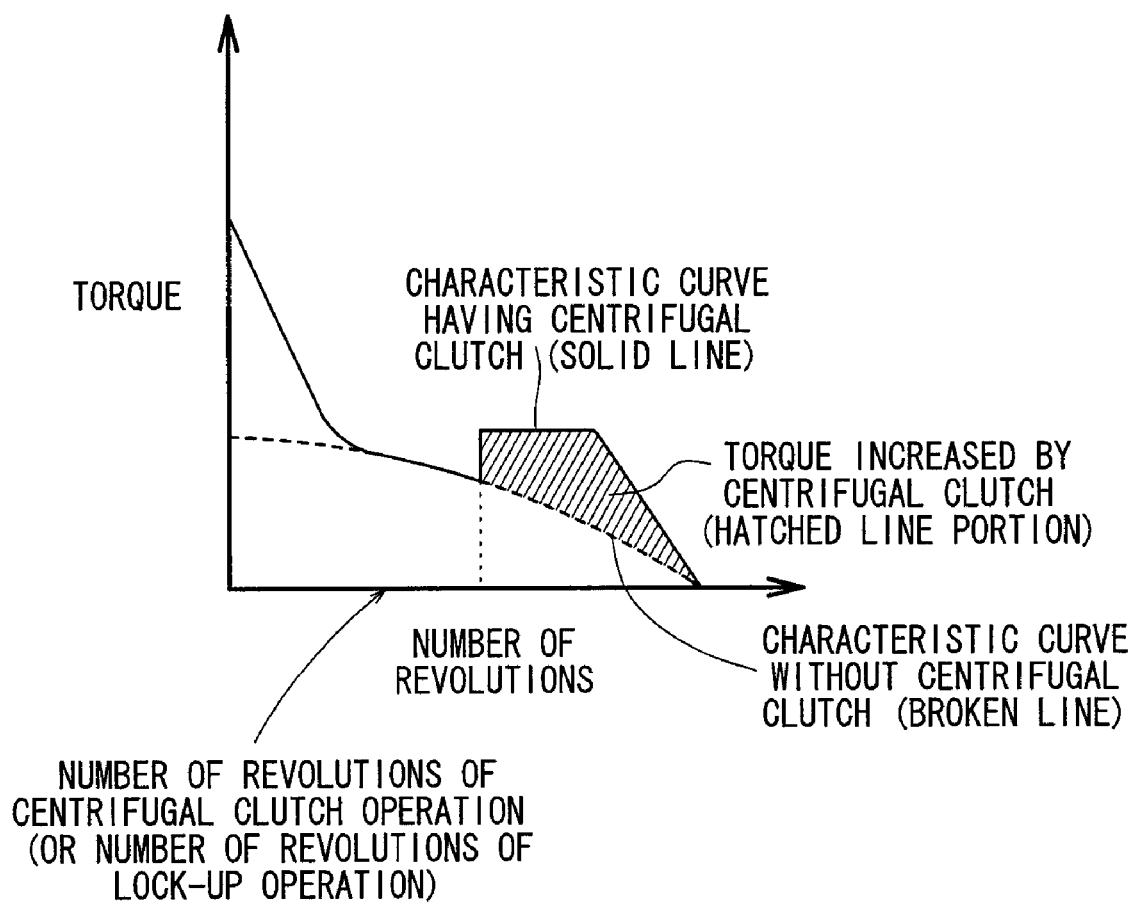
FIG. 35 is a graph showing characteristics illustrating changes in torque with respect to the number of revolutions, depending on the presence or absence of a lockup mechanism or a centrifugal clutch mechanism.

When the automatic speed reducing ratio-switching apparatus 100, 300 is combined with a lock-up mechanism or a centrifugal clutch mechanism (as described later on), it is possible to eliminate slip loss (see the hatched portion shown in FIG. 35) during high speed rotation. It is also possible to improve efficiency (i.e., power characteristics concerning the relationship between torque and number of revolutions) of the lock-up mechanism and the centrifugal clutch mechanism.

As for the centrifugal clutch mechanism, a structure may be adopted in which the planet gear is fixed by a centrifugal weight and a spring, and wherein a clutch structure is used which is based on a large number of rolling members and a guide clutch plate, as disclosed in International Publication No. WO 2004/61318.

Figure 60:
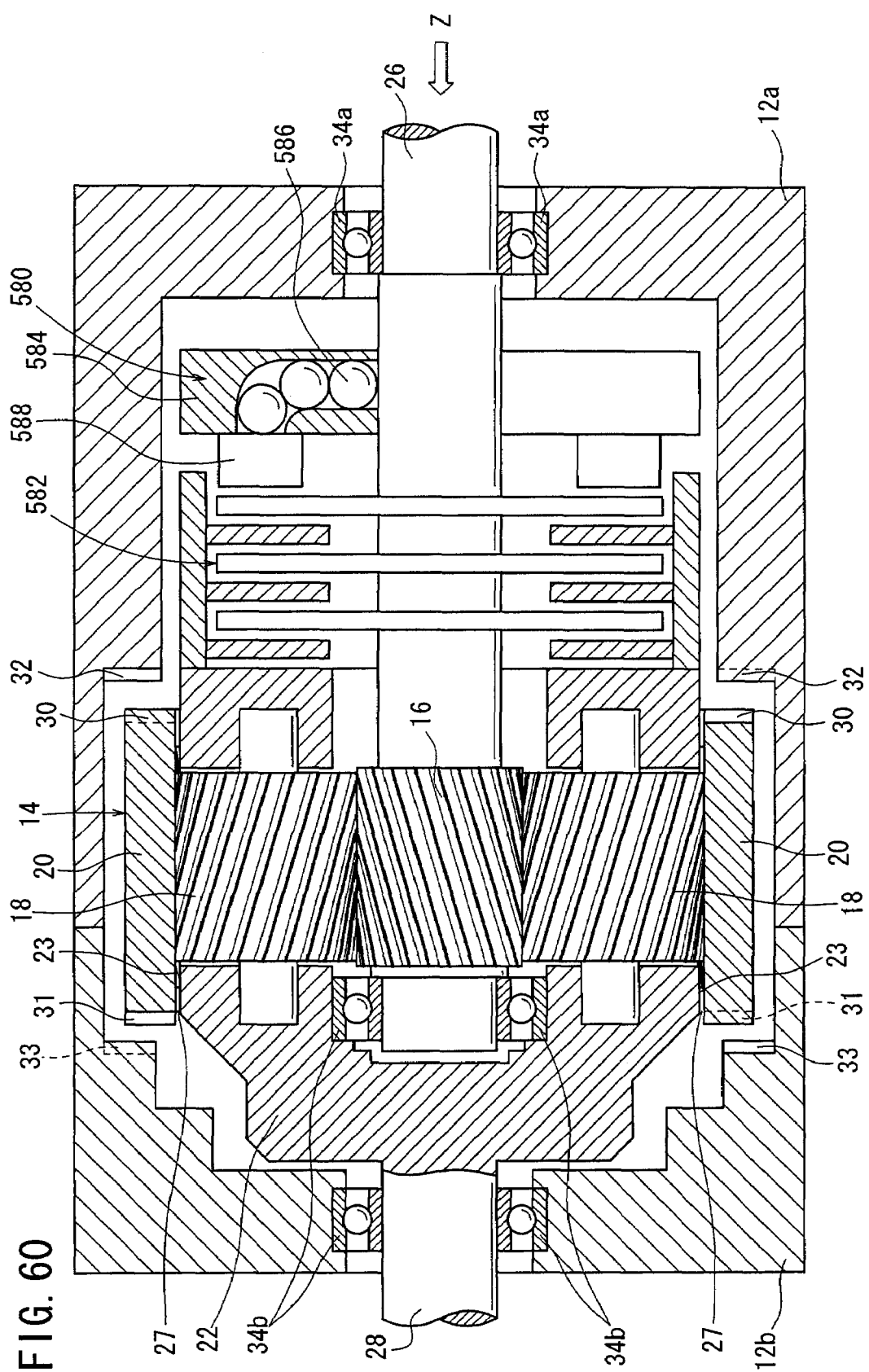
FIG. 60 is a longitudinal sectional view illustrating a structure in which a Revloc centrifugal clutch and a multiple disc friction clutch are incorporated between the input shaft and the planet gear mechanism making up the automatic speed reducing ratio-switching apparatus shown in FIG. 2.

For example, FIG. 60 shows a structure in which a Revloc centrifugal clutch 580 and a multiple disc friction clutch 582 are incorporated between the input shaft 26 and the planetary gear mechanism 14 shown in FIG. 2. Further, FIG. 61 shows a structure in which a Revloc centrifugal clutch 580 and a multiple disc friction clutch 582 are incorporated between the input shaft 226 and the planetary gear mechanism 214 shown in FIG. 22.

Figure 61:
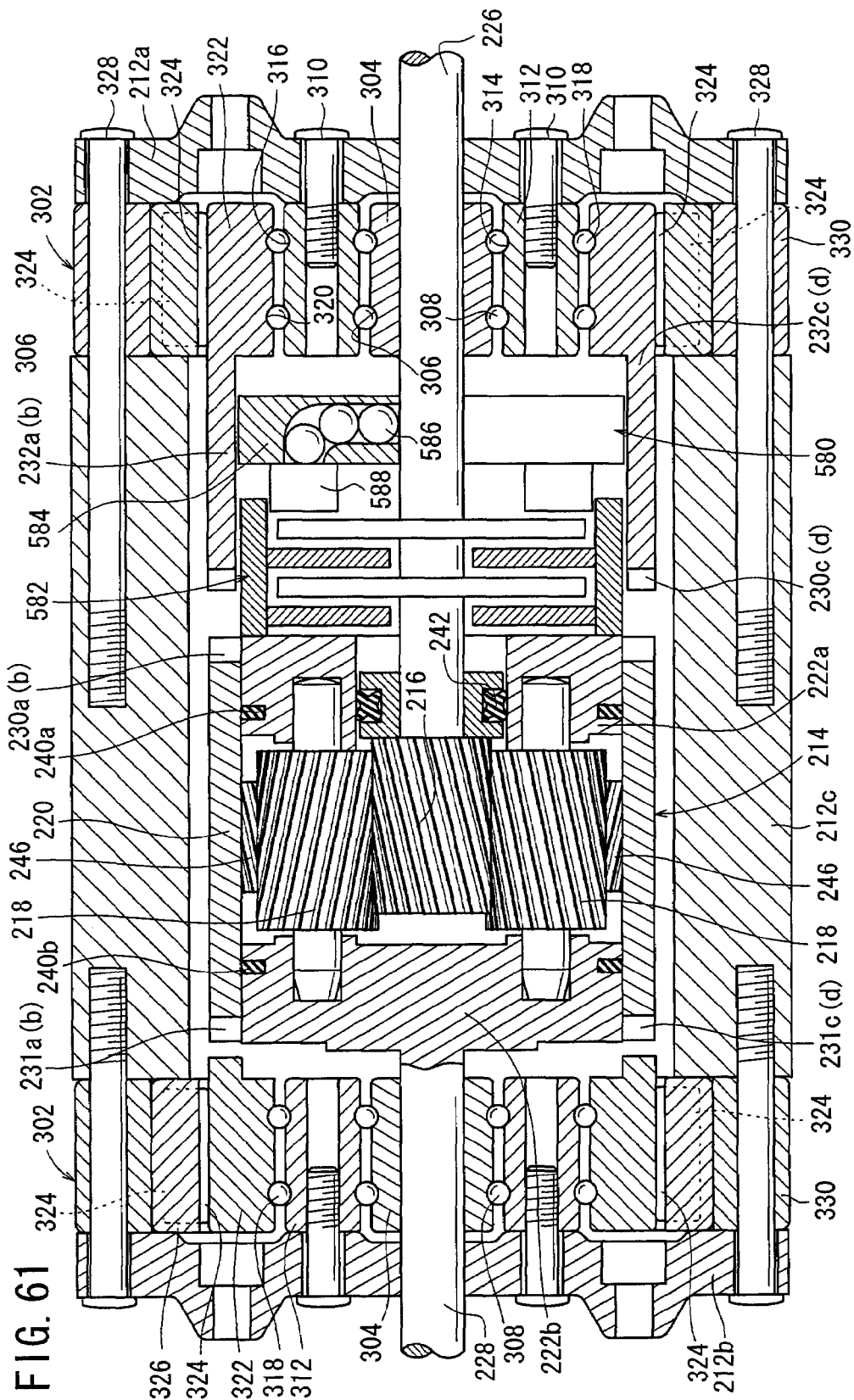
FIG. 61 is a longitudinal sectional view illustrating a structure in which a Revloc centrifugal clutch and a multiple disc friction clutch are incorporated between the input shaft and the planet gear mechanism making up the automatic speed reducing ratio-switching apparatus shown in FIG. 22.

With reference to FIGS. 60 and 61, when the input shaft 26 (226) is rotated in a predetermined direction, the centrifugal clutch 580 and the multiple disc friction clutch 582, which are connected to the input shaft 26 (226), are rotated integrally with the input shaft 26 (226). In this situation, a force is generated and is exerted such that the balls (steel balls) 586, which are provided in the internal space of the clutch plate 584 of the centrifugal clutch 580, are displaced radially outwardly under action of the centrifugal force. When the force overcomes an unillustrated clutch spring, which acts to retain the balls 586, the balls 586 are displaced radially outwardly so as to press the push rod 588. The multiple disc friction clutch 582 makes tight contact under pressure, by means of the pressing force of the push rod 588, in order to generate the clutch force.

In FIG. 2, a spiral-jaw clutch is used as the one-way clutch. However, the embodiment of the present invention is constructed by assembling the balls, the roller, and a sprag type one-way clutch integrally with the bearing, without using the jaw as a one-way clutch. In this arrangement, it is appropriate to use a square-jaw clutch, or a Carbic coupling, for connection with respect to the ring gear.

The automatic speed reducing ratio-switching apparatus 100, 300 may appropriately be applied, for example, to press working apparatuses, bending processing apparatuses, mold-closing apparatuses, injection molding machines, and die casting molding apparatuses. In the various processing/forming apparatuses described above, it is required that a large force (high torque) be generated by the movable element in the vicinity of the displacement terminal end, wherein the time required to arrive at the displacement terminal end is shortened in order to improve production efficiency.

Figure 36:
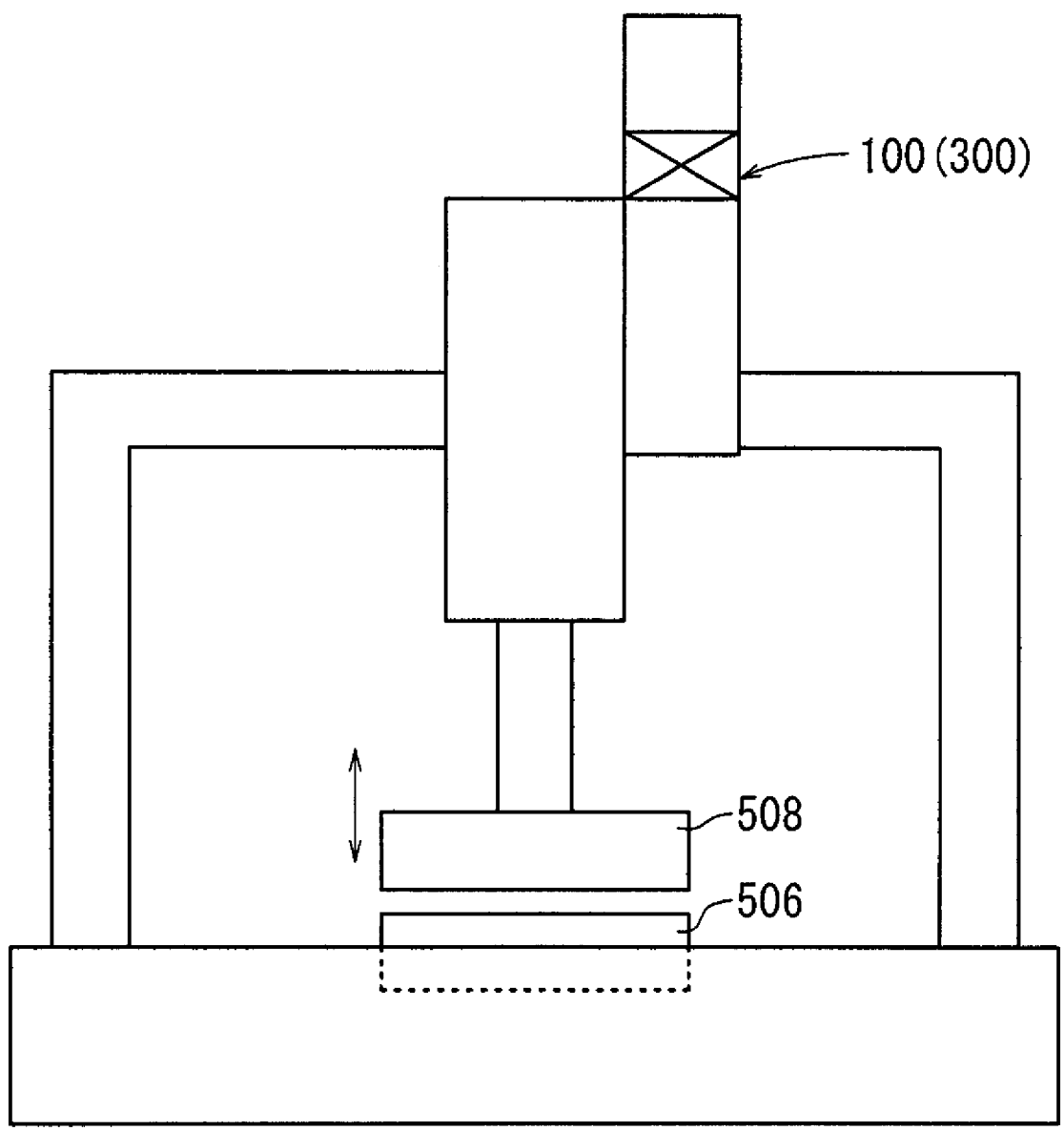
FIG. 36 is a schematic arrangement in which the automatic speed reducing ratio-switching apparatus according to the embodiment of the present invention is applied to a press machine.

More specifically, a large acceleration must be applied in order to perform displacement at a high speed in one stroke of the movable element (note that the upper die 508 approaches and separates with respect to the lower die 506, as shown in FIG. 36), so that movement is effected quickly toward the displacement terminal end position while only scarcely performing work, whereby a large force is generated at the displacement terminal end position.

In the case of the various processing/forming apparatuses described above, in many cases, the apparatuses are used while connected, for example, to a variable speed change mechanism, such as a toggle link mechanism or a cam mechanism, at the displacement terminal end position. However, the automatic speed reducing ratio-switching apparatus 100, 300 is a simple self-propelled variable speed change mechanism, wherein costs can be reduced, thus making it useful for FA equipment. Additionally, when the automatic speed reducing ratio-switching apparatus 100, 300 is incorporated into a servo motor portion in a rapid traverse mechanism of an electric servo gun, then the servo motor can be miniaturized, and improvements in characteristics thereof can be achieved by decreasing the load exerted on the forward end portion of the robot.

Figure 37:
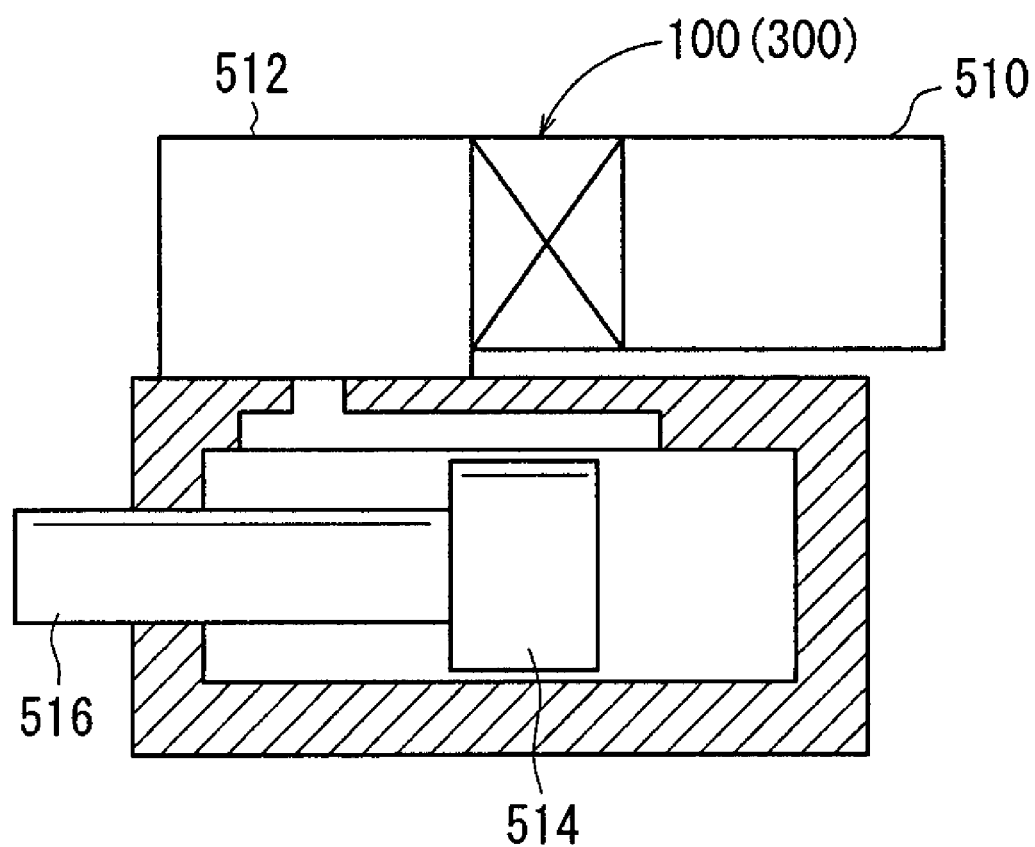
FIG. 37 is a schematic arrangement in which the automatic speed reducing ratio-switching apparatus according to the embodiment of the present invention is applied to a motor for driving an axial pump.

FIG. 37 shows a state in which a piston 514 and a piston rod 516 are displaced by pressure oil discharged from an axial pump 512, which is driven by a motor 510 assembled with the automatic speed reducing ratio-switching apparatus 100, 300. Electric hydraulic systems have been proposed by the present applicant, for example, in U.S. Pat. application Publication Ser. Nos. 2004-71563, 2005-87068 and 2005-22523. When the automatic speed reducing ratio-switching apparatus 100, 300 is assembled with a motor for driving an axial pump, a small sized lightweight motor can be provided for use in the electric hydraulic system.

Figure 38:
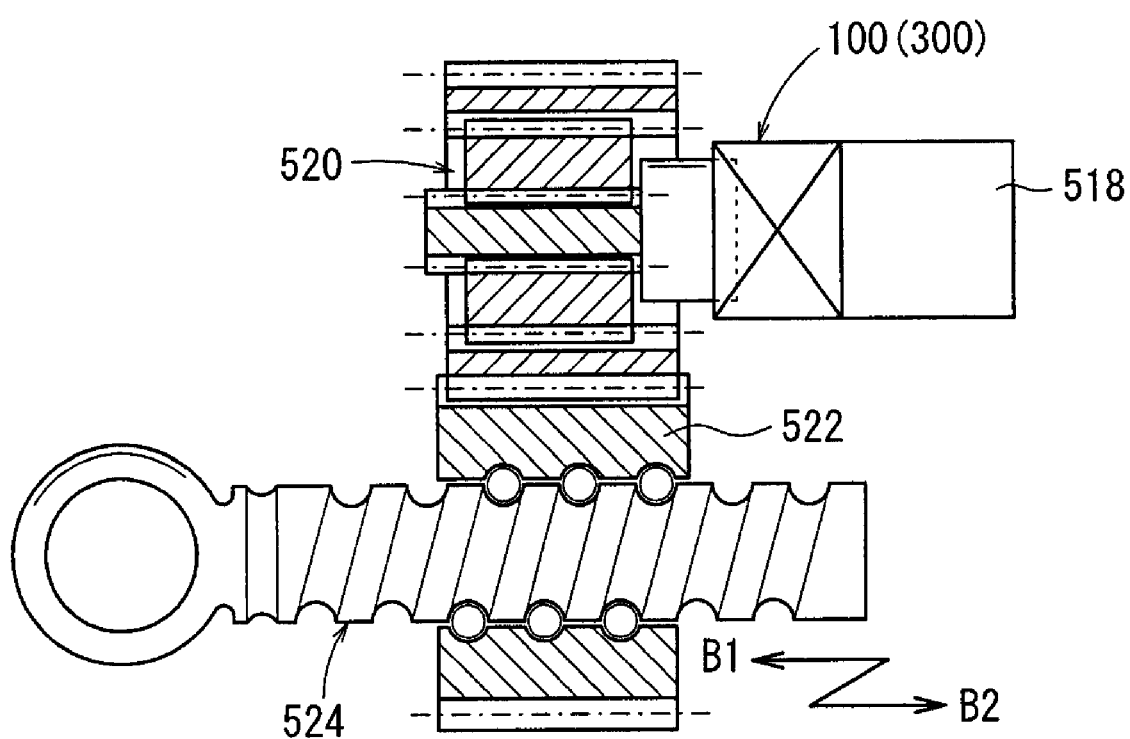
FIG. 38 is a schematic arrangement in which the automatic speed reducing ratio-switching apparatus according to the embodiment of the present invention is applied to a motor for driving a ball screw mechanism.

FIG. 38 shows a state in which a nut member 522 is rotated in a predetermined direction under a driving action of a planetary gear mechanism 520, using a motor 518 assembled with the automatic speed reducing ratio-switching apparatus 100, 300, and wherein a ball screw shaft 524 engaged with the nut member 522 is displaced in the direction of arrow B1 or B2.

Figure 39:
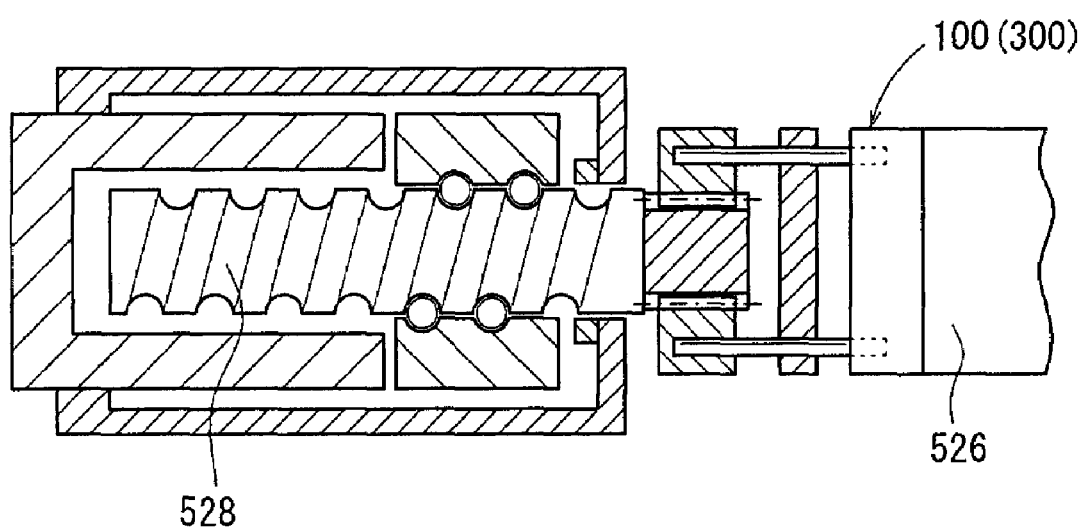
FIG. 39 is a schematic arrangement in which the automatic speed reducing ratio-switching apparatus according to the embodiment of the present invention is applied to a motor for driving a ball screw shaft.
Figure 40:
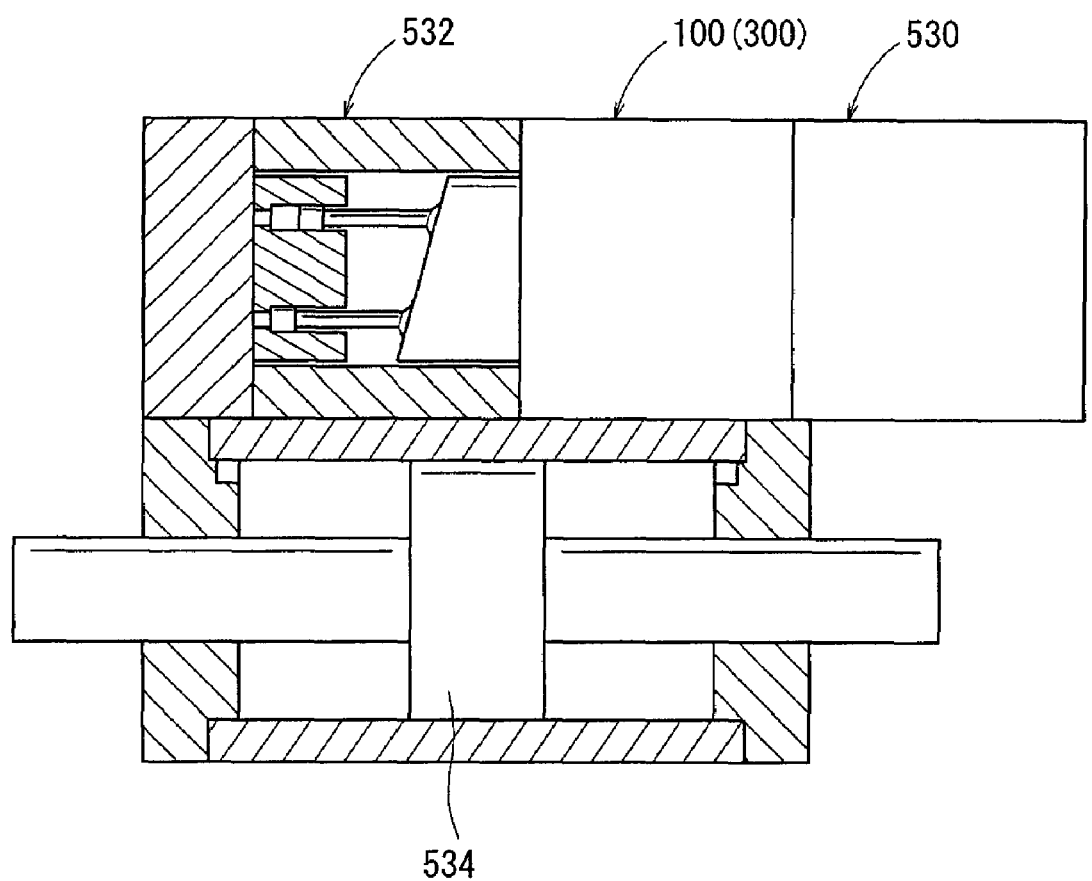
FIG. 40 is a schematic arrangement in which the automatic speed reducing ratio-switching apparatus according to the embodiment of the present invention is applied to a motor for driving an axial pump.

FIG. 39 shows a state in which a ball screw shaft 528 is rotated by a motor 526 assembled with the automatic speed reducing ratio-switching apparatus 100, 300. FIG. 40 shows a state in which a piston 534 having rods on both sides thereof is displaced by pressure oil discharged from an axial pump 532 that is driven by a motor 530, which is assembled together with the automatic speed reducing ratio-switching apparatus 100, 300.

Figure 41:
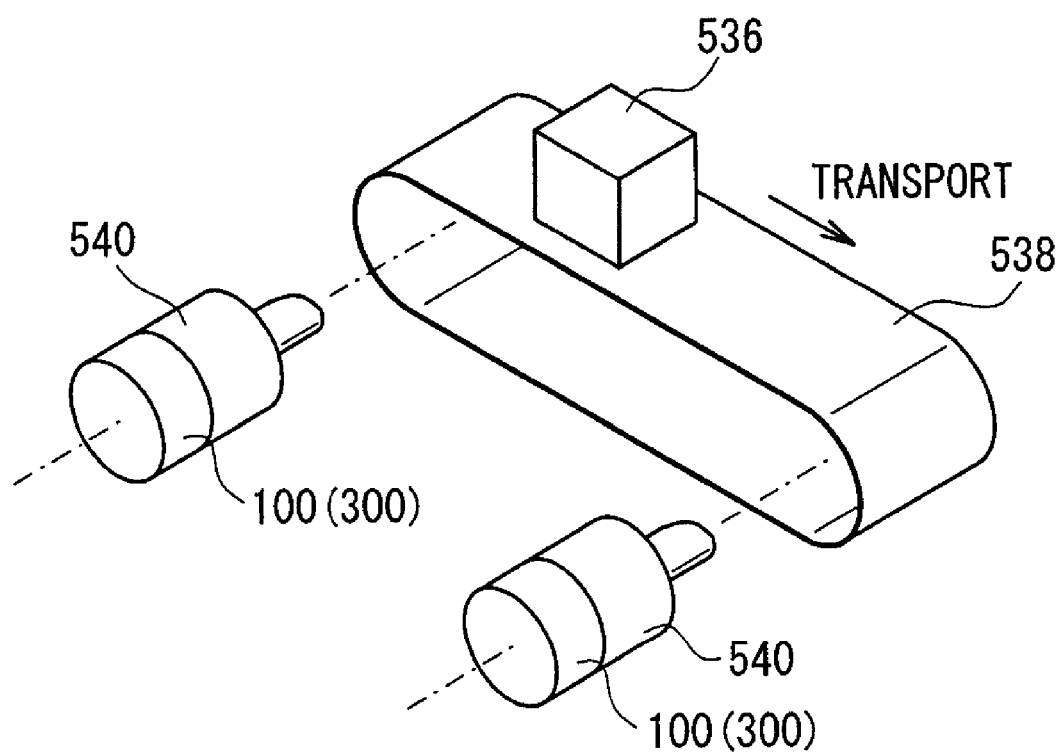
FIG. 41 is a schematic arrangement in which the automatic speed reducing ratio-switching apparatus according to the embodiment of the present invention is applied to a geared motor for driving a conveyer.
Figure 42:
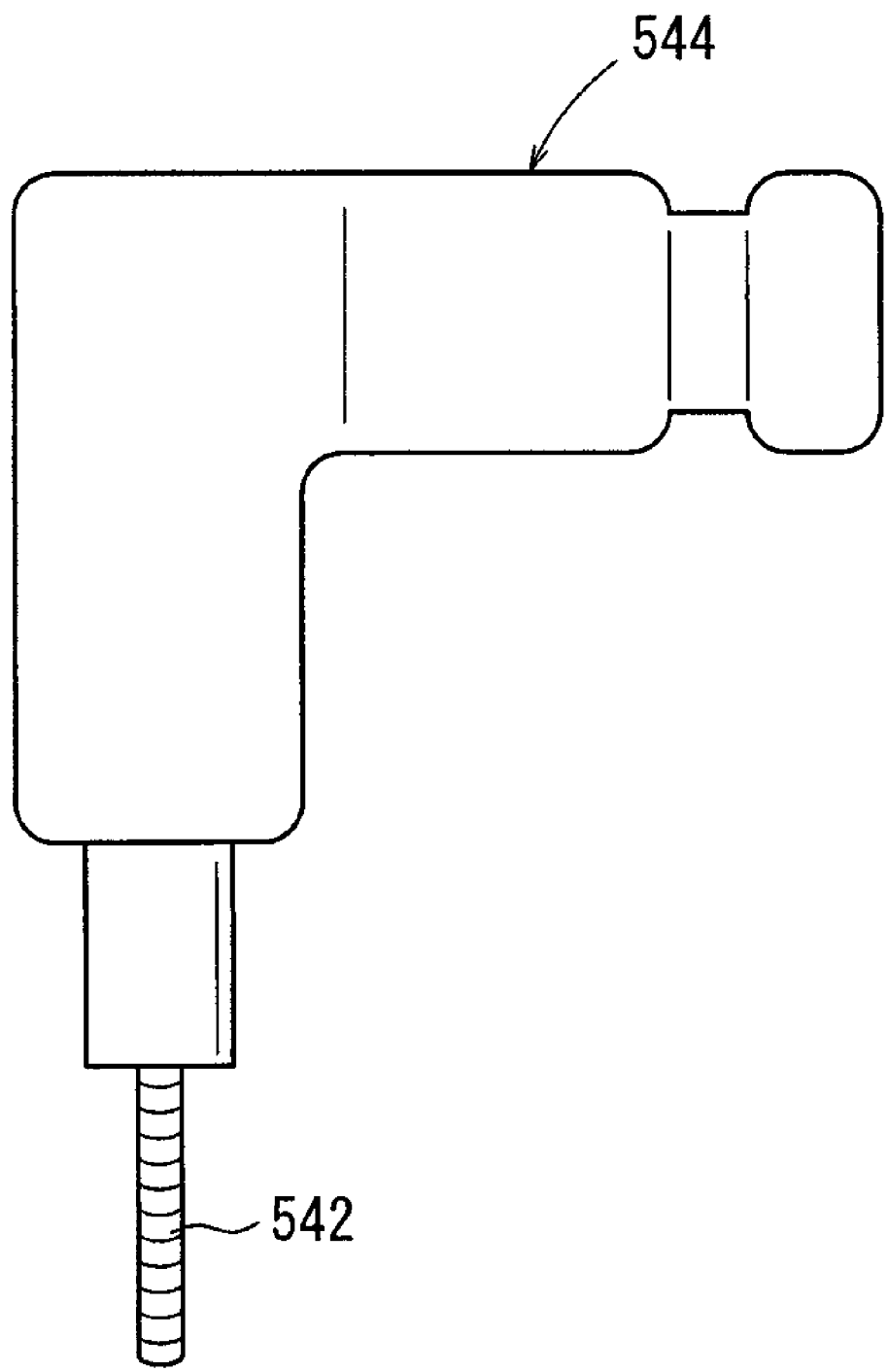
FIG. 42 is a front view illustrating an electric drill.
Figure 43:
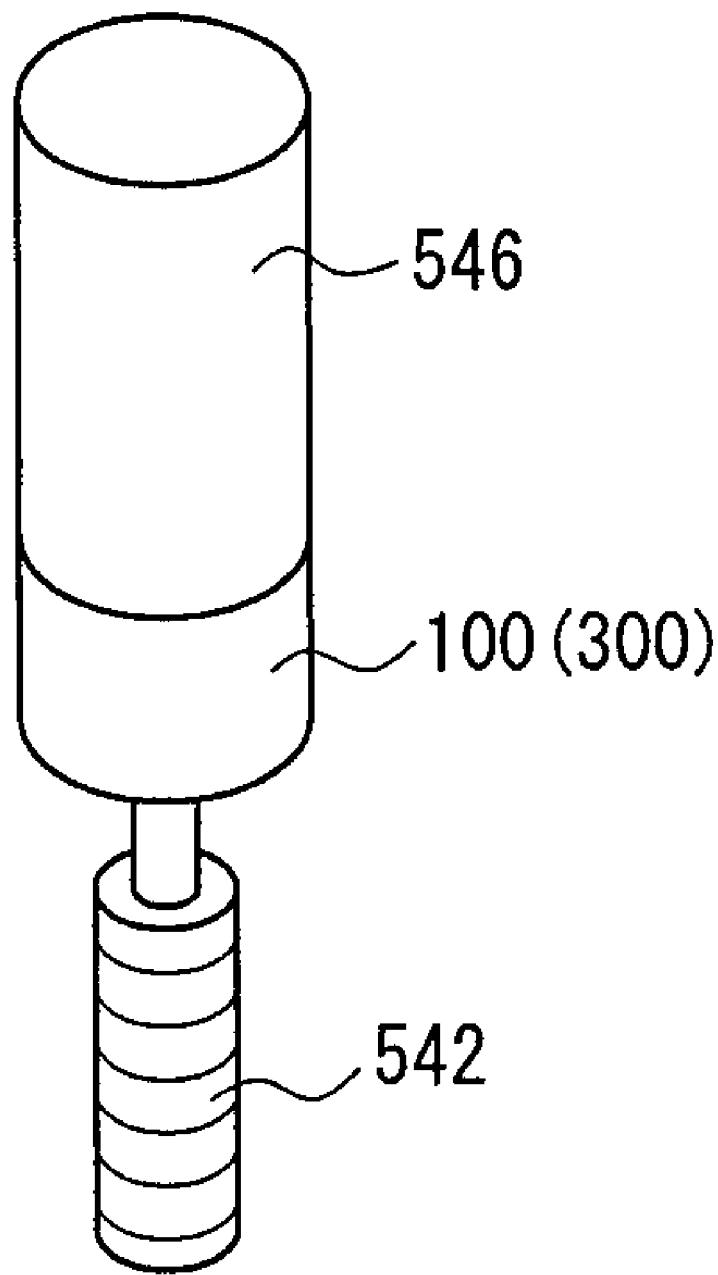
FIG. 43 is a perspective view in which the automatic speed reducing ratio-switching apparatus according to the embodiment of the present invention is applied to a motor for driving a drill member of an electric drill.
Figure 44:
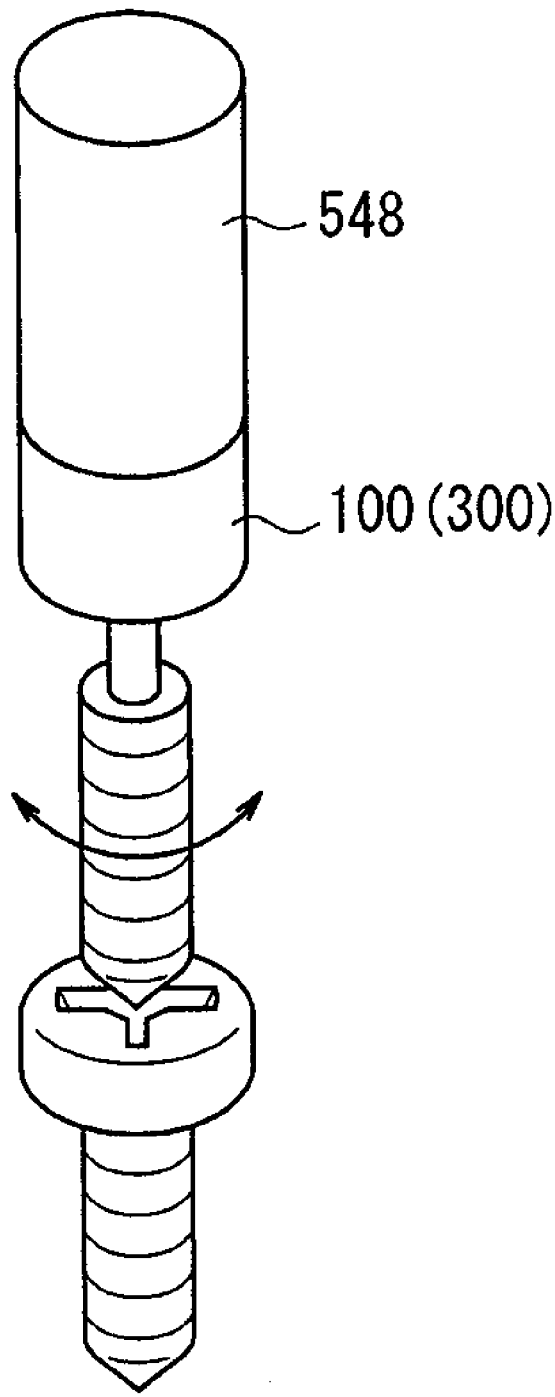
FIG. 44 is a perspective view in which the automatic speed reducing ratio-switching apparatus according to the embodiment of the present invention is applied to a motor of a screw fastening machine.

The automatic speed reducing ratio-switching apparatus 100, 300 is preferably utilized while integrally assembled, for example, to any of a conveyer motor or a geared motor 540, for transporting heavy materials 536 by means of a conveyer 538 (see FIG. 41), a spindle motor 546 of an electric drill 544 used for cutting-machining a workpiece by rotating a drill member 542 (see FIGS. 42 and 43), a pulse motor 548 of a screwing machine used for screwing both tapping screws and ordinary screws (see FIG. 44), a brushless DC motor, a brush-equipped DC motor, an induction motor, and an AC servo motor.

Figure 45:
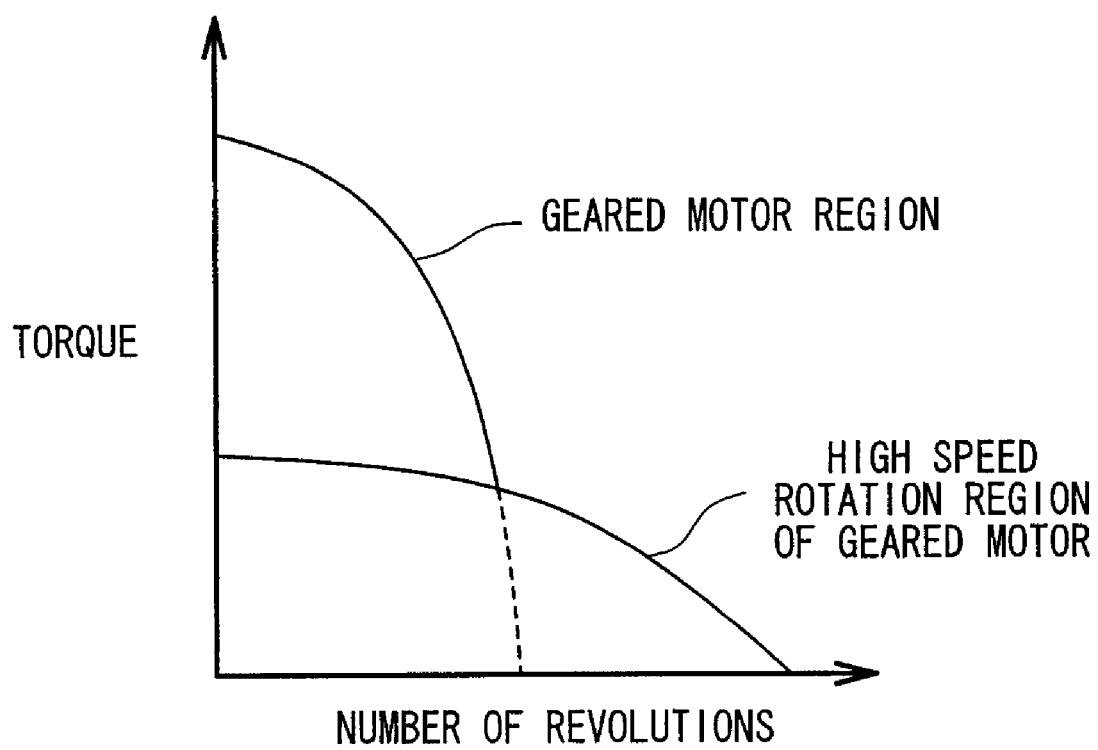
FIG. 45 is a graph showing characteristics illustrating torque change with respect to the number of revolutions of a geared motor.
Figure 46:
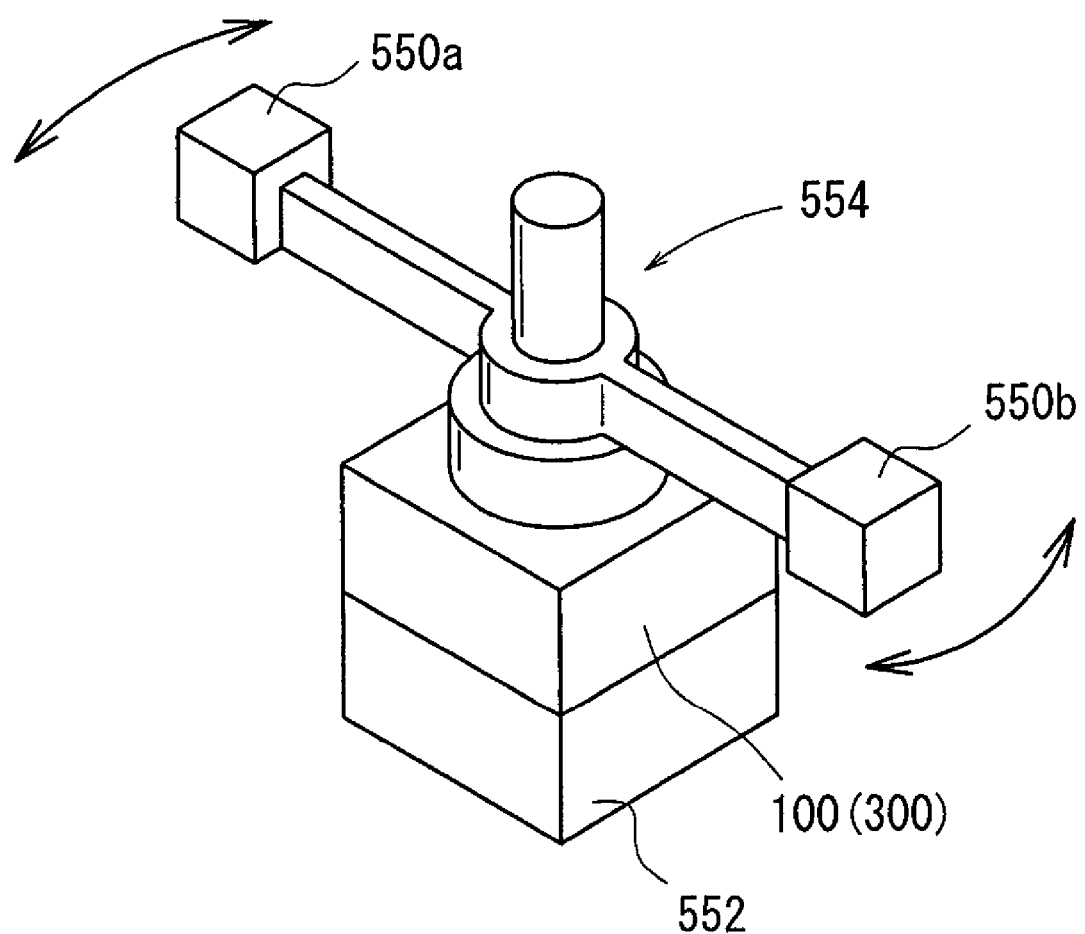
FIG. 46 is a perspective view in which the automatic speed reducing ratio-switching apparatus according to the embodiment of the present invention is applied to a rotary actuator for rotating a workpiece.
Figure 47:
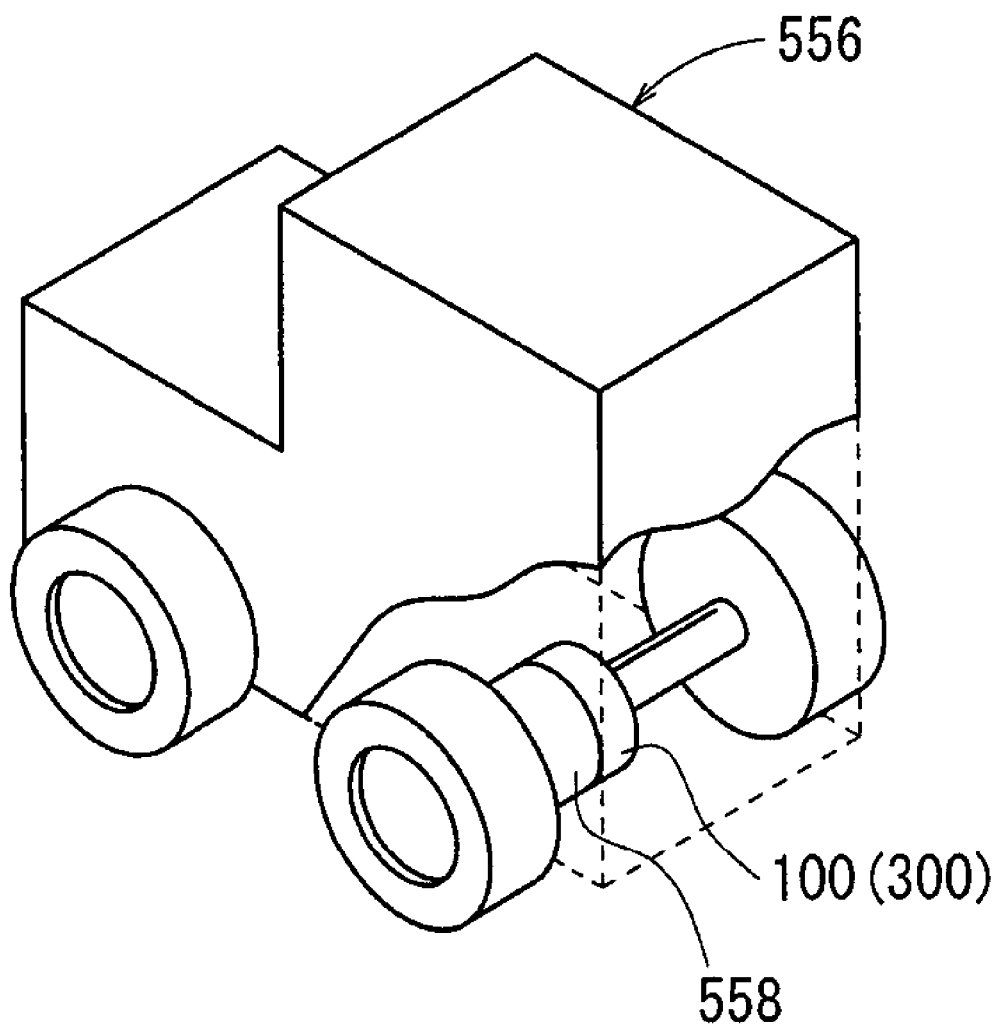
FIG. 47 is a perspective view in which the automatic speed reducing ratio-switching apparatus according to the embodiment of the present invention is applied to a motor for driving an electric wheelchair.

When the present invention is applied to a geared motor, both high torque of the geared motor as well as high-speed rotation with small size can be achieved when a load is applied at low torque (see FIG. 45).

When the automatic speed reducing ratio-switching apparatus 100, 300 is applied to a rotary actuator 554, in which workpieces 550a, 550b are rotated by a motor 552, an FA apparatus having high efficiency, wherein acceleration can be performed at high torque during acceleration operations performed while effecting floating and guiding operations at low resistance, can be provided during linear/rotational operations. For example, the number of revolutions can be increased using a greater part of the power during acceleration, and thereafter the workpieces can be rotated only by inertia.

Figure 48:
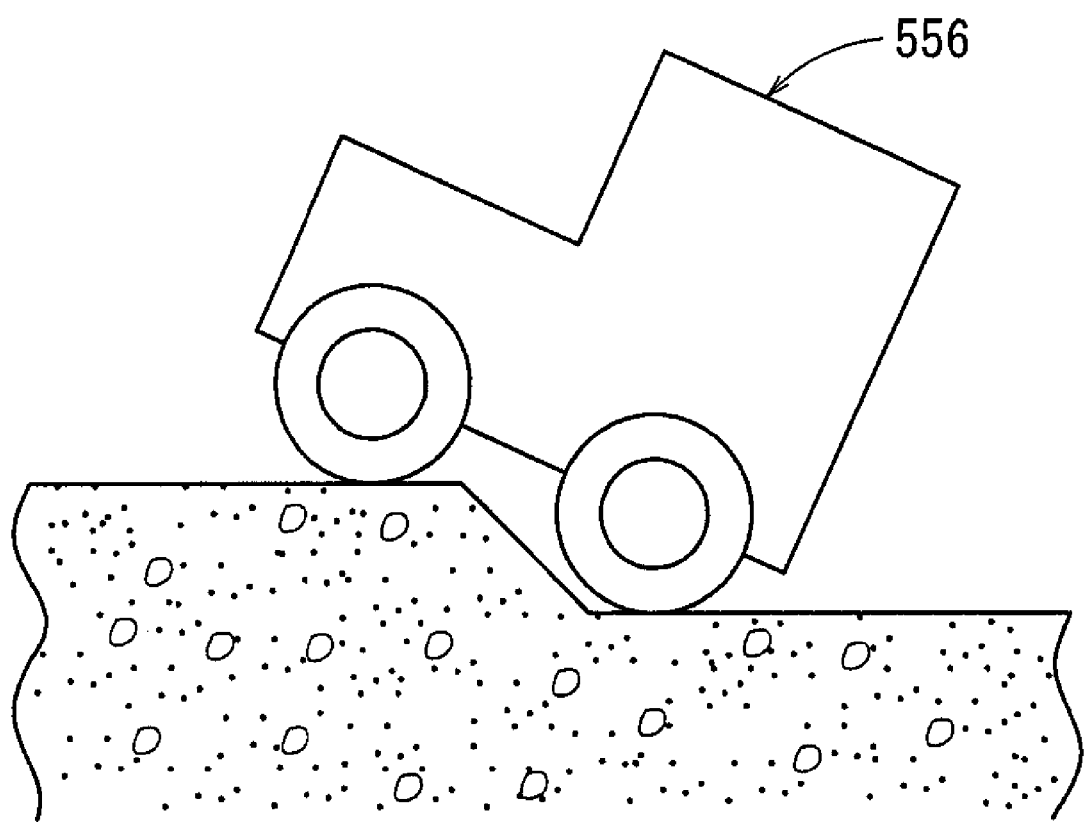
FIG. 48 is a side view illustrating a state in which an electric wheelchair rises over a step.

When the automatic speed reducing ratio-switching apparatus 100, 300 is applied to an electric wheelchair 556 or to an electric vehicle (for example, a hybrid automobile or an automobile carrying an electric motor 558 driven by a fuel cell), the wheelchair 556 or the vehicle can ride across a step while the speed thereof is automatically lowered and torque is increased, when the wheelchair 556 or the vehicle rides across a step that rises from a flat surface (see FIG. 48). Torque can also be manually increased by applying rotational force from the hands.

Figure 49:
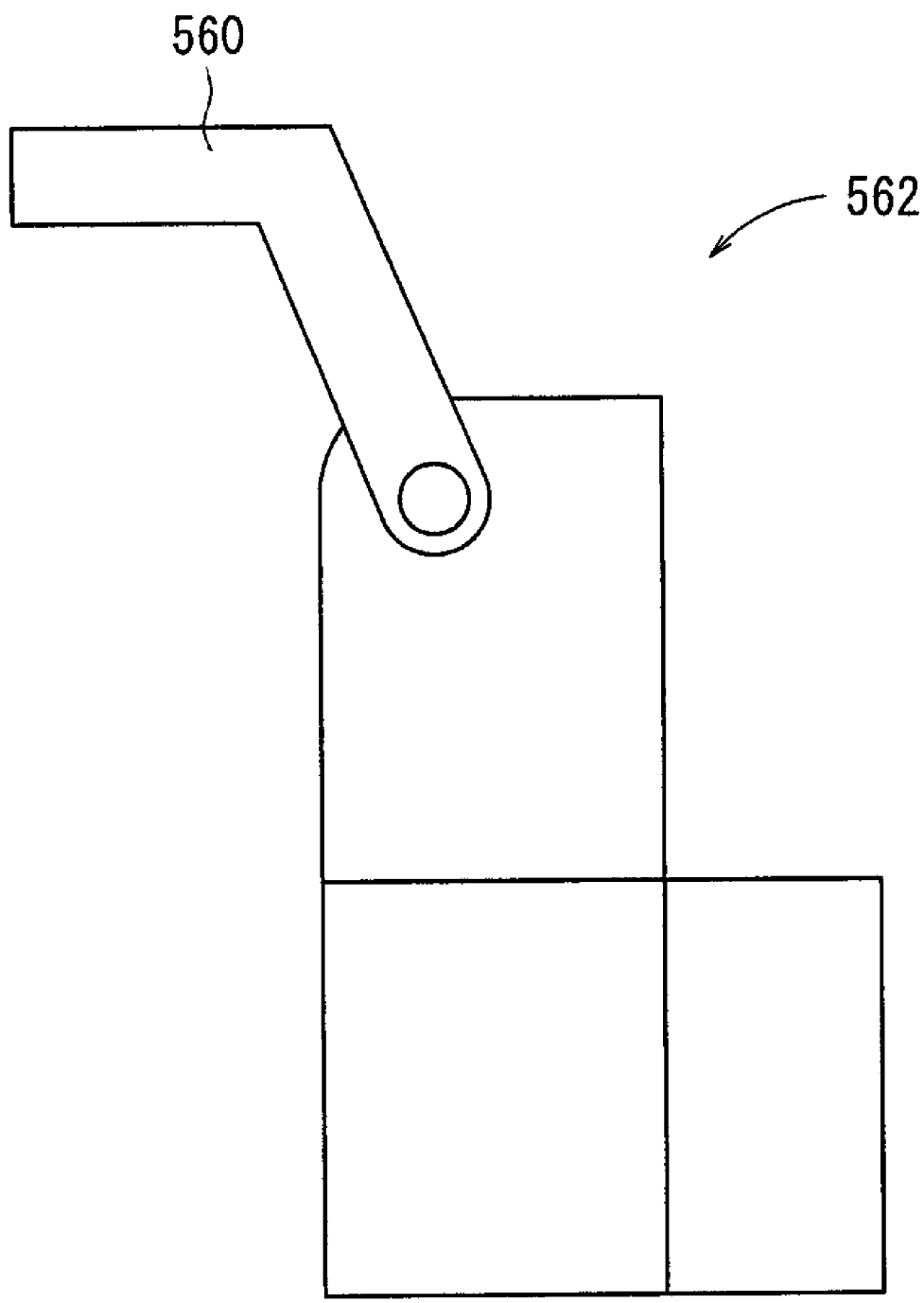
FIG. 49 is a side view in which the automatic speed reducing ratio-switching apparatus according to the embodiment of the present invention is applied to a clamp apparatus.

When the automatic speed reducing ratio-switching apparatus 100, 300 is used in combination with a caulking apparatus, a clamp apparatus 562 for clamping a workpiece by rotation of an arm 560 portion thereof (see FIG. 49), a cam mechanism for mold clamping, or a toggle link mechanism, for example, the operational force of the cam mechanism and the toggle link mechanism can be increased. When operational force is not exerted, high speed displacement can be effected.

The automatic speed reducing ratio-switching apparatus 100, 300 may be appropriately applied, for example, to a tightening mechanism or a rapid traverse mechanism used, for example, for a vise (including a vise that functions as a clamp for fixing a workpiece), a clamp, and a chuck (including a chuck of a numerically controlled machine).

Figure 50:
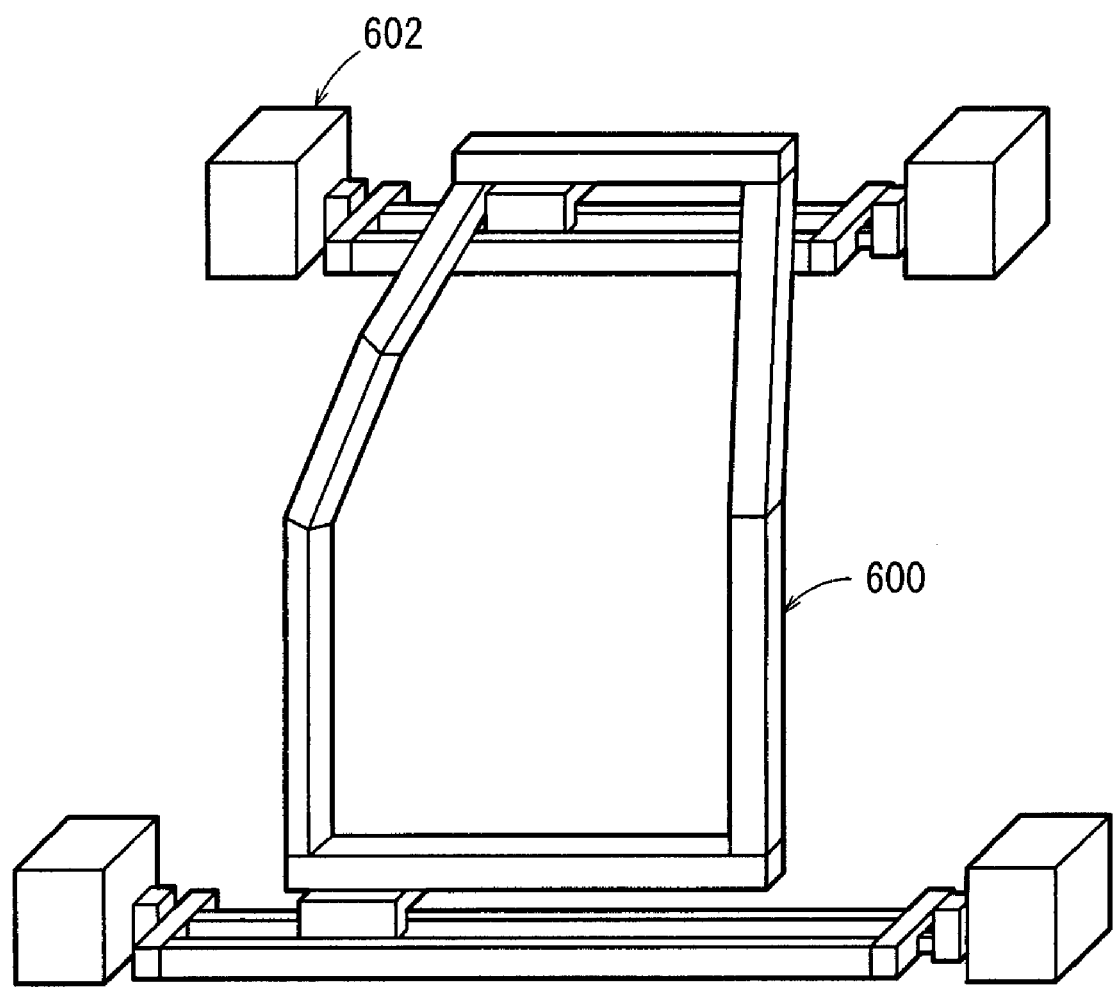
FIG. 50 is a front view illustrating a slide door disclosed in a conventional technique, and to which the automatic speed reducing ratio-switching apparatus according to the embodiment of the present invention is applied.
Figure 51:
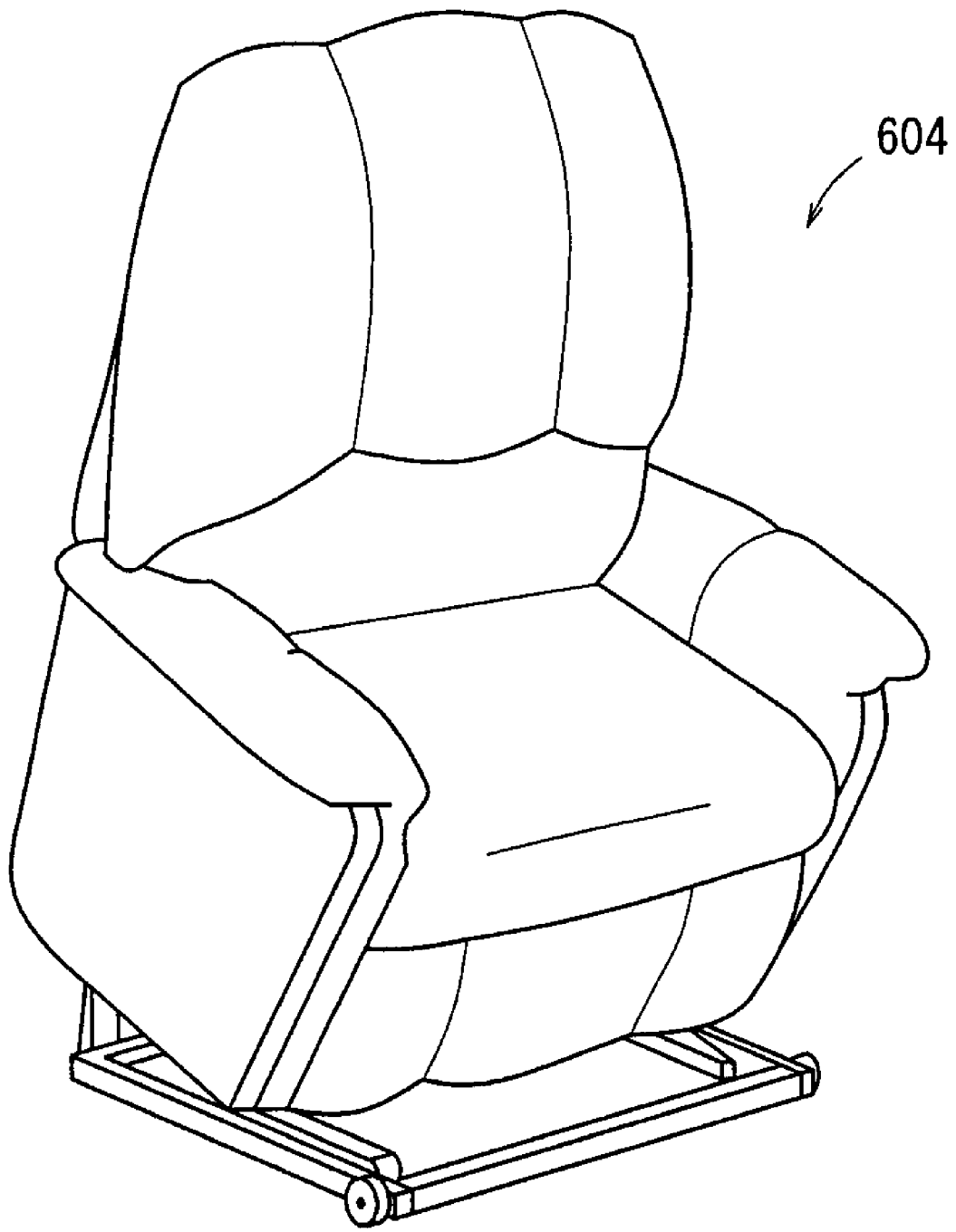
FIG. 51 is a perspective view illustrating an electric chair disclosed in a conventional technique, and to which the automatic speed reducing ratio-switching apparatus according to the embodiment of the present invention is applied.
Figure 52:
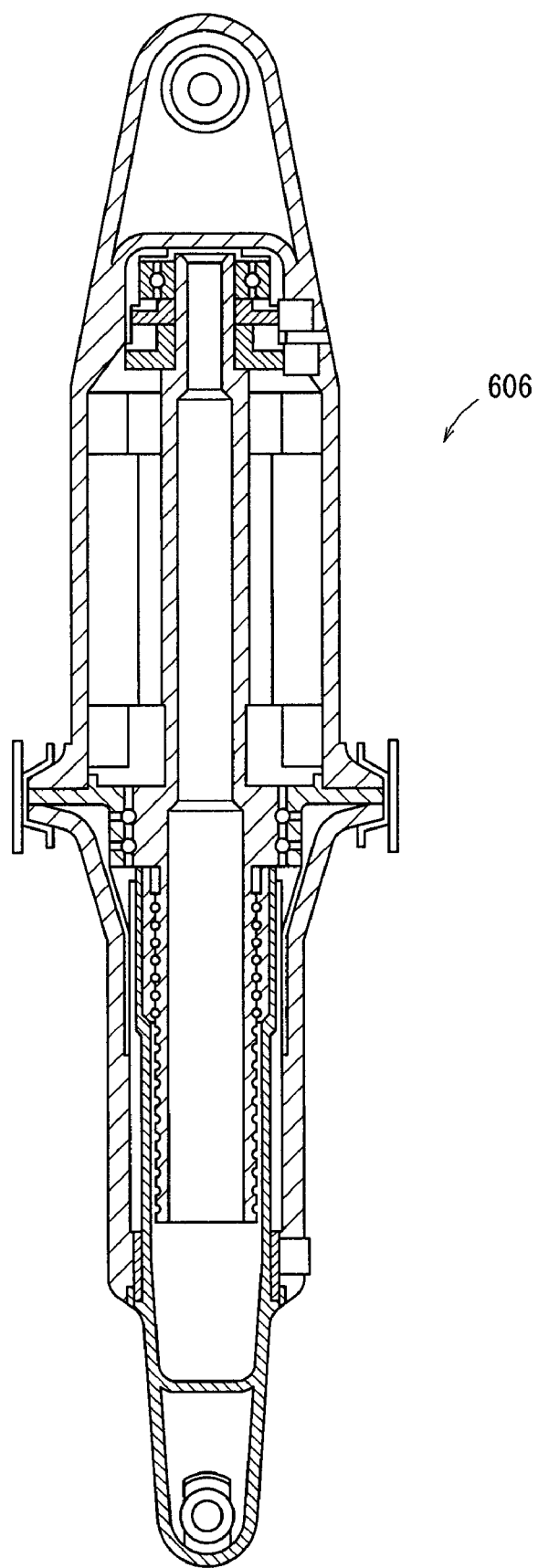
FIG. 52 is a vertical sectional view illustrating an electro-mechanical actuator disclosed in a conventional technique, and to which the automatic speed reducing ratio-switching apparatus according to the embodiment of the present invention is applied.
Figure 53:
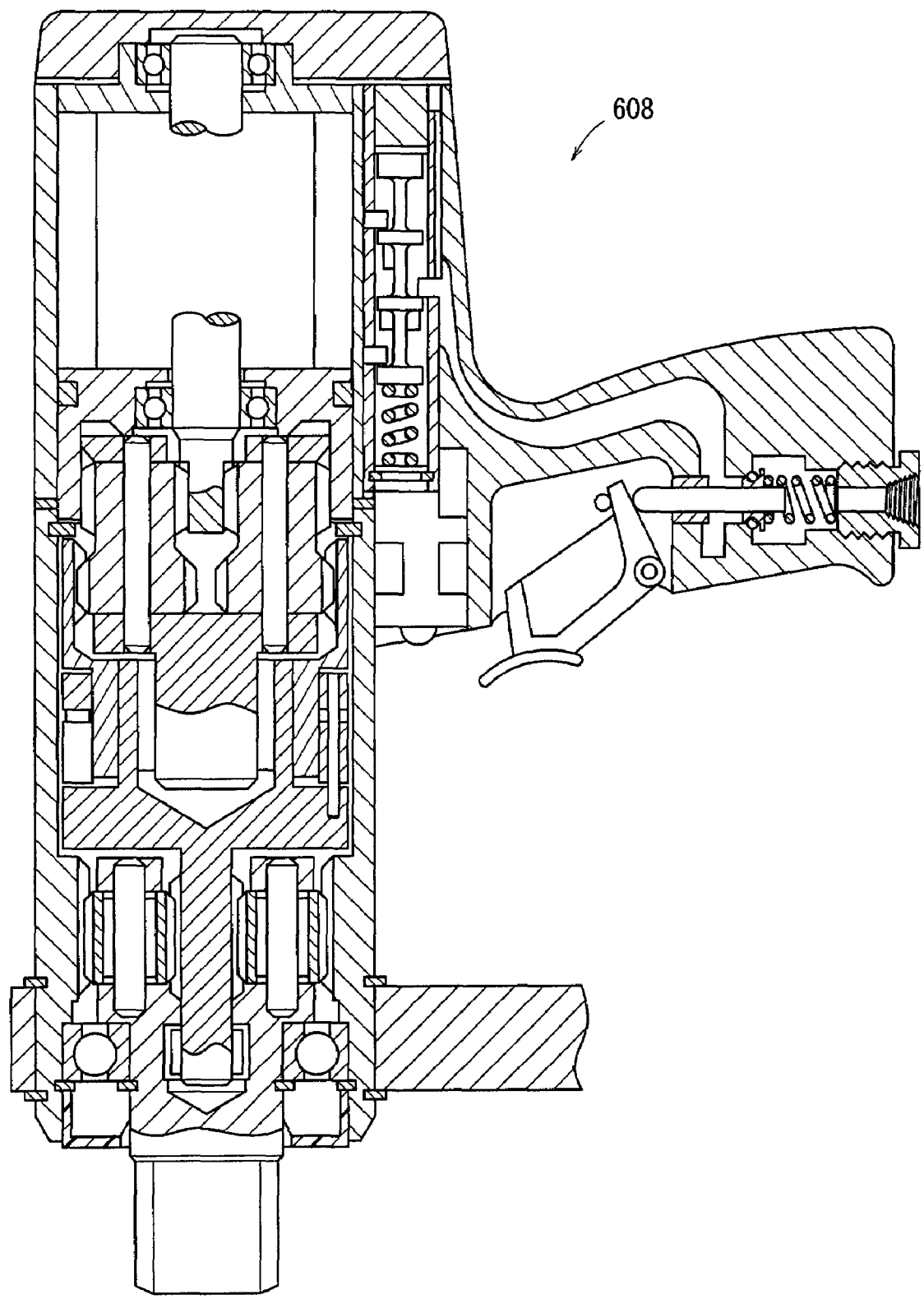
FIG. 53 is a vertical sectional view illustrating an electric fastener disclosed in a conventional technique, and to which the automatic speed reducing ratio-switching apparatus according to the embodiment of the present invention is applied.
Figure 54:
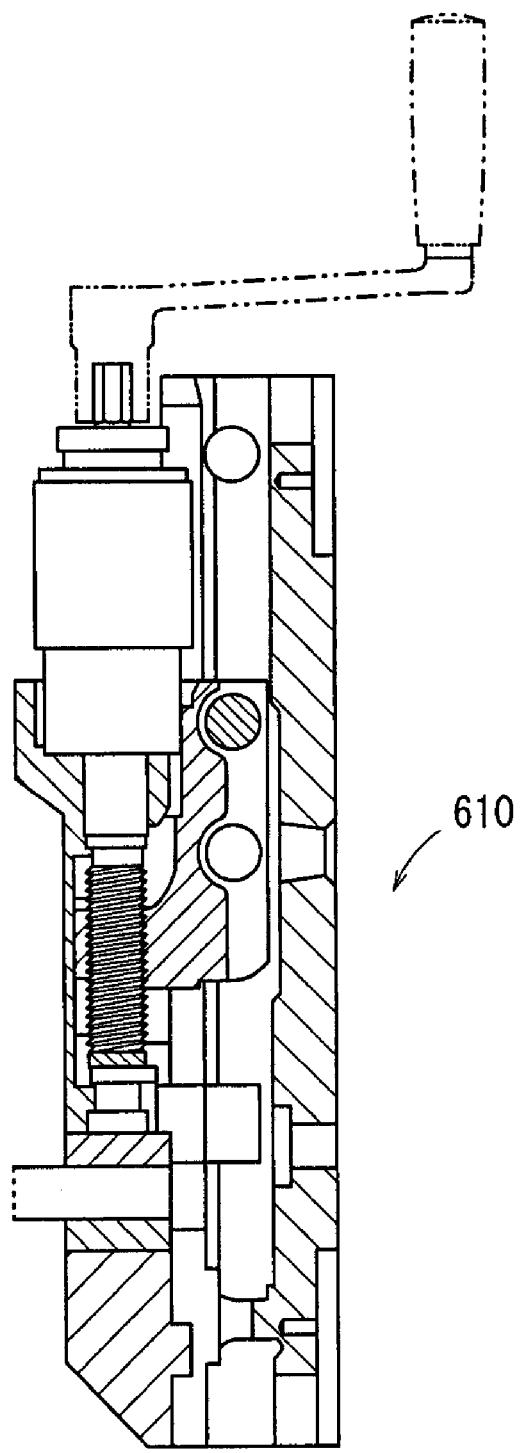
FIG. 54 is a vertical sectional view illustrating a clamp apparatus disclosed in a conventional technique, and to which the automatic speed reducing ratio-switching apparatus according to the embodiment of the present invention is applied.
Figure 55:
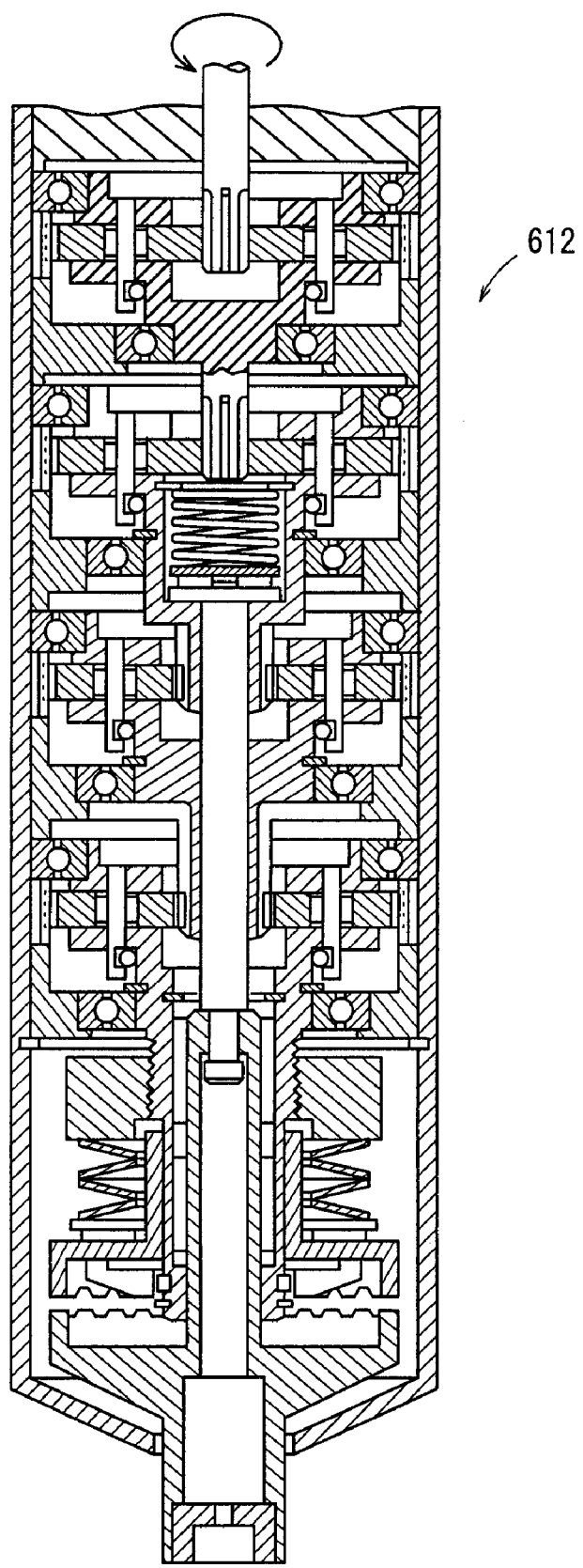
FIG. 55 is a vertical sectional view illustrating an automatic torque-switching apparatus disclosed in a conventional technique, and to which the automatic speed reducing ratio-switching apparatus according to the embodiment of the present invention is applied.
Figure 56:
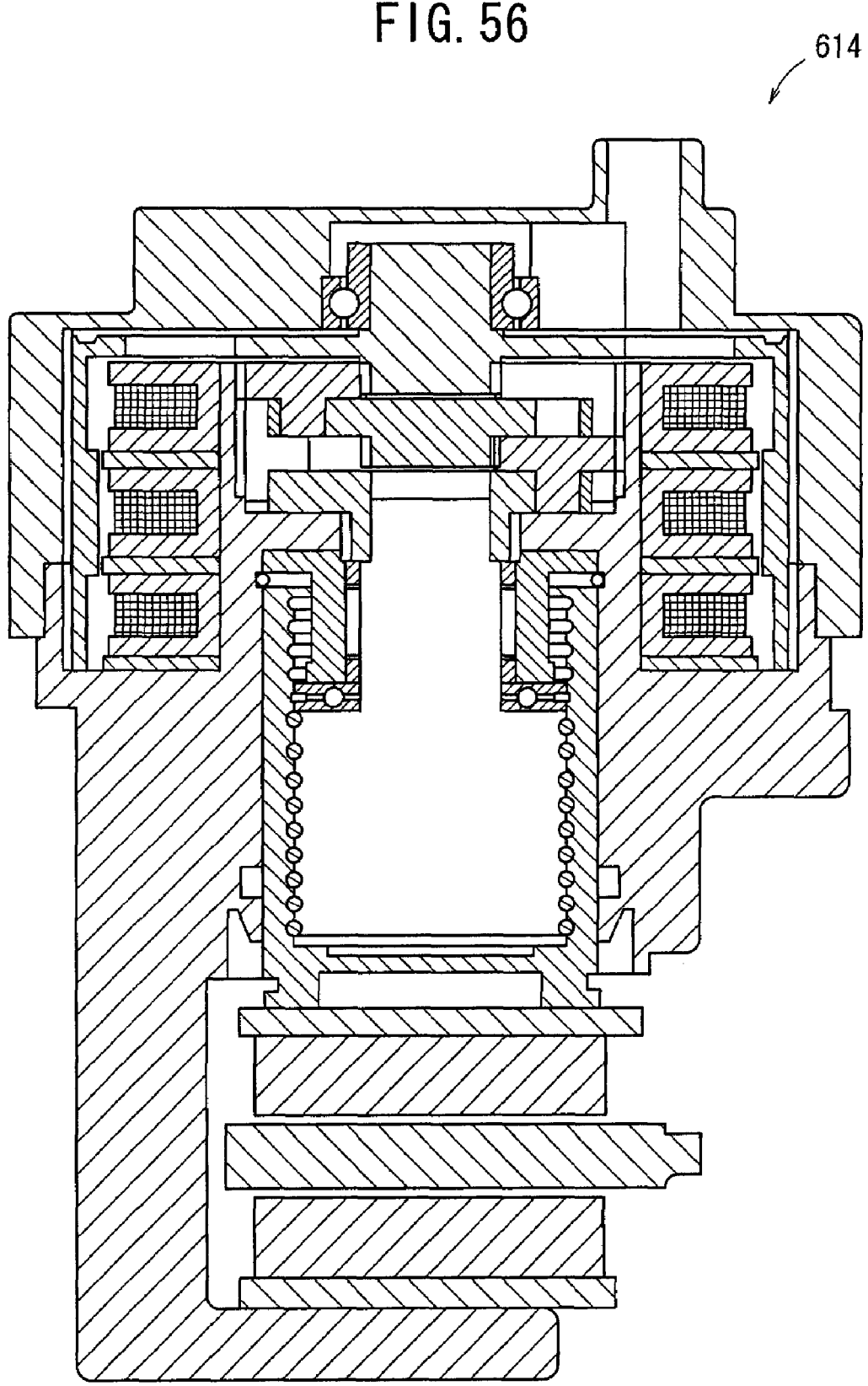
FIG. 56 is a vertical sectional view illustrating an electro-mechanical wheel brake apparatus disclosed in a conventional technique, and to which the automatic speed reducing ratio-switching apparatus according to the embodiment of the present invention is applied.
Figure 57:
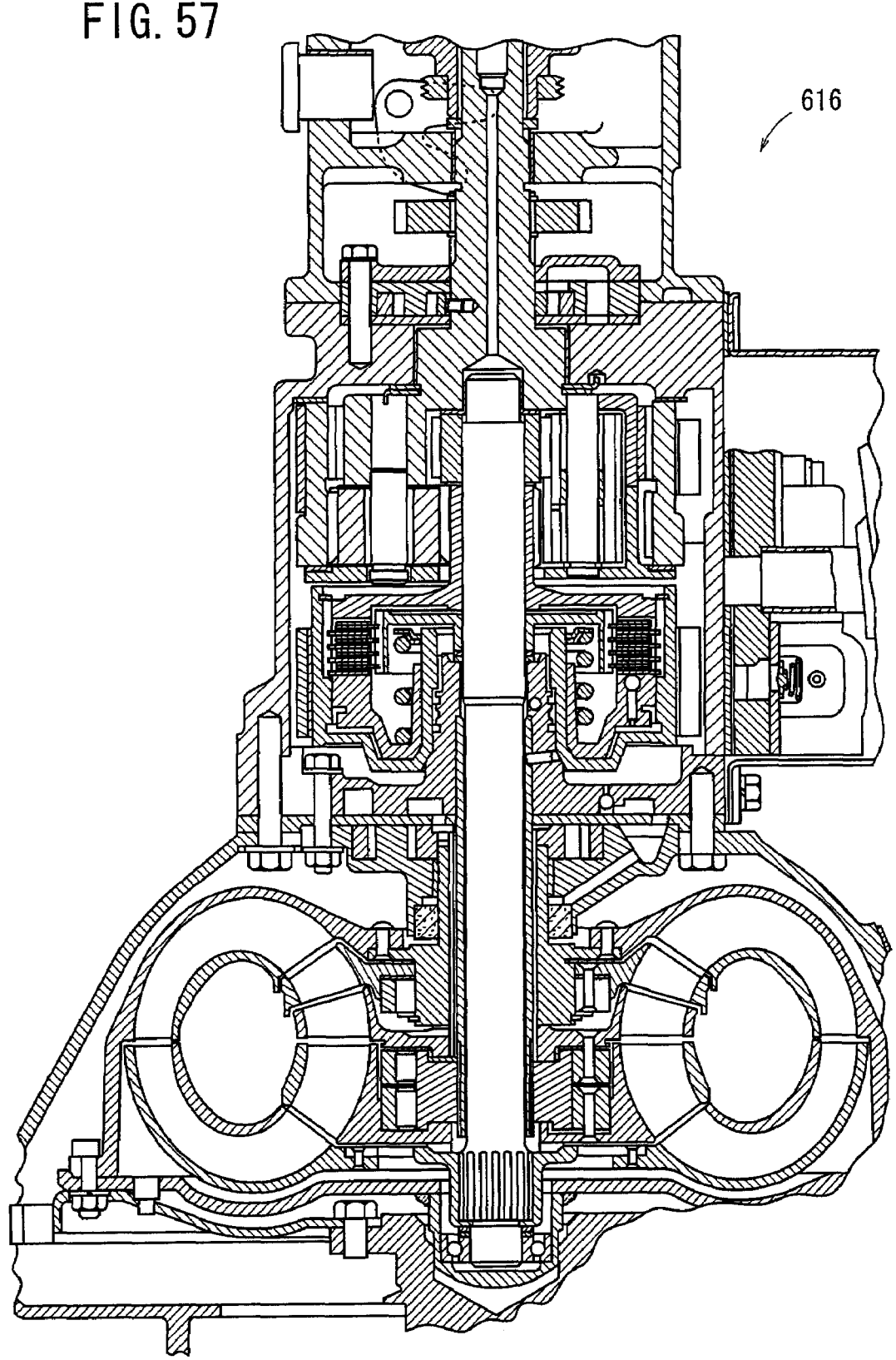
FIG. 57 is a vertical sectional view illustrating a torque-converting apparatus disclosed in a conventional technique, and to which the automatic speed reducing ratio-switching apparatus according to the embodiment of the present invention is applied.
Figure 58:
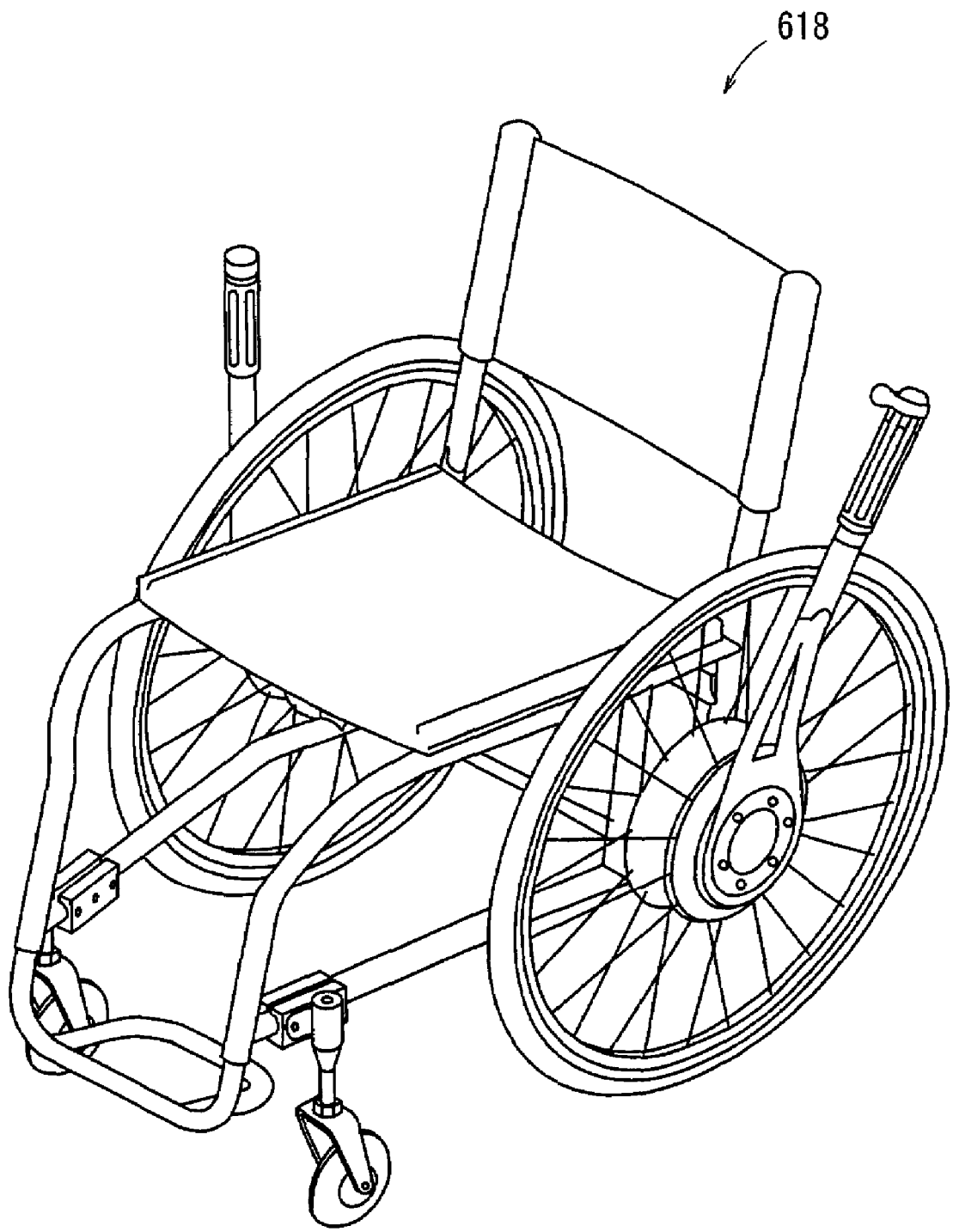
FIG. 58 is a perspective view illustrating an electric wheelchair disclosed in a conventional technique, and to which the automatic speed reducing ratio-switching apparatus according to the embodiment of the present invention is applied.

The automatic speed reducing ratio-switching apparatus 100, 300 may appropriately be applied to the motor of a forward/backward movement mechanism 602, for driving a sliding door 600 of a vehicle, as disclosed in Japanese Laid-Open Patent Publication No. 2005-133379 (see FIG. 50), the motor of a linear actuator mechanism, for driving an electric chair 604, as disclosed in U.S. Pat. No. 5,730,494 (see FIG. 51), the motor of an electromechanical actuator 606 incorporated in an airplane, as disclosed in U.S. Pat. No. 5,041,748 (see FIG. 52), the motor or planet gear portions of an electric fastener 608, as disclosed in U.S. Pat. No. 5,730,232 (FIG. 53), the planet gear portion of a clamp apparatus 610, as disclosed in U.S. Pat. No. 5,813,666 (FIG. 54), the motor portion or one or more planet gear portions of an automatic speed torque switching apparatus 612, as disclosed in U.S. Pat. No. 4,869,139 (FIG. 55), the portion between the motor and screw of an electromechanical wheel brake apparatus 614, as disclosed in U.S. Pat. No. 6,806,602 (FIG. 56), the torque-converting apparatus 616 disclosed in U.S. Pat. No. 3,164,034 (FIG. 57), and the manual wheelchair 618 disclosed in U.S. Patent Application Publication No. 2004-104554 (FIG. 58), respectively.

Any one of the planet gear portion, the torque converter, and the fluid coupling portion of the torque-converting apparatus 616, as disclosed in U.S. Pat. No. 3,164,034, may be replaced with the automatic speed reducing ratio-switching apparatus 100, 300 according to the embodiment of the present invention. Accordingly, it is possible to increase torque in binary directions of the planetary gear mechanism. Further, the planetary gear mechanism can be used as a fluid coupling having viscous coupling characteristics.

When the automatic speed reducing ratio-switching apparatus 100, 300 according to the embodiment of the present invention is applied to the clutch and gear portions of the manual wheelchair 618 (FIG. 58) disclosed in U.S. Pat. application Publication Ser. No. 2004-104554, torque can be increased in forward and backward directions independently, for the left and right wheels respectively. When a step is encountered, it is possible to reduce the labor needed to drive the wheelchair by a handicapped person or an elderly person.

Factors considered for integrally rotating the sun gear 216, the planet gears 218a to 218c, and the internal gear 220 include (1) the clearance between the internal gear 220 and the planet gears 218a to 218c, (2) the helix angles of the helical gears making up the sun gear 216, the planet gears 218a to 218c, and the internal gear 220, (3) viscous resistance between the sun gear 216, the planet gears 218a to 218c, and the internal gear 220, and (4) frictional resistance between the planet gears 218a to 218c and the pins 24 that rotatably support the planet gears (the oil or grease shown in FIGS. 3A and 3B is preferably silicone oil or silicone grease having an adjusted viscosity).

The thrust force that causes parallel displacement of the internal gear 220 in directions toward the input shaft or toward the output shaft is generated, for example, by the resistance (i.e., viscous resistance) between the internal gear 220 and the carrier 222a (222b).

If the resistance is excessively large, slippage disappears and transmission efficiency is improved, but such resistance arises when the internal gear 220 is subjected to parallel displacement in directions toward the input shaft or toward the output shaft. Therefore, resistance between the internal gear 220 and the carrier 222a (222b) should be determined taking into consideration, for example, response time and durability (service life).

However, slippage is a factor that lowers overall transmission efficiency. Therefore, the following mechanism may be provided to improve such an inconvenience, irrespective of the resistance between the internal gear 220 and the carrier 222a (222b). More specifically, when the resistance between the input shaft 226 (output shaft 228) and the carrier 222a (222b), which does not affect thrust force, is set as a second resistance having a magnitude to a certain extent, slippage can be decreased without increasing the thrust force of the internal gear 220.

As a result, when the ratio and values of the two resistances are appropriately distributed, slippage can be decreased while securing the response time of the internal gear 220.

Further, in the case of the input side apparatus, which makes transmission to an output side mechanism by performing predetermined operations such as rotary motion or rectilinear motion on the basis of an input torque supplied from a rotary driving source such as a motor, excessive loads (forces) exerted from the input side, loads (gravity) due to vertical operation, and spring forces that accumulate energy, may be applied in some cases. When a reverse input torque is applied from the output side, a reverse input-preventive clutch (see, for example, Japanese Laid-Open Patent Publication Nos. 2002-266902 and 64-69829) may appropriately be disposed between the rotary driving source and the input side apparatus, together with the automatic speed reducing ratio-switching apparatus 100, 300 according to the embodiment of the present invention, which functions to prevent return to the input side by locking the reverse input torque from the output side.

When such a reverse input-preventive clutch is provided, then the input side apparatus is protected from excessive loads exerted on the input side in the power transmission system, so that the workpiece can be retained and locked when an input torque from the rotary driving source is stopped, for example. When the workpiece is moved upwardly or downwardly in the vertical direction, the workpiece can be reliably locked at the stopped position, whereby damage of the input side apparatus can be prevented.

Although certain preferred embodiments of the present invention have been shown and described in detail, it should be understood that various changes and modifications may be made therein without departing from the scope of the appended claims.

What is claimed is:

1. An automatic speed reducing ratio-switching apparatus comprising:
    a planetary gear mechanism including an input shaft and an output shaft, said planetary gear mechanism further including a sun gear, planet gears, and an internal gear, each of which are helical gears, and a carrier that rotatably supports said planet gears and which is integrally rotated in accordance with revolution of said planet gears;
    a viscous resistance member, which is provided within an inner section of said carrier internally inserted into said internal gear, said planet gears, and said internal gear, and which generates a thrust force between said internal gear and said planet gears; and
    a brake mechanism that causes said internal gear to be displaced in parallel by said thrust force, in a direction toward said input shaft or a direction toward said output shaft, in accordance with increase or decrease in output load, in order to brake rotational motion of said internal gear,
    wherein a helix angle $\theta$ of each of said helical gears making up said sun gear, said planet gears, and said internal gear, is not less than 25 degrees and not more than 45 degrees.

2. An automatic speed reducing ratio-switching apparatus comprising:
    a planetary gear mechanism including an input shaft and an output shaft, said planetary gear mechanism further including a sun gear, planet gears, and an internal gear, each of which are helical gears, and a carrier that rotatably supports said planet gears and which is integrally rotated in accordance with revolution of said planet gears;
    a viscous resistance member, which is provided within an inner section of said carrier internally inserted into said internal gear, said planet gears, and said internal gear, and which generates a thrust force between said internal gear and said planet gears; and
    a brake mechanism that causes said internal gear to be displaced in parallel by said thrust force, in a direction toward said input shaft or a direction toward said output shaft, in accordance with increase or decrease in output load, in order to brake rotational motion of said internal gear,
    wherein said brake mechanism includes lock sections provided in a housing that accommodates said planetary gear mechanism, and internal gear clutches disposed at circumferential edge portions of said internal gear, and
    wherein a rising angle $\gamma$ of each of pawls of said lock sections and said internal gear clutches satisfies the relational expression $$0 \leq \tan\gamma < (\eta \cdot di)/\{dp \cdot \tan(90-\alpha)\}$$

in which
    $\alpha$: helix angle of said sun gear;
    $\eta$: screw efficiency of said sun gear as a sliding screw;
    $dp$: pitch circle diameter of said sun gear; and
    $di$: outer diameter of said internal gear (center of application of torque of said pawls).

3. An automatic speed reducing ratio-switching apparatus comprising:
    a planetary gear mechanism including an input shaft and an output shaft, said planetary gear mechanism further including a sun gear, planet gears, and an internal gear, each of which are helical gears, and a carrier that rotatably supports said planet gears and which is integrally rotated in accordance with revolution of said planet gears;
    a viscous resistance member, which is provided within an inner section of said carrier internally inserted into said internal gear, said planet gears, and said internal gear, and which generates a thrust force between said internal gear and said planet gears; and
    a brake mechanism that causes said internal gear to be displaced in parallel by said thrust force, in a direction toward said input shaft or a direction toward said output shaft, in accordance with increase or decrease in output load, in order to brake rotational motion of said internal gear,
    wherein a first seal mechanism, which prevents said viscous resistance member from flowing out from said carrier, is provided in an annular groove of said carrier, and
    wherein said first seal mechanism is composed of a pair of O-rings, and a deformation amount of said O-rings is not less than 0.5% and not more than 1.5% of a substantially circular vertical cross-sectional area thereof.

4. An automatic speed reducing ratio-switching apparatus comprising:
    a planetary gear mechanism including an input shaft and an output shaft, said planetary gear mechanism further including a sun gear, planet gears, and an internal gear, each of which are helical gears, and a carrier that rotatably supports said planet gears and which is integrally rotated in accordance with revolution of said planet gears;
    a viscous resistance member, which is provided within an inner section of said carrier internally inserted into said internal gear, said planet gears, and said internal gear, and which generates a thrust force between said internal gear and said planet gears; and
    a brake mechanism that causes said internal gear to be displaced in parallel by said thrust force, in a direction toward said input shaft or a direction toward said output shaft, in accordance with increase or decrease in output load, in order to brake rotational motion of said internal gear, wherein a second seal mechanism, which prevents said viscous resistance member from flowing out from said input shaft, is provided in an annular groove of said input shaft, and wherein said second seal mechanism is composed of a ring having a substantially X-shaped cross section, and a deformation amount of said ring having said substantially X-shaped cross section is not less than 0.5% and not more than 1.5% of a vertical cross-sectional area thereof.

5. An automatic speed reducing ratio-switching apparatus comprising:

a planetary gear mechanism including an input shaft and an output shaft, said planetary gear mechanism further including a sun gear, planet gears, and an internal gear, each of which are helical gears, and a carrier that rotatably supports said planet gears and which is integrally rotated in accordance with revolution of said planet gears;

a viscous resistance member, which is provided within an inner section of said carrier internally inserted into said internal gear, said planet gears, and said internal gear, and which generates a thrust force between said internal gear and said planet gears; and a brake mechanism that causes said internal gear to be displaced in parallel by said thrust force, in a direction toward said input shaft or a direction toward said output shaft, in accordance with increase or decrease in output load, in order to brake rotational motion of said internal gear, wherein said brake mechanism includes lock receiving sections disposed at circumferential edge portions of said internal gear, and clutch mechanisms, each of which includes a cylindrical member that runs idly in only one direction between a first bearing disposed on an inner side and a second bearing disposed on an outer side, and lock sections that engage with said lock receiving sections of said internal gear, and said lock sections are formed at circumferential edge portions of said cylindrical member in an axial direction thereof, and said clutch mechanisms, each of which has the same structure, are disposed respectively on a side of said input shaft and a side of said output shaft.

6. An automatic speed reducing ratio-switching apparatus comprising:

a planetary gear mechanism including an input shaft and an output shaft, said planetary gear mechanism further including a sun gear, planet gears, and an internal gear, each of which are helical gears, and a carrier that rotatably supports said planet gears and which is integrally rotated in accordance with revolution of said planet gears;

a viscous resistance member, which is provided within an inner section of said carrier internally inserted into said internal gear, said planet gears, and said internal gear, and which generates a thrust force between said internal gear and said planet gears; and a brake mechanism that causes said internal gear to be displaced in parallel by said thrust force, in a direction toward said input shaft or a direction toward said output shaft, in accordance with increase or decrease in output load, in order to brake rotational motion of said internal gear, wherein said carrier, which includes said inner section, is formed integrally with said output shaft.

7. The automatic speed reducing ratio-switching apparatus according to claim 6, wherein a plurality of grooves parallel to an axial direction are formed on an outer diameter surface of said inner section of said carrier.

8. The automatic speed reducing ratio-switching apparatus according to claim 6, wherein a plurality of annular grooves perpendicular to an axial direction and parallel to a circumferential direction are formed on an outer diameter surface of said inner section of said carrier.

9. The automatic speed reducing ratio-switching apparatus according to claim 6, wherein a plurality of inclined grooves intersecting an axial direction at a predetermined angle are disposed in alignment on an outer diameter surface of said inner section of said carrier.

10. The automatic speed reducing ratio-switching apparatus according to claim 6, wherein a plurality of dimples composed of recesses having semispherical cross sections are formed on an outer diameter surface of said inner section of said carrier.

* * * * *